United States Patent
Cohen et al.

(10) Patent No.: US 10,936,251 B2
(45) Date of Patent: Mar. 2, 2021

(54) I/O DEVICE AND COMPUTING HOST INTEROPERATION

(71) Applicant: Seagate Technology LLC, Fremont, CA (US)

(72) Inventors: Earl T. Cohen, Oakland, CA (US); Timothy L. Canepa, Los Gatos, CA (US)

(73) Assignee: Seagate Technology, LLC, Fremont, CA (US)

( * ) Notice: Subject to any disclaimer, the term of this patent is extended or adjusted under 35 U.S.C. 154(b) by 0 days.

(21) Appl. No.: 16/684,027

(22) Filed: Nov. 14, 2019

(65) Prior Publication Data

US 2020/0081660 A1    Mar. 12, 2020

Related U.S. Application Data

(63) Continuation of application No. 15/661,079, filed on Jul. 27, 2017, now Pat. No. 10,514,864, which is a
(Continued)

(51) Int. Cl.
*G06F 3/06* (2006.01)
*G06F 12/00* (2006.01)
*G06F 12/1027* (2016.01)

(52) U.S. Cl.
CPC .......... *G06F 3/0659* (2013.01); *G06F 3/0607* (2013.01); *G06F 3/0611* (2013.01);
(Continued)

(58) Field of Classification Search
None
See application file for complete search history.

(56) References Cited

U.S. PATENT DOCUMENTS

| | | |
|---|---|---|
| 4,942,552 A | 7/1990 | Merrill et al. |
| 5,278,703 A | 1/1994 | Rub et al. |

(Continued)

FOREIGN PATENT DOCUMENTS

| | | |
|---|---|---|
| CN | 1670701 | 9/2005 |
| CN | 1851671 | 10/2006 |

(Continued)

OTHER PUBLICATIONS

"SSDs—Write Amplification, Trim and GC," Mar. 2010 (retrieved from http://www.oczenterprise.com/whitepapers/ssds-writeamplification-trim-and-gc.pdf, using Internet Archive Wayback Machine Mar. 28, 2014), 3 pgs.

(Continued)

*Primary Examiner* — Brian R Peugh
(74) *Attorney, Agent, or Firm* — Taylor English Duma LLP

(57) ABSTRACT

Methods, systems, and computer-readable storage media for a storage device to, upon receiving a command from a computing host, determine whether or not the command includes location information targeting a particular portion of a NVM of the storage device, the location information having been retrieved by the computing host from a shadow map and included with the command. Upon determining that the command includes location information, the command is processed by the storage device using the included location information. Upon determining that the command does not include location information, the storage device determines the particular portion of the NVM targeted by the command based on a map stored in a memory of the storage device before processing the command.

20 Claims, 14 Drawing Sheets

Related U.S. Application Data continuation of application No. 13/936,010, filed on Jul. 5, 2013, now abandoned, which is a continuation of application No. PCT/US2012/049905, filed on Aug. 8, 2012.

(60) Provisional application No. 61/543,666, filed on Oct. 5, 2011, provisional application No. 61/531,551, filed on Sep. 6, 2011, provisional application No. 61/521,739, filed on Aug. 9, 2011.

(52) U.S. Cl.
CPC ............ *G06F 3/0679* (2013.01); *G06F 12/00* (2013.01); *G06F 3/067* (2013.01); *G06F 12/1027* (2013.01)

(56) References Cited

U.S. PATENT DOCUMENTS

| | | | |
|---|---|---|---|
| 5,440,474 | A | 8/1995 | Hetzler |
| 6,427,198 | B1 | 7/2002 | Berglund et al. |
| 6,763,424 | B2 | 7/2004 | Conley |
| 7,159,082 | B1 | 1/2007 | Wade |
| 7,307,631 | B2 * | 12/2007 | Robart .................... G06T 15/60 345/422 |
| 7,406,587 | B1 * | 7/2008 | Zhang ................. G06F 9/30094 712/217 |
| 7,594,073 | B2 | 9/2009 | Hanebutte et al. |
| 8,327,226 | B2 | 12/2012 | Rub |
| 8,479,080 | B1 | 7/2013 | Shalvi et al. |
| 8,661,196 | B2 | 2/2014 | Eleftheriou et al. |
| 8,677,054 | B1 | 3/2014 | Meir et al. |
| 8,793,429 | B1 | 7/2014 | Call et al. |
| 9,389,805 | B2 | 7/2016 | Coehn et al. |
| 2003/0055988 | A1 | 3/2003 | Noma et al. |
| 2004/0250026 | A1 | 12/2004 | Kazunori |
| 2004/0257365 | A1 * | 12/2004 | Robart .................... G06T 15/60 345/426 |
| 2006/0174067 | A1 | 8/2006 | Soules |
| 2007/0162601 | A1 | 7/2007 | Pendarakis et al. |
| 2007/0198799 | A1 | 8/2007 | Shinohara et al. |
| 2008/0177935 | A1 | 7/2008 | Lasser et al. |
| 2008/0320190 | A1 | 12/2008 | Lydon et al. |
| 2009/0193164 | A1 | 7/2009 | Ajanovic et al. |
| 2009/0249022 | A1 | 10/2009 | Rowe et al. |
| 2009/0287861 | A1 | 11/2009 | Lipps et al. |
| 2010/0020604 | A1 | 1/2010 | Cornwell |
| 2010/0037003 | A1 | 2/2010 | Chen et al. |
| 2010/0070799 | A1 | 3/2010 | Cornwell et al. |
| 2010/0131702 | A1 | 5/2010 | Wong et al. |
| 2010/0153631 | A1 | 6/2010 | Moon et al. |
| 2010/0169710 | A1 | 7/2010 | Royer |
| 2010/0174866 | A1 | 7/2010 | Fujimoto et al. |
| 2011/0010489 | A1 | 1/2011 | Chih-Kang |
| 2011/0099323 | A1 | 4/2011 | Syu |
| 2011/0138148 | A1 | 6/2011 | Friedman et al. |
| 2011/0161562 | A1 | 6/2011 | Chang et al. |
| 2011/0238890 | A1 | 9/2011 | Hiroshi |
| 2011/0264843 | A1 | 10/2011 | Haines et al. |
| 2011/0296088 | A1 | 12/2011 | Duzly et al. |
| 2012/0050076 | A1 | 3/2012 | Rosenband et al. |
| 2012/0054419 | A1 | 3/2012 | Chen et al. |
| 2012/0059976 | A1 | 3/2012 | Rosenband et al. |
| 2012/0072641 | A1 | 3/2012 | Suzuki et al. |
| 2012/0117309 | A1 | 5/2012 | Schuette |
| 2013/0297894 | A1 | 11/2013 | Cohen et al. |
| 2014/0006683 | A1 | 1/2014 | Ratn et al. |
| 2014/0082261 | A1 | 3/2014 | Cohen et al. |
| 2014/0101379 | A1 | 4/2014 | Tomlin |
| 2014/0181327 | A1 | 6/2014 | Cohen et al. |
| 2014/0208007 | A1 | 7/2014 | Cohen et al. |
| 2017/0322751 | A1 | 11/2017 | Cohen et al. |

FOREIGN PATENT DOCUMENTS

| | | |
|---|---|---|
| CN | 1924830 | 3/2007 |
| CN | 101356502 | 1/2009 |
| CN | 101390043 | 3/2009 |
| CN | 101576834 | 11/2009 |
| CN | 101611549 | 12/2009 |
| CN | 101689246 | 3/2010 |
| CN | 101930404 | 12/2010 |
| CN | 102023818 | 4/2011 |
| EP | 0898228 | 9/2005 |
| GB | 2479235 | 10/2011 |
| JP | H07-160602 | 6/1995 |
| JP | 2007-226557 | 9/2007 |
| KR | 100445134 | 8/2004 |
| TW | 201007734 | 2/2010 |
| WO | 2012099937 | 7/2012 |
| WO | 2013022915 | 2/2013 |

OTHER PUBLICATIONS

"Write Amplification," Wikipedia (retrieved from http://en.wikipedia.org/wiki/Write_amplification and converted to pdf format Apr. 7, 2014), 14 pgs.

Cohen, Earl T.; International Search Report and Written Opinion for PCT/US2012/058583, filed Oct. 4, 2012, dated Feb. 25, 2013, 8 pgs.

Cohen, Earl T.; International Search Report and Written Opinion for PCT/US2012/049905, filed Aug. 8, 2012, dated Jan. 3, 2013, 9 pgs.

Simionescu, Horia; Notice of Allowance for Korean Patent Application No. 10-2013-0022004, filed Feb. 28, 2013, dated Mar. 28, 2019, 3 pgs.

Agrawal et al, "Design Tradeoffs for SSD Performance," Proceedings of the 2008 USENIX Annual Technical Conference, Jun. 2008, 14 pgs.

Chinese Office Action for serial No. 201280049511.1, filed Aug. 8, 2012, dated Nov. 4, 2014, 18 pgs.

Cohen, Earl T.; Office Action for Taiwanese Application No. 101128817, filed Aug. 9, 2012, dated Sep. 19, 2016, 6 pgs.

Cohen, et al; International Preliminary Report on Patentability for PCT/US2012/049905, filed Aug. 8, 2012, dated Feb. 11, 2014, 6 pgs.

Frankie et al, "SSD Trim Commands Considerably Improve Overprovisioning," Proceedings Flash Memory Summit 2011, Aug. 2011, 19 pgs.

IEEE, "band" definition, IEEE Standard Dictionary of Electrical and Electronics Terms, Nov. 3, 1998, p. 80, IEE, Inc. New York, NY, 3 sheets total (1 sheet of content, 2 sheets of title pages).

Layton, Jeffrey, "Anatomy of SSD's," Linux Magazine, Oct. 27, 2009 (Retrieved from http://www.linux-mag.com/id/7590/2 and converted to pdf format Apr. 7, 2014), 4 pgs.

LSI Corporation; Extended European Search Report for serial No. 14151725.0, dated Apr. 22, 2014, 6 pgs.

LSI Corporation; International Search Report and Written Opinion for PCT/US2012/034601, filed Apr. 22, 2012, dated Nov. 30, 2012, 7 pgs.

LSI Corporation; Office Action for Chinese patent application No. 201280009888.4, filed Oct. 4, 2012, dated Mar. 10, 2014, 17 pgs.

LSI Corporation; Office Action for Korean Patent Application No. 10-2013-7029137, dated Jun. 27, 2014, 7 pgs.

LSI Corporation; Office Action for Taiwan Patent Application No. 101114992, dated Jun. 27, 2014, 8 pgs.

LSI Corporation; Office Action for Taiwan Patent Application No. 101128817, dated Jul. 14, 2014, 17 pgs.

LSI Corporation; Office Action for Taiwan Patent Application No. 101137008, dated Jul. 31, 2014, 10 pgs.

LSI Corporation; Search Report for Chinese Patent Application No. 201280009888.4, filed Oct. 4, 2012, dated Feb. 28, 2014, 4 pgs.

Mehling, Herman, "Solid State Drives Get Faster with TRIM," Jan. 27, 2010 (retrieved from http://www.enterprisestorageforum.com/technology/features/article.php/3861181/Solid-State-Drives-Get-Faster-with-TRIM.htm and converted to pdf format Apr. 7, 2014), 4 pgs.

(56) References Cited

OTHER PUBLICATIONS

Office Action of the State Intellectual Property Office of the People's Republic of China Patent Application No. 2012800314652 including Search Report, May 4, 2014, 14 pgs.
Shimpi, Anand Lal, "The Impact of Spare Area on SandForce, More Capacity at no Performance Loss?" May 3, 2010 (retrieved from http://www.anandtech.com/show/3690/the-impact-of-spare-area-on-sandforce-more-capacity-at-no-performance-loss and converted to pdf, 14 pgs.
Smith, Kent, "Garbage Collection: Understanding Foreground vs. Background GC and Other Related Elements," Proceedings Flash Memory Summit 2011, Aug. 2011, 9 pgs.
Smith, Kent, "Understanding SSD Over Provisioning," Proceedings Flash Memory Summit 2012, Aug. 2012, 16 pgs.

* cited by examiner

I/O DEVICE AND COMPUTING HOST INTEROPERATION

CROSS-REFERENCE TO RELATED APPLICATIONS

This application is a continuation of U.S. patent application Ser. No. 15/661,079, filed Jul. 27, 2017, and entitled "I/O DEVICE AND COMPUTING HOST INTEROPERATION," which is a continuation of U.S. patent application Ser. No. 13/936,010, filed Jul. 5, 2013, which is a continuation of PCT Application No. PCT/US2012/049905, filed Aug. 8, 2012, which claims the benefit of U.S. Provisional Application No. 61/543,666, filed Oct. 5, 2011, U.S. Provisional Application 61/531,551, filed Sep. 6, 2011, and U.S. Provisional Application No. 61/521,739, filed Aug. 9, 2011, each of which is incorporated herein in its entirety by these references for all purposes.

BACKGROUND

Field: Advancements in computing host and I/O device technology are needed to provide improvements in performance, efficiency, and utility of use.

Related Art: Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

The invention may be implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

Figure 1A:
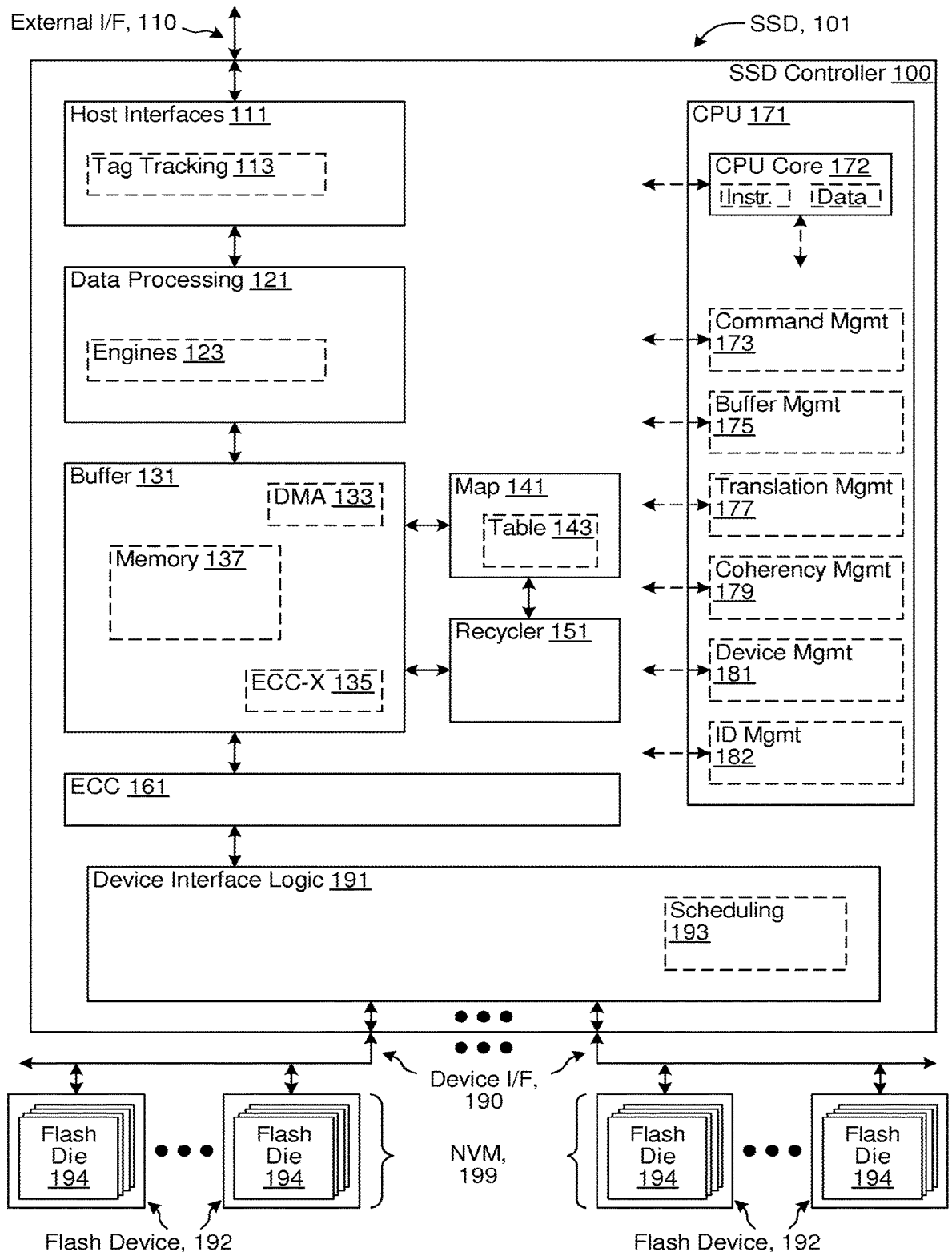
FIG. 1A illustrates selected details of an embodiment of a Solid-State Disk (SSD) including an SSD controller compatible with operation in an I/O device (such as an I/O storage device) enabled for interoperation with a host (such as a computing host).

| \multicolumn{2}{c}{List of Reference Symbols in Drawings} | |
|---|---|
| Ref. Symbol | Element Name |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | Firm Ware (FW) |
| 107 | Driver |
| 107D | dotted-arrow (Host Software ←→ I/O Device Communication) |
| 108 | Shadow Map |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 112H | Host Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |

List of Reference Symbols in Drawings

| Ref. Symbol | Element Name |
| --- | --- |
| 133 | DMA |
| 135 | ECC-X |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 211 | LBA |
| 213 | LPN |
| 215 | Logical Offset |
| 221 | Map Info for LPN |
| 223 | Read Unit Address |
| 225 | Length in Read Units |
| 311 | Read Data |
| 313 | First Read Unit |
| 315 | Last Read Unit |
| 401A | Read Unit |
| 401B | Read Unit |
| 410B | Header Marker (HM) |
| 411A | Header 1 |
| 411B | Header 1 |
| 412B | Header 2 |
| 419A | Header N |
| 419B | Header N |
| 421A | Data Bytes |
| 421B | Data Bytes |
| 422B | Data Bytes |
| 429B | Data Bytes |
| 431A | Optional Padding Bytes |
| 431B | Optional Padding Bytes |
| 501 | Header |
| 511 | Type |
| 513 | Last Indicator |
| 515 | Flags |
| 517 | LPN |
| 519 | Length |
| 521 | Offset |
| 600 | I/O Device Command Processing, generally |
| 601 | I/O Device Power Off or Reset State |
| 601A | Activate |
| 611 | I/O Device Initializations |
| 621 | Receive Command? |
| 621N | No |
| 621Y | Yes |
| 631 | Command With or Uses Hint? |
| 631N | No |
| 631Y | Yes |
| 641 | Process Command Using Hint |
| 651 | Process Command (no Hint) |
| 661 | Send Command Status |
| 700 | I/O Device Command Processing, generally |
| 701 | I/O Device Power Off or Reset State |
| 701A | Activate |
| 711 | I/O Device Initializations |
| 721 | Receive Command? |
| 721N | No |
| 721Y | Yes |
| 731 | Command for Hint Mode? |
| 731N | No |
| 731Y | Yes |
| 741 | Enter/Exit Hint Mode |
| 751 | Process Command in Current Mode |
| 761 | Send Command Status |
| 771 | Exit Hint Mode? |
| 771N | No |
| 771Y | Yes |
| 781 | Exit Hint mode |
| 800 | I/O Device Command Processing, generally |
| 801 | I/O Device Power Off or Reset State |
| 801A | Activate |
| 811 | I/O Device Initializations |
| 821 | Receive Command? |
| 821N | No |
| 821Y | Yes |
| 831 | With or Uses Hint? |
| 831N | No |
| 831Y | Yes |
| 832 | Process with Hint in CurrentMode |
| 841 | Enter Hint Mode? |
| 841N | No |
| 841Y | Yes |
| 842 | Enter Particular Hint Mode (CurrentMode += ParticularMode) |
| 851 | Exit Hint Mode? |
| 851N | No |
| 851Y | Yes |
| 852 | Exit Particular Hint Mode (CurrentMode −= ParticularMode) |
| 861 | Exit All Hint Modes? |
| 861N | No |
| 861Y | Yes |
| 862 | Exit All Hint Modes (CurrentMode = DefaultMode) |
| 872 | Process in CurrentMode (no Hint) |
| 881 | Send Status |
| 882 | (optional) Exit Hint Mode(s) |
| 900 | I/O Device Command Processing, generally |
| 901 | I/O Device Power Off or Reset State |
| 901A | Activate |
| 911 | I/O Device Initializations |
| 921 | Transfer Initial Map to Host (optionally in background) |
| 931 | Receive Command? |
| 931N | No |
| 931Y | Yes |
| 941 | Location Provided? |
| 941N | No |
| 941Y | Yes |
| 951 | Determine Location (e.g. by map access) |
| 961 | Process Command |
| 971 | Send Command Status (optionally with map update for write) |
| 981 | Map Update to Send? |
| 981N | No |
| 981Y | Yes |
| 991 | Transfer Map Update(s) to Host (optionally in background) (optionally accumulating multiple updates prior to transfer) |
| 1000 | Host Shadow Map Processing, generally |
| 1001 | I/O Device Power Off or Reset State |
| 1001A | Activate |
| 1011 | Initialize Shadow Map as All Invalid |
| 1021 | Receive Initial Map or Update? |
| 1021N | No |
| 1021Y | Yes |
| 1031 | Update Shadow Map |
| 1100 | Host Command Issuing, generally |
| 1101 | I/O Device Power Off or Reset State |
| 1101A | Activate |
| 1111 | Command? |
| 1111N | No |
| 1111Y | Yes |
| 1121 | Decode Command |
| 1121O | Other |
| 1121R | Read |
| 1121T | Trim |
| 1121W | Write |
| 1131 | Mark LBA in Shadow Map as Invalid |
| 1141 | Mark LBA in Shadow Map as Trimmed |

-continued

| Ref. Symbol | Element Name |
|---|---|
| List of Reference Symbols in Drawings | |
| 1151 | LBA Valid in Shadow Map? |
| 1151N | No |
| 1151Y | Yes |
| 1161 | Issue Command |
| 1171 | Issue Command as Pre-Mapped Read (with location from shadow map) |
| 1200 | I/O Device Sleep Entry/Exit, generally |
| 1201 | I/O Device Power Off or Reset State |
| 1201A | Activate |
| 1211 | I/O Device Initializations |
| 1221 | Active Operating State |
| 1231 | Enter Sleep State? |
| 1231N | No |
| 1231Y | Yes |
| 1241 | Save Internal State in Save/Restore Memory |
| 1251 | Sleep State |
| 1261 | Exit Sleep State? |
| 1261N | No |
| 1261Y | Yes |
| 1271 | Restore Internal State from Save/Restore Memory |
| 1300A | I/O Device and Computing Host Interoperation, generally |
| 1300B | I/O Device and Computing Host Interoperation, generally |
| 1301 | I/O Device Power Off/Sleep or Reset State |
| 1301D | Activate |
| 1301H | Activate |
| 1310A | Host Operations |
| 1310B | Host Operations |
| 1311 | Initialize Shadow Map as All Invalid |
| 1312 | Initialize/Update Shadow Map |
| 1312G | Generate |
| 1313 | Generate Command (optional Hint) |
| 1314R | Reference Shadow Map? |
| 1314RN | No |
| 1314RY | Yes |
| 1314V | Shadow Map Valid Entry? |
| 1314VN | No |
| 1314VY | Yes |
| 1315D | To Device |
| 1315M | Send Command/(Hint) and Shadow Map Info |
| 1315N | Send Command/(Hint) no Shadow Map Info |
| 1315S | Send |
| 1316 | Selectively Modify Shadow Map Info |
| 1319 | Receive Status |
| 1320A | Device Operations |
| 1320B | Device Operations |
| 1321 | I/O Device Initializations and Conditional State Restore from Memory |
| 1322 | Send Local Map (full or updates) to Host |
| 1322C | Command |
| 1322H | To Host |
| 1322S | Sleep |
| 1323 | Receive Sleep Request and State Save to Memory |
| 1325 | Receive Command/(Hint) (and Shadow Map Info) |
| 1326 | Shadow Map Info? |
| 1326N | No |
| 1326U | Not Needed |
| 1326Y | Yes |
| 1327 | Reference Local Map |
| 1328 | Process Command/(Hint) in CurrentMode |
| 1329 | Send Status |
| 1329H | To Host |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AES | Advanced Encryption Standard |
| API | Application Program Interface |
| AHCI | Advanced Host Controller Interface |
| ASCII | American Standard Code for Information Interchange |
| ATA | Advanced Technology Attachment (AT Attachment) |
| BCH | Bose Chaudhuri Hocquenghem |
| BIOS | Basic Input/Output System |
| CD | Compact Disk |
| CF | Compact Flash |
| CMOS | Complementary Metal Oxide Semiconductor |
| CPU | Central Processing Unit |
| CRC | Cyclic Redundancy Check |
| DDR | Double-Data-Rate |
| DES | Data Encryption Standard |
| DMA | Direct Memory Access |
| DNA | Direct NAND Access |
| DRAM | Dynamic Random Access Memory |
| DVD | Digital Versatile/Video Disk |
| ECC | Error-Correcting Code |
| eSATA | external Serial Advanced Technology Attachment |
| FUA | Force Unit Access |
| HBA | Host Bus Adapter |
| HDD | Hard Disk Drive |
| I/O | Input/Output |
| IC | Integrated Circuit |
| IDE | Integrated Drive Electronics |
| JPEG | Joint Photographic Experts Group |
| LAN | Local Area Network |
| LBA | Logical Block Address |

-continued

| Acronym | Description |
|---|---|
| LDPC | Low-Density Parity-Check |
| LPN | Logical Page Number |
| LZ | Lempel-Ziv |
| MLC | Multi-Level Cell |
| MMC | MultiMediaCard |
| MPEG | Moving Picture Experts Group |
| MRAM | Magnetic Random Access Memory |
| NCQ | Native Command Queuing |
| NVM | Non-Volatile Memory |
| OEM | Original Equipment Manufacturer |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| RAID | Redundant Array of Inexpensive/Independent Disks |
| RS | Reed-Solomon |
| RSA | Rivest, Shamir & Adleman |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SLC | Single-Level Cell |
| SMART | Self-Monitoring Analysis and Reporting Technology |
| SPB | Secure Physical Boundary |
| SRAM | Static Random Access Memory |
| SSD | Solid-State Disk/Drive |
| SSP | Software Settings Preservation |
| USB | Universal Serial Bus |
| VF | Virtual Function |
| VPD | Vital Product Data |
| WAN | Wide Area Network |

In some embodiments, an I/O device such as a Solid-State Disk (SSD) is coupled via a host interface to a host computing system, also simply herein termed a host. According to various embodiments, the coupling is via one or more host interfaces including PCIe, SATA, SAS, USB, Ethernet, Fibre Channel, or any other interface suitable for coupling two electronic devices. In further embodiments, the host interface includes an electrical signaling interface and a host protocol. The host protocol defines standard commands for communicating with the I/O device, including commands that send data to and receive data from the I/O device.

The host computing system includes one or more processing elements herein termed a computing host (or sometimes simply a "host"). According to various embodiments, the computing host executes one or more of: supervisory software, such as an operating system and/or a hypervisor; a driver to communicate between the supervisory software and the I/O device; application software; and a BIOS. In further embodiments, some or all or a copy of a portion of the driver is incorporated in one or more of the BIOS, the operating system, the hypervisor, and the application. In still further embodiments, the application is enabled to communicate with the I/O device more directly by sending commands through the driver in a bypass mode, and/or by having direct communication with the I/O device. An example of an application having direct communication with an I/O device is provided by Virtual Functions (VFs) of a PCIe I/O device. The driver communicates with a primary function of the I/O device to globally configure the I/O device, and one or more applications directly communicate with the I/O device via respective virtual functions. The virtual functions enable each of the applications to treat at least a portion of the I/O device as a private I/O device of the application.

The standard commands of the host protocol provide a set of features and capabilities for I/O devices as of a time when the host protocol is standardized. Some I/O devices have features and/or capabilities not supported in the standard host protocol and thus not controllable by a computing host using the standard host protocol. Accordingly, in some embodiments, non-standard features and/or capabilities are added to the host protocol via techniques including one or more of: using reserved command codes; using vendor-specific commands; using reserved fields in existing commands; using bits in certain fields of commands that are unused by the particular I/O device, such as unused address bits; adding new features to capability registers, such as in SATA by a SET FEATURES command; by aggregating and/or fusing commands; and other techniques known in the art. Use of the non-standard features and/or capabilities is optionally in conjunction with use of a non-standard driver and/or an application enabled to communicate with the I/O device.

Herein, a non-standard modifier of a standard command refers to use of any of the techniques above to extend a standard command with non-standard features and/or capabilities not supported in the standard host protocol. In various embodiments, a non-standard modifier (or portion thereof) is termed a hint that is optionally used by or provided with a (standard) command. In a first example, the non-standard modifier is encoded as part of a command in the host protocol, and affects solely that command (e.g. a "once-at-a-time" hint). In a second example, the non-standard modifier is encoded as part of a command in the host protocol and stays in effect on subsequent commands (e.g. a "sticky" hint) unless it is temporarily disabled, such as by another non-standard modifier on one of the subsequent commands, or until it is disabled for all further commands, such as by another non-standard modifier on another command. In a third example, the non-standard modifier is enabled in a configuration register by a mode-setting command, such as in SATA by a SET FEATURES command, and stays in effect until it is explicitly disabled, such as by another mode-setting command. Many combinations and variations of these examples are possible.

According, to various embodiments, the non-standard features and/or capabilities affect one or more of: execution of commands; power and/or performance of commands; treatment and/or processing of data associated with a command; a relationship between multiple commands; a relationship between data of multiple commands; an indication that data of a command is trimmed; an indication that data of a command is uncorrectable; a specification of a type of data of a command; a specification of a data access type for data of a command; a specification of data sequencing for data of multiple commands; a specification of a data relationship among data of multiple commands; any other data value, data type, data sequence, data relationship, data destination, or data property specification; a property of the I/O device, such as power and/or performance; and any other feature and/or capability affecting operation of the I/O device, and/or processing of commands and/or data, and/or storing, retrieval and/or recycling of data.

In some embodiments and/or usage scenarios, a command includes one of a plurality of LBAs, and a map optionally and/or selectively associates the LBA of the command with one of a plurality of entries of the map. Each of the entries of the map includes a location in an NVM of the I/O device and/or an indication that data associated with the LBA is not present in (e.g. unallocated, de-allocated, deleted, or trimmed from) the NVM. According to various embodiments, in response to receiving the command, the I/O device one or more of: accesses the entry of the map associated with the LBA; stores an indication of a non-standard modifier of the command in the entry of the map associated with the LBA; retrieves an indication of a non-standard modifier of a prior command from the entry of the map associated with the LBA; and other operations performed by an I/O device in response to receiving the command. Storing and/or retrieving a non-standard modifier from an entry of the map enables effects of the non-standard modifier to be associated with specific ones of the LBAs and/or to be persistent across multiple commands. For example, a command includes a particular non-standard modifier specifying a data destination that is a fixed one of a plurality of data bands. In addition to storing data of the command in the specified fixed data band, an indication of the particular non-standard modifier is stored in an entry of the map associated with an LBA of the command. Subsequent recycling of the data of the command is enabled to access the entry of the map associated with the LBA of the command, and according to the indication of the particular non-standard modifier, to cause the recycling to recycle the data back to the specified fixed data band.

Examples of a non-standard modifier that specifies a type of data include specification of a compressibility of data, such as incompressible, or specification of a usage model of the data, such as usage as a database journal. In some instances, data identified (e.g. by the I/O device and/or the host) to be of a particular type (such as via the specification or a previously provided specification that has been recorded in the map) is optionally and/or selectively processed more efficiently by the I/O device. In some usage scenarios, for example, data identified to be of a database journal type is optionally and/or selectively stored in a database journal one of a plurality of data bands, the database journal data band reserved for the database journal type of data. In various embodiments, the database journal data band is of a fixed size, and when full, the oldest data in the database journal data band is optionally and/or selectively automatically deleted.

Examples of a non-standard modifier that specifies a data access type include specification of a read/write access type, specification of a read-mostly access type, specification of a write-mostly access type, specification of a write-once (also known as read-only) access type, and specification of a transient access type. In some instances, data identified (e.g. by the I/O device and/or the host) to have a particular access type (such as via the specification or a previously provided specification that has been recorded in the map) is optionally and/or selectively processed more efficiently by the I/O device. In a first example, identifying a relative frequency with which data is read or written optionally and/or selectively enables the I/O device to advantageously store the data in a manner and/or in a location to more efficiently enable writing of, access to, reading of, and/or recycling of the data. In a second example, standard write access to data that is identified by the I/O device to be write-once is optionally and/or selectively treated as an error.

In some embodiments, the specification of a transient access type enables data to be stored by the I/O device, and further optionally and/or selectively enables the I/O device to delete and/or trim (e.g. "auto-trim") the data without having received a command from the computing host to do so. For example, identifying that a particular portion of storage is transient optionally and/or selectively enables the I/O device to trim the portion of storage rather than recycling it. According to various embodiments, subsequent access by a computing host to transient data that has been deleted or trimmed by the I/O device returns one or more of: an indication that the data has been deleted or trimmed; an craw indication; data containing a specific pattern and/or value; and any other indication to the computing that the data has been deleted or trimmed by the I/O device.

In various embodiments, a specification of a transient-after-reset access type enables data to be stored by the I/O device, and further optionally and/or selectively enables the I/O device to delete and/or trim (e.g. auto-trim) the data without having received a command from the computing host to do so, but solely after a subsequent power-cycle and/or reset of the I/O device and/or of a system including the I/O device. For example, certain operating system data, such as page files, and/or certain application data, such as data of a memcached application, are invalid after a power-cycle and/or reset of the system. In some embodiments, an indication of the transient-after-reset access type includes a counter, such as a two-bit counter. A value of a global counter is used to initialize the counter of the indication of the transient-after-reset access type. The global counter is incremented on each power-cycle and/or reset of the I/O device and/or the system. A particular portion of storage, such as a portion of an NVM of the I/O device, having the indication of the transient-after-reset access type is selectively trimmed when processing the particular portion of storage for recycling according to whether the counter of the indication of the transient-after-reset access type matches the global counter. In yet further embodiments, there are multiple global counters, each of the global counters is optionally and/or selectively independently incremented, and the indication of the transient-after-reset access type further includes a specification of a respective one of the global counters. Techniques other than counters, such as bit masks or fixed values, are used in various embodiments to distinguish whether the particular portion of storage is to be selectively trimmed when recycled.

Instill further embodiments, the indication of the power-cycle and/or reset is a signal provided from the computing host to indicate that a portion of storage having an indication of a transient-after-reset access type is enabled to be trimmed when the portion of storage is subsequently processed for recycling. In a first example, in an environment with virtual machines, the signal provided from the computing host is an indication of a reset and/or termination of a virtual machine. In a second example, with a memcached application, the signal provided from the computing host is an indication of a reset and/or termination of the memcached application. In a third example, the indication of the power-cycle and/or reset is a function-level reset of a virtual function of the I/O device. In some usage scenarios, only portions of an NVM of the I/O device associated with the virtual function, such as a particular range of LBAs, are affected by the function-level reset.

Examples of a non-standard modifier that specifies a data sequencing include specification of a sequential data sequencing, and specification of an atomic data sequencing. In some instances, data identified (e.g. by the I/O device and/or the host) to be of a particular data sequencing (such as via the specification or a previously provided specification that has been recorded in the map) is optionally and/or selectively processed more efficiently by the I/O device. In a first example, identifying that data belongs to a sequential data sequencing optionally and/or selectively enables the I/O device to advantageously store the data in a manner and/or in a location to more efficiently enable writing of, access to, reading of, and/or recycling of the data. In a second example, identifying that data belongs to an atomic data sequencing optionally and/or selectively enables the I/O device to advantageously treat data of the atomic data sequencing as a unit and guarantee that the either all or none of the data of the atomic data sequencing are successfully written as observable by the computing host. In some embodiments, writing an atomic sequence of data includes writing meta-data, such as log information, indicating a start and/or an end of the sequence.

Examples of a non-standard modifier that specifies a data relationship include specification of a read and/or a write association between multiple items of data. In some instances, data identified (e.g. by the I/O device and/or the host) to be of a particular data relationship (such as via the specification or a previously provided specification that has been recorded in the map) is optionally and/or selectively processed more efficiently by the I/O device. For example, identifying a read data relationship between two items of data optionally and/or selectively enables the I/O device to advantageously prefetch a second one of the items of data when a first one of the items of data is read. In some usages examples and/or scenarios, the first item of data is a label of a file in a file system, and the second item of data is a corresponding extent of the file. According to various embodiments, a data relationship is one or more of: one-to-one; one-to-many; many-to-one; many-to-many; a different data relationship for different commands, such as different for a read command as compared to a write command; and any other relationship among items of data.

Examples of a non-standard modifier that specifics a data destination include a specification of a particular portion of NVM (such as a particular flash storage element or collection of flash storage elements, e.g. to provide for spreading data among elements of the NVM), a specification of a hierarchical storage tier, a specification of a type of storage, and a specification of one of a plurality of data bands. In some instances, data identified (e.g. by the I/O device and/or the host) to be of a particular data destination (such as via the specification or a previously provided specification that has been recorded in the map) is optionally and/or selectively processed more efficiently by the I/O device. In a first example, identifying that data is preferentially stored in a specified type of storage optionally and/or selectively enables the I/O device to advantageously store the data in one of a plurality of memories of different characteristics, such as SLC flash vs. MLC flash, such as flash vs. MRAM, or such as volatile memory vs. NVM. The different characteristics of the memories include one or more of: volatility; performance such as access time, latency, and/or bandwidth; read, write, or erase time; power; reliability; longevity; lower-level error correction and/or redundancy capability; higher-level error correction and/or redundancy capability; and other memory characteristics. In a second example, identifying that data is to be stored in a specified one of a plurality of data bands optionally and/or selectively enables the I/O device to advantageously store the data in the specified data band to improve one or more of: write speed; recycling speed; recycling frequency; write amplification; and other characteristics of data storage.

Examples of a non-standard modifier that specifies a command relationship include specification of a command priority imposing a preferred or required relative order among commands, and specification of a command barrier imposing a boundary between commands of at least some types. For example, a write command barrier type of command barrier is permeable to read commands but impermeable to write commands, enabling the write command barrier to ensure that all previously submitted write commands complete prior to completion of the write command barrier.

An example of an aggregated and/or fused command is a combination of two or more commands treated as a unit and either not executed or executed as a whole. For example, non-standard modifiers specify a start, a continuation, or an end of a fused command sequence. Commands of the fused command sequence are executed in an atomic manner such that unless all of the commands complete successfully, none of the effects of any of the commands are visible. An example of a fused command sequence is a compare-write sequence where effects of a subsequent write command are only visible if a preceding compare command succeeded, such as by the comparison being equal. According to various embodiments, commands of a fused command sequence are executed one or more of: sequentially; in parallel; in an order determined by ordering rules of the host protocol; in an order in which the commands are received by the I/O device; and in any order.

In some embodiments, an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

According to various embodiments, the map is one or more of: a one-level map; a two-level map; a multi-level map; a direct map; an associative map; and any other means of associating the LBAs of the host protocol with the physical storage addresses in the NVM. For example, in some embodiments, a two-level map includes a first-level map that associates a first function of an LBA with a respective address in the NVM of one of a plurality of second-level map pages, and each of the second-level map pages associates a second function of the LBA with a respective address in the NVM of data corresponding to the LBA. In further embodiments, an example of the first function of the LBA and the second function of the LBA are a quotient and a remainder obtained when dividing by a fixed number of entries included in each of the second-level map pages. The plurality of second-level map pages is collectively termed a second-level map. Herein, references to one or more entries of a map refers to one or more entries of any type of map, including a one-level map, a first-level of a two-level map, a second-level of a two-level map, any level of a multi-level map, or any other type of map having entries.

According to various embodiments, each of the map pages of a second-level map (or a lower-level of a multi-level map) one or more of: includes a same number of entries as others of the map pages; includes a different number of entries than at least some others of the map pages; includes entries of a same granularity as others of the map pages; includes entries of a different granularity than others of the map pages; includes entries that are all of a same granularity; includes entries that are of multiple granularities; includes a respective header specifying a format and/or layout of contents of the map page; and has any other format, layout, or organization to represent entries of the map page. For example, a first second-level map page has a specification of a granularity of 4 KB per entry, and a second second-level map page has a specification of a granularity of 8 KB per entry and only one half as many entries as the first second-level map page.

In further embodiments, entries of a higher-level map include the format and/or layout information of the corresponding lower-level map pages. For example, each of the entries in a first-level map includes a granularity specification for entries in the associated second-level map page.

In some embodiments, the map includes a plurality of entries, each of the entries associating one or more LBAs with information selectively including a respective location in the NVM where data of the LBAs is stored. For example, LBAs specify 512B sectors, and each entry in the map is associated with an aligned eight-sector (4 KB) region of the LBAs.

According to various embodiments, the information of the entries of the map includes one or more of: a location in the NVM; an address of a read unit in the NVM; a number of read units to read to obtain data of associate LBAs stored in the NVM; a size of the data of the associated LBAs stored in the NVM, the size having a granularity that is optionally and/or selectively larger than one byte; an indication that the data of the associated LBAs is not present in the NVM, such as due to the data of the associated LBAs being trimmed; a property of the data of the associated LBAs, including any non-standard modifiers applied to the data of the associated LBAs; and any other meta-data, property, or nature of the data of the associated LBAs.

In some embodiments, addresses in the NVM are grouped into regions to reduce a number of bits required to represent one of the addresses. For example, if LBAs of the I/O device are divided into 64 regions, and the NVM is divided into 64 regions, one for each of the LBA regions, then a map entry associated with a particular LBA requires six fewer address bits since one of the regions in the NVM is able to be determined by the region of the particular LBA. According to various embodiments, an association between regions of the LBAs and regions of the NVM is by one or more of: equality; a direct association, such as 1-to-1 numeric function; a table look-up; a dynamic mapping; and any, other method for associating two sets of numbers.

In various embodiments, the location in the NVM includes an address of one of a plurality of read units, and a length and/or a span in read units. The length is a size of a particular one of a plurality of data items stored in the NVM, the particular data item associated with the entry of the map including the length. According to various embodiments, the length has a granularity of one or more of: one byte; more than one byte; one read unit; a specified fraction of a read unit; a granularity according to a maximum allowed compression rate of one of the data items; and any other granularity used to track storage usage. The Span is a number of reads units, such as an integer number of read units, storing a respective portion of the particular data item. In further embodiments and/or usage scenarios, a first read unit in the span of read units and/or a last read unit in the span of read units optionally and/or selectively store some or all of multiple ones of the data items. In some embodiments and/or usage scenarios, the length and/or the span are stored encoded, such as by storing the length (sometimes termed size in a context with length and/or span encoded) as an offset from the span. In some embodiments and/or usage scenarios, unused encodings of the length and/or the span encode additional information, such as an indication of a non-standard modifier, or such as an indication as to whether an associated data item is present in the NVM.

Encoding the location in the NVM as an address and a length enables data stored in the NVM to vary in size. For example, a first 4 KB region is compressed to 400B in size, is stored entirely in a single read unit, and has a length of one read unit, whereas a second 4 KB region is incompressible, spans more than one read unit, and has a length more than one read unit. In further embodiments, having a length and/or span in read units of storage associated with a region of the LBAs enables reading solely a required portion of the NVM to retrieve data of the region of the LBAs.

In some embodiments, each of the entries of the map includes information, sometimes termed meta-data, specifying properties of a region of the LBAs associated with the entry. In further embodiments, at least some of the meta-data is of a granularity finer than that of the region, such as by having separate meta-data specifications for each of a plurality of LBAs of the region. According to various embodiments, the meta-data includes one or more non-standard modifiers applicable to and/or to be used to modify and/or control writing of, access to, reading of, and/or recycling of data in the NVM associated with the region.

As one example of storing meta-data in an entry of a map in response to a non-standard modifier of a command, an extended write command includes an LBA and a non-standard modifier specifying that data of the write command is transient. Data of the write command is stored in the NVM, and a particular entry of the map associated with the LBA is updated to include a location in the NVM of the data of the write command and an indication of the transient specification of the data associated with the LBA. A subsequent operation, such as a subsequent command or an internal operation such as recycling, accessing the particular entry of the map, is enabled to determine the indication of the transient specification of the data associated with the LBA, and to execute differently if the indication of the transient specification of the data associated with the LBA is present. For example, recycling of an LBA having the indication of the transient specification of the data associated with the LBA is, in some embodiments, enabled to trim the data associated with the LBA rather than recycling the data associated with the LBA.

In some embodiments, the I/O device includes an external memory, such as a DRAM, and the external memory is directly coupled to an element of the I/O device, such as via a DDR2 or DDR3 interface. According to various embodiments, the external memory is used one or more of: to store some or all of a map of the I/O device; to store one or more of the levels of a multi-level map of the I/O device; to buffer write data sent to the I/O device; to store internal state of the I/O device; and any other memory storage of the I/O device. For example, the external memory is used to provide access to the map, but, if the external memory is volatile, updates are selectively stored to the map in NVM. In various embodiments and/or usage scenarios, the updates are optionally, conditionally, and/or selectively stored immediately and/or delayed. In further embodiments and/or usage scenarios, all of the updates are stored. In other embodiments and/or usage scenarios, some of the updates are not stored (e.g. due to an older update being superseded by a younger update before storing the older update, or recovery techniques that enable omitting storing of one or more of the updates). According to various embodiments, the external memory one or more of: is an SRAM; is a DRAM; is an MRAM or other NVM; has a DDR interface; has a DDR2 or DDR3 interface; has any other memory interface; and is any other volatile or non-volatile external memory device.

In other embodiments, such as some embodiments having a multi-level map, a lower level of the map is stored in an NVM of the I/O device along with data from the computing host, such as data associated with LBAs of the I/O device, and the I/O device optionally and/or selectively does not utilize a directly-coupled DRAM. Access to an entry of the lower level of the map is performed, at least some of the time, using the NVM.

In some embodiments, a shadow copy of the map is stored in a memory of the computing host. In various embodiments, the I/O device stores information, such as the shadow copy of the map or such as internal state, in the memory of the computing host. According to various embodiments, the memory of the computing host is one or more of: a main memory of the computing host, such as a DRAM memory coupled to a processor; a system-accessible memory of the computing host; an I/O space memory of the computing host; a PCIe-addressable memory of the computing host; a volatile memory, such as a DRAM memory or an SRAM memory; an NVM, such as a flash memory or an MRAM memory; any memory that is accessible by the I/O device and is not directly coupled to the I/O device; and any memory that is accessible by both the I/O device and the computing host.

According to various embodiments, the shadow copy of the map includes one or more of: at least some of the entries of the map; all of the entries of the map; entries that include a subset of corresponding entries of the map; entries that include information according to corresponding entries of the map; entries that include a valid indication and/or other information, the valid indication and/or other information not present in entries of the map; only entries corresponding to entries of the second level of a two-level map; only entries corresponding to entries of the lowest level of a multi-level map; a page structure corresponding to a page structure of the map, such as a page structure corresponding to second-level pages of a two-level map; and any structure that is logically consistent with the map.

In further embodiments, the shadow copy of the map has one or more of: entries with a same format as corresponding entries of the map; entries with a similar format as corresponding entries of the map; and entries with a different format than corresponding entries of the map. In a first example, second-level pages of a two-level map are stored in a compressed format in an NVM, and a shadow copy of the second-level of the map is stored in an uncompressed format. In a second example, each of a plurality of portions of a shadow copy of a map, the portions including one or more of entries of the shadow copy of the map, has a valid indication not present in the map. The valid indication enables the portions to be independently initialized and/or updated. In a third example, each of the entries of the shadow copy of the map has information not present in the map indicating in which of one or more storage tiers data of LBAs associated with the entry are present. In a fourth example, each of the entries of the map has information not present in the shadow copy of the map indicating an archive state of data of LBAs associated with the entry. In a fifth example, the shadow copy of the map and/or the map are enabled to indicate a storage tier of data of LBAs associated with entries. In a sixth example, the shadow copy of the map and/or the map include one or more bits per entry that are readable and/or writable by the host. In a seventh example, each of the entries of the map includes a respective length and a respective span, and each of the corresponding entries of the shadow copy of the map includes the respective span and does not include the respective length.

In some embodiments, at a reset event, such as power-on, or reset of the I/O device, an initial shadow copy of the map is stored in the memory of the computing host. According to various embodiments, the initial shadow copy of the map is one or more of: all invalid; a copy of the map; a copy of one or more levels of a multi-level map; a copy of at least a portion of the nap, such as a portion identified as being used initially; and in any state that is consistent with the map. In further embodiments, the shadow copy of the map is updated dynamically as LBAs are referenced. In a first example, an entry in the shadow copy of the map corresponding to an LBA is updated from an initial state when the LBA is first accessed. In a second example, a portion of the shadow copy of the map corresponding to an LBA is updated from an initial state when the LBA is first accessed. Continuing the example, the portion includes a plurality of entries of the shadow copy of the map, such as the entries corresponding to a second-level map page that contains an entry associated with the LBA.

In some embodiments, each of one or more commands received by the I/O device enable the I/O device to update the map as at least a portion of execution of the command. The one or more commands are herein termed map-updating commands. According to various embodiments, the map-updating commands include one or more of: a write command; a trim command; a command to invalidate at least a portion of the map; and any other command enabled to modify the map.

In some embodiments, a map-updating command, such as a write command, includes an LBA, and invalidates an entry in the shadow copy of the map corresponding to the LBA. According to various embodiments, one or more of: the invalidation is performed by the computing host when issuing the map-updating command; the invalidation is performed by the I/O device when receiving and/or executing the map-updating command; the invalidation includes turning off a valid indication in the entry in the shadow copy of the map corresponding to the LBA; and the invalidation includes turning off a valid indication in a portion of the shadow copy of the map, the portion including a plurality of entries of the shadow copy of the map including the entry corresponding to the LBA. Invalidating the entry in the shadow copy of the map corresponding to the LBA of the map-updating command in response to the map-updating command enables subsequent accesses to the entry in the shadow copy of the map to determine that information of the entry in the shadow copy of the map is invalid.

In some embodiments and/or usage scenarios, a write command received by the I/O device enables data of the write command to be written to an NVM of the I/O device. The I/O device determines a location in the NVM where the data of the write command is written and updates an entry in the map associated with an LBA of the write command to include the location in the NVM. In further embodiments, the shadow copy of the map in the memory of the computing host is also updated so that an entry in the shadow copy of the map associated with the LBA of the write command includes the location in the NVM.

In some embodiments and/or usage scenarios, in response to receiving a trim command, the I/O device updates an entry in the map associated with an LBA of the trim command to include an indication that data associated with the LBA is not present in the NVM. In further embodiments, the shadow copy of the map in the memory of the computing host is also updated so that an entry in the shadow copy of the map associated with the LBA of the trim command includes the indication that data associated with the LBA is not present in the NVM.

According to various embodiments, the updating of the shadow copy of the map is performed by one or more of: the computing host, in response to issuing certain types of commands, such as map-updating commands; the computing host, in response to receiving updated information from the I/O device; the computing host, in response to polling the I/O device for recent updates and receiving a response with updated information; the I/O device by accessing the shadow copy of the map in the memory of the computing host, such as by accessing the shadow copy of the map in a PCIe address space; and another agent of a system including the computing host and the I/O device. The updated information includes information according to at least some contents of one or more entries of the map and/or an indication of the one or more entries, such as respective LBAs associated with the one or more entries. In various embodiments, the updated information is communicated in any format or by any techniques that communicate information between one or more I/O devices and one or more computing hosts. In a first example, using a SATA host protocol, the updated information is communicated in a log page readable by the computing host. In a second example, using a PCIe-based host protocol, such as NVM Express, the updated information is communicated at least in part by the I/O device writing a region in the memory of the computing host and informing the computing host with an interrupt.

In some embodiments, the entry in the map associated with the LBA of the map-updating command further includes information specifying a length and/or a span of the data associated with the LBA and stored in the NVM, as the length and/or the span of the data associated with the LBA and stored in the NVM varies depending on compressibility of the data. In further embodiments, the entry in the shadow copy of the map associated with the LBA of the map-updating command optionally and/or selectively further includes the length and/or the span of the data associated with the LBA and stored in the NVM. According to various embodiments, the length and/or the span of the data associated with the LBA and stored in the NVM are optionally and/or selectively additionally enabled to encode one or more of: an indication that some and/or all of the data associated with the LBA is trimmed; an indication that some and/or all of the data associated with the LBA is uncorrectable; and any other property of some and/or all of the data associated with the LBA.

In some embodiments and/or usage scenarios, storing the length of the data associated with the LBA and stored in the NVM in the entry in the shadow copy of the map associated with the LBA of the map-updating command enables usage of the shadow copy of the map to provide the length of the data associated with the LBA and stored in the NVM in a subsequent map-updating command, such as when over-writing data of the LBA of the map-updating command. The length of the data associated with the LBA and stored in the NVM is used to adjust used space statistics in a region of the NVM containing the data of the LBA of the map-updating command when over-writing the data of the LBA of the map-updating command by the subsequent map-updating command. For example, a used space statistic for the region of the NVM containing the data of the LBA of the map-updating command is decremented by the length of the data associated with the LBA and stored in the NVM when over-writing the data of the LBA of the map-updating command by the subsequent map-updating command.

In some embodiments, a read request, such as a read command requesting data at an LBA, is enabled to access an entry in the shadow copy of the map corresponding to the LBA. According to various embodiments, one or more of: the access is performed by the computing host when issuing the read command; the access is performed by the I/O device when receiving and/or executing the read command; and the access includes reading at least a portion of the entry in the shadow copy of the map corresponding to the LBA. Accessing the entry in the shadow copy of the map corresponding to the LBA of the read command provides information according to a corresponding entry of the map without a need to access the map. In some embodiments and/or usage scenarios where the map, such as a lower level of a multi-level map, is stored in the NVM of the I/O device, access to the shadow copy of the map has a shorter latency and advantageously improves latency to access the data at the LBA.

In some embodiments, in response to a read request to read data corresponding to a particular LBA from the I/O device, the computing host reads at least a portion of an entry of the shadow copy of the map, the entry of the shadow copy of the map corresponding to the particular LBA. The computing host sends a pre-mapped read command to the I/O device, the pre-mapped read command including information of the entry of the shadow copy of the map, such as a location in the NVM of the I/O device. In various embodiments, the pre-mapped read command does not provide the particular LBA. In further embodiments and/or usage scenarios, the location in the NVM includes a respective span in the NVM.

In some embodiments, in response to a read request to read data corresponding to a particular LBA from the I/O device, the computing host is enabled to read at least a portion of an entry of the shadow copy of the map, the entry of the shadow copy of the map corresponding to the particular LBA. If the entry of the shadow copy of the map is not valid, such as indicated by a valid indication, the computing host sends a read command to the I/O device, the read command including the particular LBA. If the entry of the shadow copy of the map is valid, such as indicated by a valid indication, the computing host sends a pre-mapped read command to the I/O device, the pre-mapped read command including information of the entry of the shadow copy of the map, such as a location in the NVM of the I/O device. In various embodiments, the pre-mapped read command does not provide the particular LBA. In further embodiments and/or usage scenarios, the location in the NVM includes a respective span in the NVM.

In some embodiments, in response to the I/O device receiving a pre-mapped read command including a location in the NVM of the I/O device, the I/O device is enabled to access the NVM at the location to obtain read data. The I/O device omits accessing the map in response to receiving the pre-mapped read command. The read data and/or a processed version thereof is returned in response to the pre-mapped read command.

In some embodiments, in response to the I/O device receiving a read command to read data from the I/O device corresponding to a particular LBA, the I/O device is enabled to read at least a portion of an entry of the shadow copy of the map, the entry of the shadow copy of the map corresponding to the particular LBA. The I/O device obtains a location in the NVM corresponding to the data of the particular LBA from the entry of the shadow copy of the map without accessing the map. The I/O device accesses the NVM at the location in the NVM to obtain read data. The read data and/or a processed version thereof is returned in response to the read command.

In some embodiments, in response to receiving a read command to read data from the I/O device corresponding to a particular LBA, the I/O device is enabled to read at least a portion of an entry of the shadow copy of the map, the entry of the shadow copy of the map corresponding to the particular LBA. If the entry of the shadow copy of the map is not valid, such as indicated by a valid indication, the I/O device accesses the map to determine a location in the NVM corresponding to the data of the particular LBA. If the entry of the shadow copy of the map is valid, such as indicated by a valid indication, the I/O device obtains the location in the NVM corresponding to the data of the particular LBA from the entry of the shadow copy of the map without accessing the map. The I/O device accesses the NVM at the location in the NVM to obtain read data; The read data and/or a processed version is returned in response to the read command.

In further embodiments and/or usage scenarios, including variants of the above embodiments, the location in the NVM of the I/O device optionally and/or selectively is enabled to encode an indication of whether data corresponding to the particular LBA is present in the NVM of the I/O device. For example, data that has been trimmed or data that has never been written since the I/O device was formatted are not present in the NVM of the I/O device.

In variants where the computing host determines the location in the NVM as a part of attempting to read data from the I/O device, such as by accessing the shadow copy of the map, the computing host is enabled to determine, without sending a command to the I/O device, that data corresponding to the particular LBA is not present in the NVM of the I/O device. According to various embodiments, one or more of: the computing host returns a response to the read request without sending a command to the I/O device; the computing host sends a command to the I/O device including the particular LBA; and the computing host sends a command to the I/O device including information obtained from the entry of the shadow copy of the map corresponding to the particular LBA.

In variants where the I/O device determines the location in the NVM as a part of executing the read command, such as by accessing the shadow copy of the map, the I/O device is enabled to return a response to the read command without accessing the NVM to obtain the read data.

In some embodiments, the I/O device is enabled to use the shadow copy of the map when recycling a region of the NVM. Recycling is enabled to determine, via entries of the shadow copy of the map, whether data read from the region of the NVM for recycling is still valid, such as by being up-to-date in one of the entries of the shadow copy of the map. In various embodiments, data that is up-to-date is optionally and/or selectively recycled by writing the data to a new location in the NVM and updating an entry of the map to specify the new location. According to various embodiments, a corresponding one of the entries of the shadow copy of the map is either invalidated or is updated with the new location. In further embodiments, data read from the NVM at a particular location in the NVM is up-to-date if a header associated with the data and read from the NVM includes at least a portion of an LBA, and an entry in the shadow copy of the map associated with the at least a portion of an LBA includes the particular location in the NVM.

In some embodiments, the invalidating or the updating is in response to the writing associated with the recycling (e.g. relatively soon after the writing). In other embodiments, the invalidating or the updating is in response to the I/O device erasing (or alternatively preparing to case) the region (e.g. arbitrarily long after the writing has occurred). In some embodiments providing for auto-trim of data, recycling includes auto-trimming where the up-to-date data is marked as trimmed in the map, rather than written to a new location. As the computing host is enabled to receive either data or an indication of data trimming, in various embodiments and/or usage scenarios, the up-to-date data is provided (even though trimmed) or alternatively an indication of trimming is provided, enabling use of the shadow copy of the map irrespective of whether recycling-related updates are performed in response to writing or in response to erasing.

For example, the I/O device communicates to the computing host updates of a list of second-level map entries and/or map portions (such as second-level map pages) that have been updated by the recycling. The communicating is via any one or more of a log message, reserved LBA space, or any technique suitable for providing map information. The updates optionally and/or selectively indicate invalidation of one or more entries of the shadow copy of the map, and/or include one or more new values for affected entries of the shadow copy of the map. The I/O device notifies the computing host that the updates are available by one or more of: a reserved bit in command status, a reserved bit in any one or more types of responses from the I/O device to the computing host, an error report, an interrupt, and other techniques for communicating between an I/O device and a computing host. In some usage scenarios, erasing of the data referenced by the updated second-level map entries is dependent on receiving an acknowledgment from the computing host that the updating has been applied (e.g. to the shadow copy of the map).

In various embodiments, the shadow copy of the map includes one or more error detection codes, such as a CRC or a checksum. Each of the error detection codes protects a respective portion including one or more entries of the shadow copy of the map. For example, in some embodiments, the respective portion corresponds to a second-level map page. According to various embodiments, integrity of one of the respective portions is verified by one or more of: recomputing and verifying the error detection code associated with the respective portion; comparing the error detection code associated with the respective portion with an error detection code computed according to a corresponding portion of the map; and directly verifying the respective portion with a corresponding portion of the map. According to various embodiments, integrity of one of the respective portions is verified one or more of: after every reset and/or power-cycle of the I/O device and/or of a system including the I/O device; after the I/O device and/or a system including the I/O device exits a low-power and/or a sleep state (e.g. a lower-power operating state); after a specified interval; and periodically according to a specified frequency.

In some embodiments, the I/O device is enabled to use the memory of the computing host to save state of the I/O device. According to various embodiments, the state of the I/O device includes one or more of; the shadow copy of the map; a cache of the map of the I/O device; a cache of one or more levels of a multi-level map of the I/O device; a first level of a two-level map of the I/O device; an upper level of a multi-level map of the I/O device; volatile state of the I/O device; statistics maintained by the I/O device, such as statistics according to access of and/or behavior of the NVM; internal state of the I/O device that is lost when the I/O device enters a low-power state; and any other state of the I/O device. In various embodiments, all or any portions of the saved state of the I/O device is optionally and/or selectively encrypted when saved, and decrypted when restored.

In some embodiments, an I/O device operating in a normal mode (e.g. a higher-power operating state) is enabled to determine to enter a low-power and/or a sleep state (e.g. a lower-power operating state), such as in response to receiving a request to enter the low-power state or in response to a period of inactivity of the I/O device and according to configuration settings of the I/O device. In response to determining to enter the low-power state, the I/O device is enabled to save at least a first portion of the state of the I/O device in the memory of the computing host. The I/O device is then enabled to enter the low-power state, and the at least a first portion of the state of the I/O device is lost, such as by power to at least a portion of the I/O device being removed. Subsequently, the I/O device is enabled to determine to exit the low-power state, such as by receiving a request to exit the low-power state. In response to determining to exit the low-power state, the I/O device is enabled to exit the low-power state. The I/O device is then enabled to restore the at least a first portion of the state of the I/O device from the memory of the computing host, and to resume operating in the normal mode. According to Various embodiments, the low-power state is one or more of: a standby state; a sleep state; a hibernate state; an idle state; and any state in a power-management protocol of the I/O device.

In further embodiments, in response to determining to enter the low-power state, at least a second portion of the state of the I/O device is saved in the NVM of the I/O device. In still further embodiments, in response to determining to exit the low-power state, the I/O device is enabled to restore at least a third portion of the state of the I/O device from the NVM. For example, in some usage scenarios, the at least a first portion of the state of the I/O device includes a first-level map, the at least a second portion of the state of the I/O device includes a checkpoint of the state of the I/O device, the at least a third portion of the state of the I/O device includes executable code of a processor of the I/O device.

In various embodiments, an I/O storage device is enabled to compute one or more non-standard statistics. Examples of the non-standard statistics are storage usage, storage usage percentage, write amplification, and size and/or usage of one or more bands of non-volatile storage of the I/O storage device. In some embodiments and/usage scenarios, data to be written to an NVM implementing at least a portion of storage of the I/O storage device is reduced in size prior to writing in the NVM. Other examples of the non-standard statistics are storage usage and/or storage usage percentage based at least in part on the size reduction and/or a prediction of future size reduction based on past and/or current size reductions. In response to receiving a command (e.g. from a computing host) requesting return of a non-standard statistic value, an I/O storage device returns the requested non-standard statistic (e.g. to the computing host). Results of the computing (e.g. all or any portions of one or more of the non-standard statistics) are optionally affected by any reduction in size. The size reduction is via, for example, compression and/or data de-duplication. In some embodiments and/or usage scenarios, one or more of the non-standard statistics (e.g. storage usage, such as usage of the NVM) varies according to one or more of: quality of the size reduction, a number and/or a size of trim commands (such as received from the computing host), an amount of transient data received (such as from the computing host), and an amount of transient data that has been trimmed (such as by the I/O storage device). In some embodiments and/or usage scenarios, one or more of the non-standard statistics (such as usage of the bands) varies according to quality of the size reduction.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header (s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a PC, a laptop computer, a notebook computer, a netbook computer, a PDA, a media player, a media recorder, a digital camera, a cellular handset, a cordless telephone handset, and an electronic game. In some embodiments, an interfacing host (such as a SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis code, and zero or more LDPC codes.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC1) A method comprising:
at an I/O device, receiving an extended command comprising a standard command and a specification of a non-standard modifier;
executing the standard command according to the non-standard modifier; and
whereby system-level performance is improved due to usage of the non-standard modifier to modify the executing of the standard command.

EC2) A method comprising:
at an I/O device, receiving a mode-setting command comprising a specification to enable a non-standard modifier;
at the I/O device, receiving a standard command;
executing the standard command according to the non-standard modifier; and
whereby system-level performance is improved due to usage of the non-standard modifier to modify the executing of the standard command.

EC3) The method of any one of EC1 or EC2, further comprising:
associating the non-standard modifier with data of the standard command.

EC4) The method of EC3, further comprising:
storing an indication of the non-standard modifier for later retrieval with the data of the standard command.

EC5) The method of EC4, wherein the storing is non-volatile.

EC6) The method of EC4, further comprising:
storing the indication of the non-standard modifier in a particular one of a plurality of entries of a map, the particular entry associated with the data of the standard command by a Logical Block Address (LBA) of the standard command.

EC7) The method of EC4, wherein the standard command is a write command, and further comprising:
in response to a subsequent read command specifying access to the data of the write command, modifying execution of the subsequent read command according to the indication of the non-standard modifier.

EC8) The method of EC4, wherein the standard command is a first command, and further comprising:
in response to a subsequent command specifying access to the data of the first command, modifying execution of the subsequent command according to the indication of the non-standard modifier.

EC9) The method of EC8,
wherein the first command is a write command;
wherein the non-standard modifier comprises an indication that the data of the write command is read-only; and
wherein the modifying execution of the subsequent command comprises returning an error indication if the subsequent command is a standard write command.

EC10) The method of EC4, wherein the standard command is a write command, and further comprising:
determining that the data of the write command is to be recycled;
accessing the indication of the non-standard modifier;
in response to the indication of the non-standard modifier, trimming the data of the write command; and
whereby the data of the write command is trimmed rather than recycled.

EC11) The method of any one of EC1 or EC2, wherein the standard command is a read command.

EC12) The method of any one of EC1 or EC2, wherein the standard command is one of a read command or a write command.

EC13) The method of any one of EC1 or EC2, wherein the standard command is a data movement command.

EC14) The method of any one of EC1 or EC2, wherein the standard command is a trim command.

EC15) The method of EC14, wherein the non-standard modifier selectively determines whether the trim command is mandatory or optional.

EC16) The method of any one of EC1 or EC2, wherein the non-standard modifier is, at least in part, specified by a reserved field of the standard command.

EC17) The method of any one of EC1 or EC2, wherein the non-standard modifier is, at least in part, specified by at least some of a plurality of address bits of the standard command.

EC18) The method of EC17, wherein the at least some of the address bits are otherwise unused by the I/O device.

EC19) The method of any one of EC1 or EC2, wherein the non-standard modifier is one or more of:
a specification of a type of data;
a specification of a data access type;
a specification of data sequencing;
a specification of a data relationship;
a specification of a data destination; and
a specification of a command relationship.

EC20) The method of EC19, wherein the specification of the type of data comprises a compressibility indication.

EC21) The method of EC20, wherein the specification of the type of data comprises an indication that the type of data is incompressible.

EC22) The method of EC19, wherein the specification of the type of data comprises a database journal type indication.

EC23) The method of EC19, wherein the specification of the data access type comprises two or more of a read/write data access type indication, a read-mostly data access type indication, and a write-mostly data access type indication.

EC24) The method of EC19, wherein the specification of the data access type comprises two or more of a read/write data access type indication, a read-mostly data access type indication, a write-mostly data access type indication, and a transient data access type indication.

EC25) The method of EC19, wherein the specification of the data access type comprises a transient data access type indication.

EC26) The method of EC25,
wherein the standard command is a write command and the non-standard modifier comprises the transient data access type indication, and further comprising:
non-volatilely storing data of the write command; and
in response to determining that the data stored by the write command is to be recycled and according to the non-standard modifier, trimming the data stored by the write command.

EC27) The method of EC26, further comprising:
in response to a read of the data stored by the write command subsequent to the trimming, returning an indication that the data stored by the write command is trimmed.

EC28) The method of EC26, further comprising:
in response to a read of the data stored by the write command, selectively returning either an indication that the data stored by the write command is trimmed, or the data stored by the write command.

EC29) The method of any one of EC27 or EC28, further comprising:
in response to the read, returning the indication that the data stored by the write command is trimmed as a non-data response.

EC30) The method of any one of EC27 or EC28, further comprising:
in response to the read, returning the induction that the data stored by the write command is trimmed as a particular pattern in data returned.

EC31) The method of EC19, wherein the specification of the data access type comprises a read-only data access type indication.

EC32) The method of EC31,
wherein the standard command is a first write command and the non-standard modifier comprises the read-only data access type indication, and further comprising:
non-volatilely storing data of the first write command according to a Logical Block Address (LBA) of the first write command; and
in response to a subsequent write command attempting to write to the LBA of the first write command, returning an error indication.

EC33) The method of EC19, wherein the specification of the data sequencing comprises an indication of an atomic sequence.

EC34) The method of EC19, wherein the specification of the data sequencing comprises one or more of an indication of a sequential sequence, and an indication of an atomic sequence.

EC35) The method of EC19, further comprising:
associating the data relationship with data of the standard command.

EC36) The method of EC35, further comprising:
non-volatilely storing the data relationship and the data of the standard command.

EC37) The method of EC36, wherein the standard command is a first standard command, and further comprising:
subsequently associating the data relationship with data of a subsequent standard command.

EC38) The method of EC37, further comprising:
retrieving data according to the data relationship.

EC39) The method of EC19, wherein the specification of the data destination specifies one of a plurality of data bands.

EC40) The method of EC39, wherein the data bands comprise a hot band and a cold band.

EC41) The method of EC19, wherein the specification of the command relationship comprises a command priority.

EC42) The method of EC19, wherein the specification of the command relationship comprises a command ordering dependency.

EC43) The method of EC42, wherein the command ordering dependency is a command barrier.

EC44) The method of EC2, wherein the standard command is a sequence of two or more standard commands.

EC45) The method of EC2,
wherein the mode-setting command is a first mode-setting command; and
further comprising subsequent to the receiving the standard command, receiving a second mode-setting command comprising a specification to disable the non-standard modifier.

EC46) A method comprising:
at an I/O device, receiving a command via an external interface;
ascertaining a type of the command;
if the type of the command is a read command, accessing a map to translate a Logical Block Address (LBA) of the command to obtain translated LBA information selectively comprising a location in a Non-Volatile Memory (NVM);
if the type of the command is a pre-mapped read command, determining the location in the NVM from information of the pre-mapped read command and without use of the map;
returning data corresponding to the location in the NVM; and
wherein the information of the pre-mapped read command comprises at least a portion of the translated LBA information.

EC47) The method of EC46, wherein the translated LBA information selectively comprises a location in the NVM or an indication that the LBA of the command is not present in the NVM.

EC48) The method of EC46, wherein the translated LBA information selectively comprises an address of a first one of one or more read units of the NVM and a length in read units.

EC49) The method of EC48, wherein a size of each of the one or more read units is at least 512 bytes.

EC50) The method of EC46, further comprising:
accessing a shadow copy of the map to translate the LBA to obtain the at least a portion of the translated LBA information; and
sending the pre-mapped read command including the at least a portion of the translated LBA information to the I/O device.

EC51) The method of EC50, wherein the accessing is at a computing host.

EC52) The method of EC50, wherein the shadow copy of the map comprises a plurality of entries, and each of the entries comprises an indication of validity.

EC53) The method of EC52,
wherein the LBA is one of a plurality of Logical Block Addresses (LBAs);
wherein the translated LBA information is one of a plurality of translated LBA information; and
wherein each of the valid entries of the shadow copy of the map associates one or more of the LBAs with a respective one of the plurality of translated LBA information.

EC54) The method of EC53, wherein each of the valid entries of the shadow copy of the map comprises at least a portion of the respective one of the plurality of translated LBA information.

EC55) The method of EC53, wherein at least one of the valid entries of the shadow copy of the map selectively specifies that the LBAs associated with the at least, one of the valid entries are not present in the NVM.

EC56) The method of EC55, wherein the LBAs associated with the at least one of the valid entries are trimmed.

EC57) The method of EC52,
wherein the location in the NVM is one of a plurality of locations in the NVM; and
wherein each of the valid entries of the shadow copy of the map selectively specifies a respective location in the NVM.

EC58) The method of EC57, wherein each of the valid entries of the shadow copy of the map selectively specifies that data associated with the entry is not present in the NVM.

EC59) The method of EC52, further comprising:
initially marking all entries of the shadow copy of the map as invalid.

EC60) The method of EC52, further comprising:
in response to sending a write command to the I/O device, marking an entry of the shadow copy of the map associated with a Logical Block Address (LBA) of the write command as invalid.

EC61) The method of EC60, further comprising:
at the I/O device, receiving the write command via the external interface; and
subsequent to the receiving the write command, sending a shadow map update corresponding to the LBA of the write command.

EC62) The method of EC61, further comprising:
updating the shadow copy of the map according to the shadow map update; and
wherein the updating marks the entry of the shadow copy of the map associated with the LBA of the write command as valid.

EC63) The method of EC62, wherein the updating is by the I/O device.

EC64) The method of EC50, further comprising:
storing the shadow copy of the map in memory of a computing host coupled to the I/O device.

EC65) The method of EC64, further comprising:
sending the update to the shadow copy of the map from the I/O device to the computing host.

EC66) The method of EC64, wherein the memory of the computing host comprises a main memory of the computing host.

EC67) The method of EC64, wherein the memory of the computing host comprises an I/O space memory of the computing host.

EC68) The method of EC67, wherein the memory of the computing host is accessible by the I/O device in a PCIe address space.

EC69) The method of EC64, wherein the map is non-volatilely stored in the NVM.

EC70) The method of EC69, wherein the memory of the computing host comprises a volatile memory.

EC71) The method of EC46, wherein the map comprises a two-level map.

EC72) The method of EC71,
wherein the map comprises a first level and a second level; and
wherein the shadow copy of the map corresponds to the second level of the map.

EC73) A method comprising:
at an I/O device, receiving a write command via an external interface;
writing data of the write command to a location in a Non-Volatile Memory (NVM);
storing an association between a Logical Block Address (LBA) of the write command and the location in the NVM in a map; and
sending an update comprising information according to the location in the NVM to a shadow copy of the map.

EC74) The method of EC73, wherein the map comprises a two-level map.

EC75) The method of EC74,
wherein the map comprises a first level and a second level; and
wherein the shadow copy of the map corresponds to the second level of the map.

EC76) The method of EC73, wherein the information according to the location in the NVM comprises an address of a first one of one or more read units of the NVM and a length in read units EC77) The method of EC73, further comprising:
storing the shadow copy of the map in memory of a computing host coupled to the I/O device.

EC78) The method of EC77, further comprising:
sending the update to the shadow copy of the map from the I/O device to the computing host.

EC79) The method of EC77, wherein the memory of the computing host comprises a main memory of the computing host.

EC80) The method of EC77, wherein the memory of the computing host comprises an I/O space memory of the computing host.

EC81) The method of EC80, wherein the memory of the computing host is accessible by the I/O device in a PCIe address space.

EC82) The method of EC80, further comprising:
sending the update to the shadow copy of the map from the I/O device to the I/O space memory of the computing host.

EC83) The method of EC82, wherein the sending the update comprises sending a PCIe write request.

EC84) The method of EC82, wherein the sending the update comprises a read-modify-write of the shadow copy of the map.

EC85) The method of EC82, further comprising:
prior to the I/O device executing a read command, fetching a translation of a Logical Block Address (LBA) of the read command from the shadow copy of the map.

EC86) The method of EC85, wherein the fetching is by the I/O device.

EC87) The method of EC86, wherein the fetching comprises sending a PCIe read request.

EC88) The method of EC85, wherein the fetching is by the computing host and the read command is a pre-mapped read command.

EC89) The method of EC77, wherein the map is non-volatilely stored in the NVM.

EC90) The method of EC89, wherein the memory of the computing host comprises a volatile memory.

EC91) A method comprising:
initializing a shadow copy of a map of an I/O device so that all of a plurality of entries of the shadow copy of the map are marked invalid;
receiving an update to the shadow copy of the map from the I/O device;

according to the update to the shadow copy of the map, marking at least one of the entries of the shadow copy of the map as valid.

EC92) The method of EC91, wherein the marking according to the update further comprises associating translated Logical Block Address (LBA) information of the update with the at least one of the entries.

EC93) The method of EC92, wherein the translated LBA information comprises a location in Non-Volatile Memory (NVM) of the I/O device.

EC94) The method of EC91, wherein each of the entries of the shadow copy of the map selectively associates at least one Logical Block Address (LBA) of the I/O device with a location in Non-Volatile Memory (NVM) of the I/O device.

EC95) The method of EC91, wherein the map of the I/O device comprises a two-level map.

EC96) The method of EC95,
wherein the map of the I/O device comprises a first level and a second level; and
wherein the shadow copy of the map corresponds to the second level of the map of the I/O device.

EC97) The method of EC91, further comprising:
storing the shadow copy of the map in memory of a computing host coupled to the I/O device.

EC98) The method of EC97, further comprising:
sending the update to the shadow copy of the map from the I/O device to the computing host.

EC99) The method of EC97, wherein the memory of the computing host comprises a main memory of the computing host.

EC100) The method of EC97, wherein the memory of the computing host comprises an I/O space memory of the computing host.

EC101) The method of EC100, wherein the memory of the computing host is accessible by the I/O device in a PCIe address space.

EC102) The method of EC100, further comprising:
sending the update to the shadow copy of the map from the I/O device to the I/O space memory of the computing host.

EC103) The method of EC102, wherein the sending the update comprises sending a PCIe Write request.

EC104) The method of EC102, wherein the sending the update comprises a read-modify-write of the shadow copy of the map.

EC105) The method of EC102, further comprising:
prior to the I/O device exciting a read command, fetching a translation of a Logical Block Address (LBA) of the read command from the Shadow copy of the map.

EC106) The method of EC105, wherein the fetching is by the I/O device.

EC107) The method of EC106, wherein the fetching comprises sending a PCIe read request.

EC108) The method of EC105, wherein the fetching is by the computing host and the read command is a pre-mapped read command.

EC109) The method of EC97, wherein the map is non-volatilely stored in a Non-Volatile Memory (NVM) of the I/O device.

EC110) The method of EC109, wherein the memory of the computing host comprises a volatile memory.

EC111) A method comprising:
determining if a request for an I/O device is a read request, the I/O device having a map, the map having a plurality of entries, each of at least some of the entries of the map mapping a respective Logical Block Address (LBA) of the I/O device to respective translated LBA information selectively comprising a location in a Non-Volatile Memory (NVM) of the I/O device, and a shadow copy of the map having a corresponding plurality of entries;
if the request is a read request, determining if a particular one of the entries of the shadow copy of the map associated with an LBA of the read request is valid; and
if the particular entry is valid, selectively sending a pre-mapped read command comprising at least a portion of the respective translated LBA information according to the particular entry to the I/O device.

EC112) The method of EC111,
wherein each of the entries of the shadow copy of the map corresponds to a respective entry of the map;
wherein each of the at least some of the entries of the map comprises the respective translated LBA information mapped to by the respective LBA; and
wherein each of the entries of the shadow copy of the map corresponding to one of the at least some of the entries of the map comprises at least a portion of the respective translated LBA information.

EC113) The method of EC111, wherein the plurality of entries of the map are a second-level map.

EC114) The method of EC113, wherein the I/O device further has a first-level map.

EC115) The method of EC111, wherein the at least a portion of the respective translated LBA information selectively comprises the location in the NVM or an indication that the respective LBA is not present in the NVM.

EC116) The method of EC115, wherein the selectively sending comprises determining if the at least a portion of the respective translated LBA information according to the particular entry indicates that the LBA of the read request is not present in the NVM.

EC117) The method of EC116, wherein the selectively sending further comprises solely sending the pre-mapped read command to the I/O device if the at least a portion of the respective translated LBA information according to the particular entry indicates that the LBA of the read request is present in the NVM.

EC118) The method of EC117, wherein if the LBA of the read request is trimmed, then the at least a portion of the respective translated LBA information according to the particular entry indicates that the LBA of the read request is not present in the NVM.

EC119) The method of EC111, wherein the at least a portion of the respective translated LBA information selectively comprises an address of a first one of one or more read units of the NVM and a length in read units.

EC120) The method of EC119, wherein a size of each of the one or more read units is at least 512 bytes.

EC121) The method of EC111, further comprising:
if the particular entry is invalid, sending a standard read command comprising the LBA of the read request to the I/O device.

EC122) The method of EC111, further comprising:
if the request is a write request, marking one of the entries of the shadow copy of the map associated with an LBA of the write request as invalid.

EC123) The method of EC111, wherein each entry of the shadow copy of the map comprises a validity indication and a copy of at least some contents from a corresponding entry of the map.

EC124) The method of EC123, wherein if the particular entry is valid, the copy of at least some contents from the corresponding entry in the map is same as the at least some contents from the corresponding entry of the map.

EC125) The method of EC123, wherein valid entries of the shadow copy of the map are a subset of valid entries of the map.

EC126) The method of EC125, the subset is a proper subset.

EC127) The method of EC111, wherein each of the entries of the shadow copy of the map is either invalid or comprises information according to a corresponding entry of the map.

EC128) The method of EC111, wherein the map of the I/O device comprises a two-level map.

EC129) The method of EC128,
wherein the map of the I/O device comprises a first level and a second level; and
wherein the shadow copy of the map corresponds to the second level of the map of the I/O device.

EC130) The method of EC111, wherein each of the entries of the shadow copy of the map comprises an indication of validity.

EC131) The method of EC130, wherein each of the valid entries of the shadow copy of the map selectively associates a respective one or more of the LBAs with a respective location in the NVM.

EC132) The method of EC131, wherein at least one of the valid entries of the shadow copy of the map selectively specifics that at least one of the respective LBAs associated with the at least one of the valid entries is not present in the NVM.

EC133) The method of EC132, wherein the at least one of the respective LBAs associated with the at least one of the valid entries are trimmed.

EC134) The method of EC130, wherein each of the valid entries of the shadow copy of the map selectively specifies a respective location in the NVM.

EC135) The method of EC130, further comprising:
initially marking all of the entries of the shadow copy of the map as invalid.

EC136) The method of EC111, further comprising:
storing the shadow copy of the map in memory of a computing host coupled to the I/O device.

EC137) The method of EC136, further comprising:
receiving an update to the shadow copy of the map from the I/O device.

EC138) The method of EC136, wherein the memory of the computing host comprises a main memory of the computing host.

EC139) The method of EC136, wherein the memory of the computing host comprises an I/O space memory of the computing host.

EC140) The method of EC139, wherein the memory of the computing host is accessible by the I/O device in a PCIe address space.

EC141) The method of EC139, further comprising:
sending the update to the shadow copy of the map from the I/O device to the I/O space memory of the computing host.

EC142) The method of EC141, wherein the sending the update comprises sending a PCIe write request.

EC143) The method of EC141, wherein the sending the update comprises a read-modify-write of the shadow copy of the map.

EC144) The method of EC141, further comprising:
prior to the I/O device executing a particular command, fetching a translation of an LBA of the particular command from the shadow copy of the map.

EC145) The method of EC144, wherein the fetching is by the I/O device.

EC146) The method of EC145, wherein the fetching comprises sending a PCIe read request.

EC147) The method of EC144, wherein the fetching is by the computing host.

EC148) The method of EC147, wherein the particular command is a pre-mapped read command.

EC149) The method of EC136, wherein the map is non-volatilely Stored in the NVM.

EC150) The method of EC149, wherein the memory of the computing host comprises a volatile memory.

EC151) A method comprising:
at an I/O device, receiving an indication to enter a low-power state;
saving internal state of the I/O device in a system-accessible memory of a computing host;
at the I/O device, receiving an indication to exit the low-power state; and
restoring the internal state of the I/O device from the system-accessible memory.

EC152) The method of EC151, wherein the system-accessible memory of the computing host comprises a main memory of the computing host.

EC153) The method of EC151, wherein the system-accessible memory of the computing host comprises an I/O space memory of the computing host.

EC154) The method of EC153, wherein the system-accessible memory of the computing host is accessible by the I/O device in a PCIe address space.

EC155) A system comprising:
an I/O device coupled to a computing host:
a map of the I/O device selectively associating Logical Block Addresses (LBAs) of the I/O device with locations in a Non-Volatile Memory (NVM) of the I/O device;
a shadow copy of the map in memory of the computing host; and
wherein at least some operations directed to the I/O device are enabled to access the shadow copy of the map to determine a location in NVM of the I/O device.

EC156) The system of EC155, wherein the at least some operations are not enabled to access the map.

EC157) The system of EC155,
Wherein the shadow copy of the map comprises a plurality of entries, each of the entries associated with a respective one of the LBAs, and each of the entries comprising an indication of validity; and
wherein at least one of the valid entries of the shadow copy of the map selectively specifies that the respective LBA associated with the at least one of the valid entries is not present in the NVM.

EC158) The system of EC157, wherein the respective LBA associated with the at least one of the valid entries is trimmed.

EC159) The system of EC155, wherein the memory of the computing host comprises a main memory of the computing host.

EC160) The system of EC155, wherein the memory of the computing host comprises an I/O space memory of the computing host.

EC161) The system of EC160, wherein the I/O space memory of the computing host is accessible by the I/O device in a PCIe address space.

EC162) The system of EC161, further comprising:
an I/O card including the I/O device and the I/O space memory of the computing host.

EC163) The system of EC162, wherein the I/O device is a first one of a plurality of I/O devices on the I/O card, and the I/O space memory of the computing host is shared among the plurality of I/O devices.

EC164) The system of EC162, wherein the I/O card comprise the memory of the computing host.

EC165) The system of EC162,
wherein the I/O card comprises a switch; and
wherein the I/O device and the memory of the computing host are each coupled to the switch.

EC166) The system of EC165,
wherein the I/O device is a first one of a plurality of I/O devices; and
wherein each of the I/O devices is coupled to the switch.

EC167) The system of EC165, wherein the memory of the computing host is directly coupled to the switch.

EC168) The system of EC155, wherein the map is directly coupled to the I/O device.

EC169) The system of EC155, wherein the map is stored in the NVM.

EC170) The system of EC155, wherein the shadow copy of the map is not directly coupled to the I/O device.

EC171) The system of EC155, wherein the map comprises a two-level map.

EC172) The system of EC171,
wherein the map comprises a first level and a second level; and
wherein the shadow copy of the map corresponds to the second level of the map.

EC173) The system of EC155, wherein the map is non-volatilely stored in the NVM.

EC174) The system of EC173, wherein the memory of the computing host comprises a volatile memory.

EC175) A system comprising:
an I/O device coupled to a computing host;
a memory accessible by the computing host, the memory accessible by the computing host not directly coupled to the I/O device; and
wherein state of the I/O device is stored in the memory accessible by the computing host.

EC176) The system of EC175, further comprising:
a map of the I/O device selectively associating Logical Block Addresses (LBAs) of the I/O device with locations in a Non-Volatile Memory (NVM) of the I/O device;
wherein the state of the I/O device stored in the memory accessible by the computing host comprises a shadow copy of the map stored in the memory accessible by the computing host; and
wherein the map is non-volatilely stored in the NVM.

EC177) The system of EC176,
wherein the shadow copy of the map comprises a plurality of entries, each of the entries associated with a respective one of the LBAs, and each of the entries comprising an indication of validity; and
wherein at least one of the valid entries of the shadow copy of the map selectively specifics that the respective LBA associated with the at least one of the valid entries is not present in the NVM.

EC178) The system of EC175, wherein the memory accessible by the computing host comprises a main memory of the computing host.

EC179) The system of EC175, wherein the memory accessible by the computing host comprises an I/O space memory of the computing host.

EC180) The system of EC179, wherein the I/O space memory of the computing host is accessible by the I/O device in a PCIe address space.

EC181) Tlc system of EC175, wherein the state of the I/O device stored in the memory accessible by the computing host comprises internal state of the I/O device.

EC182) The system of EC181, wherein the internal state of the I/O device comprises state that is lost when the I/O device enters a low-power state.

EC183) The system of EC182, wherein, in response to a request to enter the low-power state, the I/O device is enabled to store the state that is lost when the I/O device enters the low-power state in the memory accessible by the computing host.

EC184) The system of EC175, wherein the memory accessible by the computing host comprises a volatile memory.

EC185) A method comprising:
receiving a command to access storage, the command specifying an access type and having one or more parameters;
determining a location of the storage; and
wherein the determining comprises conditionally referencing an included data structure to ascertain the location, the referencing being omitted when one or more of the parameters comprise a specification of the location.

EC186) The method of EC185, wherein the specification comprises one or more of
an identification of a region of the storage,
an identification of a physical address of the storage.
a length of data of the storage, and
a span of data of the storage.

EC187) The method of EC185, wherein the included data structure comprises one or more entries each describing where data associated with a respective one or more Logical Block Addresses (LBAs) is located in the storage.

EC188) The method of EC187, wherein each of the entries further selectively describes one or more attributes associated with the respective LBAs.

EC189) The method of EC187, wherein each of the entries further describes one or more attributes associated with one or more regions of the storage.

EC190) The method of EC185, further comprising providing, before the receiving, an update describing a modification to the included data structure.

EC191) The method of EC190, wherein the command is provided by a computing host, and the update is provided to the computing host.

EC192) The method of EC190, wherein the update comprises the specification of the location.

EC193) The method of EC192, wherein the command is according to a Logical Block Address (LBA) and the providing is in response to processing a write command to the LBA.

EC194) The method of EC192, wherein the providing is in response to recycling and/or relocating one or more portions of Non-Volatile Memory (NVM) implementing at least some of the storage.

EC195) The method of EC185, wherein the receiving and the determining are via an I/O storage device.

EC196) The method of EC185, wherein the command is provided by a computing host.

EC197) The method of EC185, wherein the parameters comprise standard parameters and non-standard parameters, the standard parameters being defined by a standard, the non-standard parameters not being defined by the standard, and the non-standard parameters comprise the parameters that comprise the specification.

EC198) The method of EC185, wherein the command is defined by a standard and the parameters that comprise the specification are not defined by the standard.

EC199) The method of EC197 or EC198, wherein the parameters that comprise the specification comprise one or more of
reserved command codes,
vendor-specific parameters,
reserved fields,
unused fields, and
values in capability registers.

EC200) The method of EC185, further comprising performing an access of the storage in accordance with the access type and the location.

EC201) The method of EC200, wherein the access type is a read access type and the access is a read access.

EC202) The method of EC201, wherein the parameters comprise the specification.

EC203) The method of EC202, wherein the command is a pre-mapped read command.

EC204) The method of EC185, wherein the location is a first location and further comprising performing an access of the storage in accordance with the access type and a second location.

EC205) The method of EC204, wherein the access type is a write access type and the access is a write access.

EC206) The method of EC205, further comprising providing an update describing a modification to the included data structure, the update comprising a specification of the second location.

EC207) The method of EC205, further comprising revising an accounting of usage of the storage in accordance with the specification.

EC208) The method of EC185, wherein the command is a trim command and the access type is a trim access type.

EC209) The method of EC208, further comprising providing an update describing a modification to the included data structure, the update comprising a specification of an attribute of a Logical Block Address (LBA) that was mapped to the location before the receiving of the command.

EC210) The method of EC209, wherein the attribute indicates that the LBA has been trimmed.

EC211) The method of EC208, further comprising revising an accounting of usage of the storage in accordance with the specification.

EC212) A method comprising:
receiving a command, the command being one of a plurality of command types, the command types comprising a first type and a second type;
determining which of the command types the command is;
if the command is of the first type, then performing first processing and then performing second processing;
if the command is of the second type, then performing the second processing without performing the first processing;
wherein the second processing uses information produced by the first processing if the command is of the first type and provided by the command if the command is of the second type.

EC213) The method of EC212, wherein the command is to access storage of an I/O storage device.

EC214) The method of EC213, wherein the first processing comprises accessing an included data structure to produce the information.

EC215) The method of EC214, wherein the included data structure is a map describing mappings between Logical Block Addresses (LBAs) and physical addresses of Non-Volatile Memory (NVM) implementing at least some of the storage, and the information comprises at least part of one of the mappings.

EC216) The method of EC215, wherein commands of the first type specify at least one of the LBAs.

EC217) The method of EC216, wherein commands of the second type do not specify any of the LBAs.

EC218) The method of EC214, further comprising providing, before the receiving, an update describing a modification to the included data structure.

EC219) The method of EC218, wherein the update comprises a specification of the information.

EC220) The method of EC219, wherein the specification comprises one or more of
an identification of a region of the storage,
an identification of a physical address of the storage,
a length of data of the storage, and
a span of data of the storage.

EC221) The method of EC219, wherein the providing is in response to receiving a write command type of the command types.

EC222) The method of EC219, wherein the providing is in response to recycling and/or relocating a portion of Non-Volatile Memory (NVM) implementing at least some of the storage.

EC223) The method of EC218, wherein the command is provided by a computing host, and the update is provided to the computing host.

EC224) The method of EC213, wherein the receiving, the determining, and the two acts of performing are via the I/O storage device.

EC225) The method of EC213, wherein the command is provided by a computing host.

EC226) The method of EC212, wherein the commands of the first type are defined by a standard and the commands of the second type are not defined by the standard.

EC227) The method of EC212, wherein when the command is of the second type, the information is provided via one or more of
reserved command codes,
vendor-specific parameters,
reserved fields,
unused fields, and
values in capability registers.

EC228) The method of EC214, wherein the first type comprises a read type and the second type comprises a pre-mapped read type.

EC229) The method of EC228, wherein the access of the storage is a read access, the information comprises a location of the storage, and the second processing comprises reading the location.

EC230) The method of EC214, wherein the first type comprises a first write type, the second type comprises a second write type, and the second write type provides the information while the first write type does not.

EC231) The method of EC230, wherein the access of the storage is a write access, the information comprises a first location of the storage, and the second processing comprises writing a second location of the storage and revising an accounting of usage of the storage in accordance with the first location.

EC232) The method of EC231, further comprising providing an update describing a modification to the included data structure, the update comprising a specification of the second location.

EC233) The method of EC214, wherein the first type comprise a first trim type, the second type comprises a second trim type, and the second trim type provides the information while the first trim type does not.

EC234) The method of EC233, wherein the access of the storage is a trim access, the information comprises a location of the storage, and the second processing comprises revising an accounting of usage of the storage in accordance with the location.

EC235) The method of EC234, further comprising providing an update describing a modification to the included data structure, the update comprising a specification of an attribute of a Logical Block Address (LBA) that was mapped to the location according to the included data structure before the receiving of the command.

EC236) The method of EC235, wherein the attribute indicates that the LBA has been trimmed.

EC237) A method comprising:
receiving a command from a computing host, the command comprising zero or more standard parameters and one or more non-standard parameters;
performing the command in accordance with the standard parameters, and
wherein the receiving and the performing are via an I/O storage device that is enabled to use the non-standard parameters to operate with a higher efficiency than without benefit of the non-standard parameters.

EC238) The method of EC237, wherein the I/O storage device interfaces storage to the computing host.

EC239) The method of EC237, wherein the I/O storage device is enabled to use the non-standard parameters to perform the command with a higher efficiency than without benefit of the non-standard parameters.

EC240) The method of EC239, further comprising managing a Non-Volatile Memory (NVM) that implements at least a portion of storage of the I/O storage device.

EC241) The method of EC240, wherein the command is a read command and one or more of the non-standard parameters specify at least in part a physical location in the NVM, and further comprising reading the physical location.

EC242) The method of EC241, further comprising the I/O storage device performing mapping updates to an included I/O device map and providing at least some of the mapping updates to the computing host to enable the computing host to update a computing host map, the computing host map and the I/O device map each having respective entries describing mappings between Logical Block Addresses (LBAs) and locations of the NVM, and at least one of the non-standard parameters being determined at least in part via accessing the computing host map.

EC243) The method of EC242, wherein a latency to access the computing host map is less than a latency to access the I/O device map, and the higher efficiency comprises lower latency.

EC244) The method of EC240, wherein the command is a write command and one or more of the non-standard parameters specify at least in part a first physical location in the NVM, and further comprising writing a second physical location in the NVM and revising an accounting of usage of the storage in accordance with the first physical location.

EC245) The method of EC244, further comprising the I/O storage device performing mapping updates to an included I/O device map and providing at least some of the mapping updates to the computing host to enable the computing host to update a computing host map, the computing host mal and the I/O device map each having respective entries describing mappings between Logical Block Addresses (LBAs) and locations of the NVM, and at least one of the non-standard parameters being determined at least in part via accessing the computing host map.

EC246) The method of EC245, wherein a latency to access the computing host map is less than a latency to access the I/O device map, and the higher efficiency comprises lower latency.

EC247) The method of EC237, wherein the command is a first command, and the I/O storage device is enabled to perform a second command, received after the first command, in accordance with the non-standard parameters and with a higher efficiency than without benefit of the non-standard parameters.

EC248) The method of EC247, further comprising managing a Non-Volatile Memory (NVM) that implements at least a portion of storage of the I/O storage device.

EC249) The method of EC248, further comprising the I/O storage device managing an included map having entries describing mappings between Logical Block Addresses (LBAs) and locations of the NVM.

EC250) The method of EC249, wherein at least a portion of one or more of the standard parameters comprises a particular LBA and further comprising the I/O storage device storing at least some information determined from the non-standard parameters in at least a selected one of the entries, the selected entry selected at least in part by the particular LBA.

EC251) The method of EC250, wherein the second command is according to the particular LBA.

EC252) The method of EC250, wherein the information comprises an identification of a particular one of a plurality of data bands, and further comprising the I/O storage device recycling portions of the NVM to which the particular LBA is mapped to remain in the particular data band.

EC253) The method of EC248, wherein at least one or more of the non-standard parameters specify at least in part one of a plurality of types of data, the types of data comprising any two or more of
a compressible type of data,
an incompressible type of data, and
a usage model type of data.

EC254) The method of EC253, wherein the usage model type of data comprises a database journal type of data, and further comprising the I/O storage device managing the NVM to store data associated with the database journal type of data in a database journal data band of a plurality of data bands, and the I/O storage device managing the database journal data band such that when an amount of data in the database journal band exceeds a threshold, older data of the database journal band is selectively deleted.

EC255) The method of EC254, further comprising deleting the older data when the older data is recycled.

EC256) The method of EC248, wherein at least one or more of the non-standard parameters specify at least in part one of a plurality of data access types, the data access types comprising any two or more of
a read/write data access type,
a read-mostly data access type,
a write-mostly data access type, and
a transient data access type.

EC257) The method of EC256, wherein the second command is a write command, and further comprising the I/O storage device writing a particular portion of the NVM in response to the write command, the particular portion being determined at least in part by the data access type.

EC258) The method of EC257, wherein the data access type is a read/write data access type, and the particular portion has not endured relatively many program/erase cycles and has nor endured relatively fewer program/erase cycles.

EC259) The method of EC257, wherein the data access type is a read-mostly data access type, and the particular portion has endured relatively many program/erase cycles.

EC260) The method of EC257, wherein the data access type is a write-mostly data access type, and the particular portion has endured relatively fewer program/erase cycles.

EC261) The method of EC258, EC259, or EC260, wherein the higher efficiency comprises higher reliability.

EC262) The method of EC258, EC259, or EC260, wherein the higher efficiency comprises longer lifetime.

EC263) The method of EC256, wherein at least a portion of one or more of the standard parameters comprises a particular LBA and the data access type is the transient data access type, and further comprising the I/O storage device, in response to a particular event, deleting data stored at locations in the NVM corresponding to the particular LBA.

EC264) The method of EC263, wherein the deleting the data comprises updating a map of the I/O storage device at an entry of the map according to the particular LBA to specify that data corresponding to the particular LBA is not present in the NVM.

EC265) The method of EC263, wherein the deleting the data comprises trimming the data.

EC266) The method of EC263, wherein the particular event is any one or more of
  an NVM management operation of the I/O storage device,
  an NVM recycling operation of the I/O storage device,
  a power-cycle of the I/O storage device,
  a reset of the I/O storage device,
  a virtual machine power-cycle of a virtual I/O storage device,
  a virtual machine reset of a virtual I/O storage device,
  an explicit request from the computing host, and
  a request from a memcached application.

EC267) The method of EC248, wherein at least one or more of the non-standard parameters specify at least in part one of a plurality of data sequencings, the data sequencings comprising any two or more of a sequential sequencing and an atomic sequencing.

EC268) The method of EC248, wherein at least one or more of the non-standard parameters specify at least in part one of au plurality of data relationships, the data relationships comprising any two or more of a read and/or write association between multiple items of data and a prefetch data relationship.

EC269) The method of EC248, wherein at least one or more of the non-standard parameters specify at least in part one of a plurality of data destinations, the data destinations comprising any two or more of
  a particular portion of the NVM,
  a hierarchical storage tier,
  a type of storage, and
  a particular data band.

EC270) The method of EC269, wherein the type of storage is any one or more of
  Single-Level Cell (SLC),
  Multi-Level Cell (MLC),
  Magnetic Random Access Memory (MRAM),
  volatile, and
  non-volatile.

EC271) The method of EC269, wherein the specification of the one of the data destinations enables improvement of one or more of
  write speed,
  recycling speed,
  recycling frequency, and
  write amplification.

EC272) The method of EC248, wherein at least one or more of the non-standard parameters specify at least in part one of a plurality of command processing characteristics, the command processing characteristics comprising any two or more of
  a command priority,
  command ordering,
  a barrier to particular types of commands,
  a boundary between particular types of commands,
  an aggregation of commands,
  a fusing of commands, and
  atomic operation of commands.

EC273) The method of EC239 or EC247, wherein the higher efficiency comprises higher performance.

EC274) The method of EC273, wherein the higher performance comprises one or more of
  higher bandwidth,
  lower latency, and
  lower power.

EC275) The method of EC239 or EC247, wherein the higher efficiency comprises higher reliability.

EC276) The method of EC275, wherein the higher reliability comprises one or more of lower error rate and longer lifetime.

EC277) A met hod comprising:
  receiving a command from a computing host, the command requesting return of a non-standard statistic value;
  returning the non-standard statistic value to the computing host, and
  wherein the receiving and the returning are via an I/O storage device that is enabled to compute the non-standard statistic.

EC278) The method of EC277, further comprising reducing a size of data to be written to a Non-Volatile Memory (NVM) that, implements at least a portion of storage of the I/O storage device; and wherein the computing is bused at least in part on the reducing.

EC279) The method of EC278, wherein the reducing comprises compression.

EC280) The method of EC278, wherein the reducing comprises data de-duplication.

EC281) The method of EC278, wherein the non-standard statistic is according to usage of the NVM.

EC282) The method of EC281, wherein the usage of the NVM varies according to a quality of the reducing.

EC283) The method of EC281, wherein the usage of the NVM varies according to a number and/or a size of trim commands received from the computing host.

EC284) The method of EC281, wherein the usage of the NVM varies according to an amount of transient data received from the computing host.

EC285) The method of EC284, wherein the usage of the NVM varies according to an amount of the transient data that has been trimmed by the I/O storage device.

EC286) The method of EC281, wherein the non-standard statistic is according to a percentage usage of the NVM.

EC287) The method of EC281, wherein the non-standard statistic is according to a write amplification of the I/O storage device.

EC288) The method of EC278, wherein the non-standard statistic is a size of one or more bands of the NVM.

EC289) The method of EC278, wherein the non-standard statistic is a usage of one or more bands of the NVM.

EC290) The method of EC289, wherein the usage of the one or more bands of the NVM varies according to a quality of the reducing.

EC291) The method of EC195, EC213, EC238, or EC277, wherein the I/O storage device comprises a Solid-State Disk (SSD) controller enabled to perform the receiving of the command.

EC292) The method of EC291, wherein the SSD controller is implemented in a single Integrated Circuit (IC).

EC293) The method of EC292, wherein at least a portion of the storage is implemented via Non-Volatile Memory (NVM).

EC294) The method of EC293, wherein the NVM comprises one or more flash memories.

EC295) The method of EC293, wherein at least a portion of the NVM comprises one or more of
NAND flash technology storage cells, and
NOR flash technology storage cells.

EC296) The method of EC293, wherein at least a portion of the NVM comprises one or more of
Single-Level Cell (SLC) flash technology storage cells, and
Multi-Level Cell (MLC) flash technology storage cells.

EC297) The method of EC293, wherein the SSD controller comprises an NVM interface enabled to communicate data with the NVM, at least some of the data being associated with at least some of the commands.

EC298) The method of EC297, wherein the NVM interface is compatible with one or more of
an Open NAND Flash Interface (ONFI),
a Toggle-mode interface,
a Dual Data Rate (DDR) synchronous interface,
a synchronous interface, and
an asynchronous interface.

EC299) The method of EC293, wherein the SSD controller and the NVM are comprised in an SSD.

EC300) The method of EC291, wherein the SSD controller comprises a storage interface that is compatible with a storage interface standard and enabled to couple to a computing host that provides the command via the storage interface.

EC301) The method of EC300, further comprising operating the computing host to provide the command.

EC302) A method comprising:
at an I/O device, receiving a command from a computing host via an external interface;
ascertaining a type of the command;
in response to the type being a read command, accessing a map to translate a Logical Block Address (LBA) of the command to obtain translated LBA information selectively comprising a location in a Non-Volatile Memory (NVM);
in response to the type being a pre-mapped read command, determining the location in the NVM from information of the pre-mapped read command and without use of the map;
returning data corresponding to the location; and
wherein the information comprises at least a portion of the translated LBA information.

EC303) The method of EC302, wherein the location is a first location, the information is first information, and further comprising, in response to the type being a write command:
writing data of the write command to a second location in the NVM;
storing an association between an LBA of the write command and the second location in the map;
sending an update comprising second information according to the second location to a shadow copy of the map; and
wherein the first information is obtained at least in part from the shadow copy, and the shadow copy is stored at least in part in a memory device of an I/O card coupled to the computing host.

EC304) A system comprising:
at an I/O device, means for receiving an extended command comprising, a standard command and a specification of a non-standard modifier;
means for executing the standard command according to the non-standard modifier; and
whereby system-level performance is improved due to usage of the non-standard modifier to modify the executing of the standard command.

EC305) A system comprising:
at an I/O device, means for receiving a mode-setting command comprising a specification to enable a non-standard modifier;
at the I/O device, moans for receiving a standard command;
means for executing the standard command at cording to the non-standard modifier; and
whereby system-level performance is improved due to usage of the non-standard modifier to modify the executing of the standard command.

EC306) The system of any one of EC304 or EC305, further comprising:
means for associating the non-standard modifier with data of the standard command.

EC307) The system of EC306, further comprising:
means for storing an indication of the non-standard modifier for later retrieval with the data of the standard command.

EC308) The system of EC307, wherein the storing is non-volatile.

EC309) The system of EC307, further comprising:
means for storing the indication of the non-standard modifier in a particular one of a plurality of entries of a map, the particular entry associated with the data of the standard command by a Logical Block Address (LBA) of the standard command.

EC310) The system of EC307, wherein the standard command is a write command, and further comprising:
means for, in response to a subsequent read command specifying access to the data of the write command, modifying execution of the subsequent read command according to the indication of the non-standard modifier.

EC311) The system of EC307, wherein the standard command is a first command, and further comprising:
means for, in response to a subsequent command specifying access to the data of the first command, modifying execution of the subsequent command according to the indication of the non-standard modifier.

EC312) The system of EC311,
wherein the first command is a write command;
wherein the non-standard modifier comprises an indication that the data of the write command is read-only; and
wherein the modifying execution of the subsequent command comprises returning an error indication if the subsequent command is a standard write command.

EC313) The system of EC307, wherein the standard command is a write command, and further comprising:

means for determining that the data of the write command is to be recycled;

means for accessing the indication of the non-standard modifier;

means for, in response to the indication of the non-standard modifier, trimming the data of the write command; and whereby the data of the write command is trimmed rather than recycled.

EC314) The system of any one of EC304 or EC305, wherein the standard command is a read command.

EC315) The system of any one of EC304 or EC305, wherein the standard command is one of a read command or a write command.

EC316) The system of any one of EC304 or EC305, wherein the standard command is a data movement command.

EC317) The system of any one of EC304 or EC305, wherein the standard command is a trim command.

EC318) The system of EC317, wherein the non-standard modifier selectively determines whether the trim command is mandatory or optional.

EC319) The system of any one of EC304 or EC305, wherein the non-standard modifier is, at least in part, specified by a reserved field of the standard command.

EC320) The system of any one of EC304 or EC305, wherein the non-standard modifier is, at least in part, specified by at least some of a plurality of address bits of the standard command.

EC321) The system of EC320, wherein the at least some of the address bits are otherwise unused by the I/O device.

EC322) The system of any one of EC304 Or EC305, wherein the non-standard modifier is one or more of:
- a specification of a type of data;
- a specification of a data access type;
- a specification of data sequencing;
- a specification of a data relationship;
- a specification of a data destination; and
- a specification of a command relationship.

EC323) The system of EC322, wherein the specification of the type of data comprises a compressibility indication.

EC324) The system of EC323, wherein the specification of the type of data comprises an indication that the type of data is incompressible.

EC325) The system of EC322, wherein the specification of the type of data comprises a database journal type indication.

EC326) The system of EC322, wherein the specification of the data access type comprises two or more of a read/write data access type indication, a read-mostly data access type indication, and a write-mostly data access type indication.

EC327) The system of EC322, wherein the specification of the data access type comprises two or more of a read/write data access type indication, a read-mostly data access type indication, a write-mostly data access type indication, and a transient data access type indication.

EC328) The system of EC322, wherein the specification of the data access type comprises a transient data access type indication.

EC329) The system of EC328,
wherein the standard command is a write command and the non-standard modifier comprises the transient data access type indication, and further comprising:
means for non-volatilely storing data of the write command; and means for, in response to determining that the data stored by the write command is to be recycled and according to the non-standard modifier, trimming the data stored by the write command.

EC330) The system of EC329, further comprising:
means for, in response to a read of the data stored by the write command subsequent to the trimming, returning an indication that the data stored by the write command is trimmed.

EC331) The system of EC329, further comprising:
means for, in response to a read of the data stored by the write command, selectively returning either an indication that the data stored by the write command is trimmed, or the data stored by the write command.

EC332) The system of any one of EC330 or EC331, further comprising:
means for, in response to the read, returning the indication that the data stored by the write command is trimmed as a non-data response.

EC333) The system of any one of EC330 or EC331, further comprising:
means for, in response to the read, returning the indication that the data stored by the write command is trimmed as a-particular pattern in data returned.

EC334) The system of EC322, wherein the specification of the data access type comprises a read-only data access type indication.

EC335) The system of EC334,
wherein the standard command is a first write command and the non-standard modifier comprises the read-only data access type indication, and further comprising:
means for, non-volatilely storing data of the first write command according to a Logical Block Address (LBA) of the first write command; and
means for, in response to a subsequent write command attempting to write to the LBA of the first write command, returning an error indication.

EC336) The system of EC322, wherein the specification of the data sequencing comprises an indication of an atomic sequence.

EC337) The system of EC322, wherein the specification of the data sequencing comprises one or more of an indication of a sequential sequence, and all indication of an atomic sequence.

EC338) The system of EC322, further comprising:
means for associating the data relationship with data of the standard command.

EC339) The system of EC338, further comprising:
means for non-volatilely storing the data relationship and the data of the standard command.

EC340) The system of EC339, wherein the standard command is a first standard command, and further comprising:
means for subsequently associating the data relationship with data of a subsequent standard command.

EC341) The system of EC340, further comprising:
means for retrieving data according to the data relationship.

EC342) The system of EC322, wherein the specification of the data destination specifies one of a plurality of data bands.

EC343) The system of EC342, wherein the data bands comprise a hot band and a cold band.

EC344) The system of EC322, wherein the specification of the command relationship comprises a command priority.

EC345) The system of EC322, wherein the specification of the command relationship comprises a command ordering dependency.

EC346) The system of EC345, wherein the command ordering dependency is a command barrier.

EC347) The system of EC305, wherein the standard command is a sequence of two or more standard commands.

EC348) The system of EC305,
wherein the mode-setting command is a first mode-setting command; and
further comprising means for, subsequent to the receiving the standard command, receiving a second mode-setting command comprising a specification to disable the non-standard modifier.

EC349) A system comprising:
at an I/O device, means for receiving a command via an external interface;
means for ascertaining a type of the command;
means for, if the type of the command is a read command, accessing a map to translate a Logical Block Address (LBA) of the command to obtain translated LBA information selectively comprising a location in a Non-Volatile Memory (NVM);
means for, if the type of the command is a pre-mapped read command, determining the location in the NVM from information of the pre-mapped read command and without use of the map;
means for returning data corresponding to the location in the NVM; and
wherein the information of the pre-mapped read command comprises at least a portion of the translated LBA information.

EC350) The system of EC349, wherein the translated LBA information selectively comprises a location in the NVM or an indication that the LBA of the command is not present in the NVM.

EC351) The system of EC349, wherein the translated LBA information selectively comprises an address of a first one of one or more read units of the NVM and a length in read units.

EC352) The system of EC351, wherein a size of each of the one or more read units is at least 512 bytes.

EC353) The system of EC349, further comprising:
means for accessing a shadow copy of the map to translate the LBA to obtain the at least a portion of the translated LBA information; and
means for sending the pre-mapped read command including the at least a portion of the translated LBA information to the I/O device.

EC354) The system of EC353, wherein the accessing is at a computing host.

EC355) The system of EC353, wherein the shadow copy of the map comprises a plurality of entries, and each of the entries comprises an indication of validity.

EC356) The system of EC355,
wherein the LBA is one of a plurality of Logical Block Addresses (LBAs);
wherein the translated LBA information is one of a plurality of translated LBA information; and
wherein each of the valid entries of the shadow copy of the map associates one or more of the LBAs with a respective one of the plurality of translated LBA information.

EC357) The system of EC356, wherein each of the valid entries of the shadow copy of the map comprises at least a portion of the respective one of the plurality of translated LBA information.

EC358) The system of EC356, wherein at least one of the valid entries of the shadow copy of the map selectively specifies that the LBAs associated with the at least one of the valid entries are not present in the NVM.

EC359) The system of EC358, wherein the LBAs associated with the at least one of the valid entries are trimmed.

EC360) The system of EC355,
wherein the location in the NVM is one of a plurality of locations in the NVM; and
wherein each of the valid entries of the shadow copy of the map selectively specifies a respective location in the NVM.

EC361) The system of EC360, wherein each of the valid entries of the shadow copy of the map selectively specifies that data associated with the entry is not present in the NVM.

EC362) The system of EC355, further comprising:
means for initially marking all entries of the shadow copy of the map as invalid.

EC363) The system of EC355, further comprising:
means for, in response to sending a write command to the I/O device, marking an entry of the shadow copy of the map associated with a Logical Block Address (LBA) of the write command as invalid.

EC364) The system of EC363, further comprising:
at the I/O device, means for receiving the write command via the external interface; and
means for, subsequent to the receiving the write command, sending a shadow map update corresponding to the LBA of the write command.

EC365) The system of EC364, further comprising:
means for updating the shadow copy of the map according to the shadow map update; and
wherein the means for updating marks the entry of the shadow copy of the map associated with the LBA of the write command as valid.

EC366) The system of EC365, wherein the updating is by the I/O device.

EC367) The system of EC353, further comprising:
means for storing the shadow copy of the map in memory of a computing host coupled to the I/O device.

EC368) The system of EC367, further comprising:
means for sending the update to the shadow copy of the map from the I/O device to the computing host.

EC369) The system of EC367, wherein the memory of the computing host comprises a main memory of the computing host.

EC370) The system of EC367, wherein the memory of the computing host comprises an I/O space memory of the computing host.

EC371) The system of EC370, wherein the memory of the computing host is accessible by the I/O device in a PCIe address space.

EC372) The system of EC367, wherein the map is non-volatilely stored in the NVM.

EC373) The system of EC372, wherein the memory of the computing host comprises a volatile memory.

EC374) The system of EC349, wherein the map comprises a two-level map.

EC375) The system of EC374,
wherein the map comprises a first level and a second level; and
wherein the shadow copy of the map corresponds to the second level of the map.

EC376) A system comprising:
at an I/O device, means for receiving a write command via an external interface;

means for writing data of the write command to a location in a Non-Volatile Memory (NVM);
means for storing an association between a Logical Block Address (LBA) of the write command and the location in the NVM in a map; and
means for sending an update comprising information according to the location in the NVM to a shadow copy of the map.

EC377) The system of EC376, wherein the map comprises a two-level map.

EC378) The system of EC377,
wherein the map comprises a first level and a second level; and
wherein the shadow copy of the map corresponds to the second level of the map.

EC379) The system of EC376, wherein the information according to the location in the NVM comprises an address of a first one of one or more read units of the NVM and a length in read units EC380) The system of EC376, further comprising:
means for storing the shadow copy of the map in memory of a computing host coupled to the I/O device.

EC381) The system of EC380, further comprising:
means for sending the update to the shadow copy of the map from the I/O device to the computing host.

EC382) The system of EC380, wherein the memory of the computing host comprises a main memory of the computing host.

EC383) The system of EC380, wherein the memory of the computing host comprises an I/O space memory of the computing host.

EC384) The system of EC383, wherein the memory of the computing host is accessible by the I/O device in a PCIe address space.

EC385) The system of EC383, further comprising:
means for sending the update to the shadow copy of the map from the I/O device to the I/O space memory of the computing host.

EC386) The system of EC385, wherein the means for sending the update comprises means for sending a PCIe write request.

EC387) The system of EC385, wherein the means for sending the update comprises means for a read-modify-write of the shadow copy of the map.

EC388) The system of EC385, further comprising:
means for, prior to the I/O device executing a read command, fetching a translation of a Logical Block Address (LBA) of the read command from the shadow copy of the map.

EC389) The system of EC388, wherein the fetching is by the I/O device.

EC390) The system of EC389, wherein the means for fetching comprises means for sending a PCIe read request.

EC391) The system of EC388, wherein the fetching is by the computing host and the read command is a pre-mapped read command.

EC392) The system of EC380, wherein the map is non-volatilely stored in the NVM.

EC393) The system of EC392, wherein the memory of the computing host comprises a volatile memory.

EC394) A system comprising:
means for initializing a shadow copy of a map of an I/O device so that all of a plurality of entries of the shadow copy of the map are marked invalid;
means for receiving an update to the shadow copy of the map from the I/O device;
means for, according to the update to the shadow copy of the map, marking at least one of the entries of the shadow copy of the map as valid.

EC395) The system of EC394, wherein the means for marking according to the update further comprises means for associating translated Logical Block Address (LBA) information of the update with the at least one of the entries.

EC396) The system of EC395, wherein the translated LBA information comprises a location in Non-Volatile Memory (NVM) of the I/O device;

EC397) The system of EC394, wherein each of the entries of the shadow copy of the map selectively associates at least one Logical Block Address (LBA) of the I/O device with a location in Non-Volatile Memory (NVM) of the I/O device.

EC398) The system of EC394, wherein the map of the I/O device comprises a two-level map.

EC399) The system of EC398,
wherein the map of the I/O device comprises a first level and a second level; and
wherein the shadow copy of the map corresponds to the second level of the map of the I/O device.

EC400) The system of EC394, further comprising:
means for storing the shadow copy of the map in memory of a computing host coupled to the I/O device.

EC401) The system of EC400, further comprising:
means for sending the update to the shadow copy of the map from the I/O device to the computing host.

EC402) The system of EC400, wherein the memory of the computing host comprises a main memory of the computing host.

EC403) The system of EC400, wherein the memory of the computing host comprises an I/O space memory of the computing host.

EC404) The system of EC403, wherein the memory of the computing host is accessible by the I/O device in a PCIe address space.

EC405) The system of EC403, further comprising:
means for sending the update to the shadow copy of the map from the I/O device to the I/O space memory of the computing host.

EC406) The system of EC405, wherein the means for sending the update comprises means for sending a PCIe write request.

EC407) The system of EC405, wherein the means for sending the update comprises means for a read-modify-write of the shadow copy of the map.

EC408) The system of EC405, further comprising:
means for, prior to the I/O device executing a read command, fetching a translation of a Logical Block Address (LBA) of the read command from the shadow copy of the map.

EC409) The system of EC408, wherein the fetching is by the I/O device.

EC410) The system of EC409, wherein the means for fetching comprises means for sending a PCIe read request.

EC411) The system of EC408, wherein the fetching is by the computing host and the read command is a pre-mapped read command.

EC412) The system of EC400, wherein the map is not-volatilely stored in a Non-Volatile Memory (NVM) of the I/O device.

EC413) The system of EC412, wherein the memory of the computing host comprises a volatile memory.

EC414) A system comprising:
means for, determining if a request for an I/O device is a read request, the I/O device having a map, the map having a plurality of entries, each of at least some of the entries of the map mapping a respective Logical Block Address (LBA) of the I/O device to respective translated LBA information selectively comprising a location in a Non-Volatile Memory (NVM) of the I/O device, and a shadow copy of the map having a corresponding plurality of entries;

means for, if the request is a read request, determining if a particular one of the entries of the shadow copy of the map associated with an LBA of the read request is valid; and means for, if the particular entry is valid, selectively sending a pre-mapped read command comprising at least a portion of the respective translated LBA information according to the particular entry to the I/O device.

EC415) The system of EC414, wherein each of the entries of the shadow copy of the map corresponds to a respective entry of the map;

wherein each of the at least some of the entries of the map comprises the respective translated LBA information mapped to by the respective LBA; and wherein each of the entries of the shadow copy of the map corresponding to one of the at least some of the entries of the map comprises at least a portion of the respective translated LBA information.

EC416) The system of EC414, wherein the plurality of entries of the map are a second-level map.

EC417) The system of EC416, wherein the I/O device further has a first-level map.

EC418) The system of EC414, wherein the at least a portion of the respective translated LBA information selectively comprises the location in the NVM or an indication that the respective LBA is not present in the NVM.

EC419) The system of EC418, wherein the means for selectively sending comprises means for determining if the at least a portion of the respective translated LBA information according to the particular entry indicates that the LBA of the read request is not present in the NVM.

EC420) The system of EC419, wherein the means for selectively sending further comprises means for solely sending the pre-mapped read command to the I/O device if the at least a portion of the respective translated LBA information according to the particular entry indicates that the LBA of the read request is present in the NVM.

EC421) The system of EC420, wherein if the LBA of the read request is trimmed, then the at least a portion of the respective translated LBA information according to the particular entry indicates that the LBA of the read request is not present in the NVM.

EC422) The system of EC414, wherein the at least a portion of the respective translated LBA information selectively comprises an address of a first one of one or more read units of the NVM and a length in read units.

EC423) The system of EC422, wherein a size of each of the one or more read units is at least 512 bytes.

EC424) The system of EC414, further comprising:
means for, if the particular entry is invalid, sending a standard read command comprising the LBA of the read request to the I/O device.

EC425) The system of EC414, further comprising:
means for, if the request is a write request, marking one of the entries of the shadow copy of the map associated with an LBA of the write request as invalid.

EC426) The system of EC414, wherein each entry of the shadow copy of the map comprises a validity indication and a copy of at least some contents from a corresponding entry of the map.

EC427) The system of EC426, wherein if the particular entry is valid, the copy of at least some contents from the corresponding entry in the map is same as the at least some contents from the corresponding entry of the map.

EC428) The system of EC426, wherein valid entries of the shadow copy of the map are a subset of valid entries of the map.

EC429) The system of EC428, the subset is a proper subset.

EC430) The system of EC414, wherein each of the entries of the shadow copy of the map is either invalid or comprises information according to a corresponding entry of the map.

EC431) The system of EC414, wherein the map of the I/O device comprises a two-level map.

EC432) The system of EC431,
wherein the map of the I/O device comprises a first level and a second level; and
wherein the shadow copy of the map corresponds to the second level of the map of the I/O device.

EC433) The system of EC414, wherein each of the entries of the shadow copy of the map comprises an indication of validity.

EC434) The system of EC433, wherein each of the valid entries of the shadow copy of the map selectively associates a respective one or more of the LBAs with a respective location in the NVM.

EC435) The system of EC434, wherein at least one of the valid entries of the shadow copy of the map selectively specifies that at least one of the respective LBAs associated with the at least one of the valid entries is not present in the NVM.

EC436) The system of EC435, wherein the at least one of the respective LBAs associated with the at least one of the valid entries are trimmed.

EC437) The system of EC433, wherein each of the valid entries of the shadow copy of the map selectively specifics a respective location in the NVM.

EC438) The system of EC433, further comprising:
means for initially marking all of the entries of the shadow copy of the map as invalid.

EC439) The system of EC414, further comprising:
means for storing the shadow copy of the map in memory of a computing host coupled to the I/O device.

EC440) The system of EC439, further comprising:
means for receiving an update to the shadow copy of the map from the I/O device.

EC441) The system of EC439, wherein the memory of the computing host comprises a main memory of the computing host.

EC442) The system of EC439, wherein the memory of the computing host comprises an I/O space memory of the computing host.

EC443) The system of EC442, wherein the memory of the computing host is accessible by the I/O device in a PCIe address space.

EC444) The system of EC442, further comprising:
means for sending the update to the shadow copy of the map from the I/O device to the I/O space memory of the computing host.

EC445) The system of EC444, wherein the means for sending the update comprises means for sending a PCIe write request.

EC446) The system of EC444, wherein the means for sending the update comprises means for a read-modify-write of the shadow copy of the map.

EC447) The system of EC444, further comprising:

means for, prior to the I/O device executing a particular command, fetching a translation of an LBA of the particular command from the shadow copy of the map.

EC448) The system of EC447, wherein the fetching is by the I/O device.

EC449) The system of EC448, wherein the means for fetching comprises means for sending a PCIe read request.

EC450) The system of EC447, wherein the fetching is by the computing host.

EC451) The system of EC450, wherein the particular command is a pre-mapped read command.

EC452) The system of EC439, wherein the map is non-volatilely stored in the NVM.

EC453) The system of EC452, wherein the memory of the computing host comprises a volatile memory.

EC454) A system comprising:
at an I/O device, means for receiving an indication to enter a low-power state;
means for saving internal state of the I/O device in a system-accessible memory of a computing host;
at the I/O device, means for receiving an indication to exit the low-power state; and
means for restoring the internal state of the I/O device from the system-accessible memory.

EC455) The system of EC454, wherein the system-accessible memory of the computing host comprises a main memory of the computing host.

EC456) The system of EC454, wherein the system-accessible memory of the computing host comprises an I/O space memory of the computing host.

EC457) The system of EC456, wherein the system-accessible memory of the computing host is accessible by the I/O device in a PCIe address space.

EC458) A system comprising:
means for receiving a command to access storage, the command specifying an access type and having one or more parameters;
means for determining a location of the storage; and
wherein the means for determining comprises means for conditionally referencing an included data structure to ascertain the location, the referencing being omitted when one or more of the parameters comprise a specification of the location.

EC459) The system of EC458, wherein the Specification comprises one or more of
an identification of a region of the storage,
an identification of a physical address of the storage,
a length of data of the storage, and
a span of data of the storage.

EC460) The system of EC458, wherein the included data structure comprises one or more entries each describing where data associated with a respective one or more Logical Block Addresses (LBAs) is located in the storage.

EC461) The system of EC460, wherein each of the entries further selectively describes one or more attributes associated with the respective LBAs.

EC462) The system of EC460, wherein each of the entries further describes one or more attributes associated with one or more regions of the storage.

EC463) The system of EC458, further comprising means for providing, before the receiving, an update describing a modification to the included data structure.

EC464) The system of EC463, wherein the command is provided by a computing host, and the update is provided to the computing host.

EC465) The system of EC463, wherein the update comprises the specification of the location.

EC466) The system of EC465, wherein the command is according to a Logical Block Address (LBA) and the providing is in response to processing a write command to the LBA.

EC467) The system of EC465, wherein the means for providing is in response to recycling and/or relocating one or more portions of Non-Volatile Memory (NVM) implementing at least some of the storage.

EC468) The system of EC458, wherein the receiving and the determining are via an I/O storage, device.

EC469) The system of EC458, wherein the command is provided by a computing host.

EC470) The system of EC458, wherein the parameters comprise standard parameters and non-standard parameters, the standard parameters being defined by a standard, the non-standard parameters not being defined by the standard, and the non-standard parameters comprise the parameters that comprise the specification.

EC471) The system of EC458, wherein the command is defined by a standard and the parameters that comprise the specification are not defined by the standard.

EC472) The system of EC470 or EC471, wherein the parameters that comprise the specification comprise one or more of
reserved command codes,
vendor-specific parameters,
reserved fields,
unused fields, and
values in capability registers.

EC473) The system of EC458, further comprising means for performing an access of the storage in accordance with the access type and the location.

EC474) The system of EC473, wherein the access type is a read access type and the access is a read access.

EC475) The system of EC474, wherein the parameters comprise the specification.

EC476) The system of EC475, wherein the command is a pre-mapped read command.

EC477) The system of EC458, wherein the location is a first location and further comprising means for performing an access of the storage in accordance with the access type and a second location.

EC478) The system of EC477, wherein the access type is a write access type and the access is a write access.

EC479) The system of EC478, further comprising means for providing an update describing a modification to the included data structure, the update comprising a specification of the second location.

EC480) The system of EC478, further comprising means for revising an accounting of usage of the storage in accordance with the specification.

EC481) The system of EC458, wherein the command is a trim command and the access type is a trim access type.

EC482) The system of EC481, further comprising means for providing an update describing a modification to the included data structure, the update comprising a specification of an attribute of a Logical Block Address (LBA) that was mapped to the location before the receiving of the command.

EC483) The system of EC482, wherein the attribute indicates that the LBA has been trimmed.

EC484) The system of EC481, further comprising means for revising an accounting of usage of the storage in accordance with the specification.

EC485) A system comprising:

means for receiving a command, the command being one of a plurality of command types, the command types comprising a first type and a second type;

means for determining which of the command types the command is;

means for, if the command is of the first type, then performing first processing and then performing second processing;

means for, if the command is of the second type, then performing the second processing without performing the first processing;

wherein the second processing uses information produced by the first processing if the command is of the first type and provided by the command if the command is of the second type.

EC486) The system of EC485, wherein the command is to access storage of an I/O storage device.

EC487) The system of EC486, wherein the first processing comprises accessing an included data structure to produce the information.

EC488) The system of EC487, wherein the included data structure is a map describing mappings between Logical Block Addresses (LBAs) and physical addresses of Non-Volatile Memory (NVM) implementing at least some of the storage, and the information comprises at least part of one of the mappings.

EC489) The system of EC488, wherein commands of the first type specify at least one of the LBAs.

EC490) The system of EC489, wherein commands of the second type do not specify any of the LBAs.

EC491) The system of EC487, further comprising means for providing, before the receiving, an update describing a modification to the included data structure.

EC492) The system of EC491, wherein the update comprises a specification of the information.

EC493) The system of EC492, wherein the specification comprises one or more of an identification of a region of the storage;

an identification of a physical address of the storage, a length of data of the storage, and a span of data of the storage.

EC494) The system of EC492, wherein the means for providing it in response to receiving, a write command type of the command types.

EC495) The system of EC492, wherein the means for providing is in response to recycling and/or relocating a portion of Non-Volatile Memory (NVM) implementing at least some of the storage.

EC496) The system of EC491, wherein the command is provided by a computing host, and the update is provided to the computing host.

EC497) The system of EC486, wherein the receiving, the determining, and the two acts of performing are via the I/O storage device.

EC498) The system of EC486, wherein the command is provided by a computing host.

EC499) The system of EC485, wherein the commands of the first type are defined by a standard and the commands of the second type are not defined by the standard.

EC500) The system of EC485, wherein when the command is of the second type, the information is provided via one or more of reserved command codes, vendor-specific parameters, reserved fields, unused fields, and values in capability registers.

EC501) The system of EC487, wherein the first type comprises a read type and the second type comprises a pre-mapped read type.

EC502) The system of EC501, wherein the access of the storage is a read access, the information comprises a location of the storage, and the second processing comprises reading the location.

EC503) The system of EC487, wherein the first type comprises a first write type, the second type comprises a second write type, and the second write type provides the information while the first write type does not.

EC504) The system of EC503, wherein the access of the storage is a write access, the information comprises a first location of the storage, and the second processing comprises writing a second location of the storage and revising an accounting of usage of the storage in accordance with the first location.

EC505) The system of EC504, further comprising means for providing an update describing a modification to the included data structure, the update comprising a specification of the second location.

EC506) The system of EC487, wherein the first type comprises a first, trim type, the second type comprises a second trim type, and the second trim type provides the information while the first trim type does not.

EC507) The system of EC506, wherein the access of the storage is at trim access, the information comprises a location of the storage, and the second processing comprises revising an accounting of usage of the storage in accordance with the location.

EC508) The system of EC507, further comprising means for providing an update describing a modification to the included data structure, the update comprising a specification of an attribute of a Logical Block Address (LBA) that was mapped to the location according to the included data structure before the receiving of the command.

EC509) The system of EC508, wherein the attribute indicates that the LBA has been trimmed.

EC510) A system comprising:

means for receiving a command from a computing host, the command comprising zero or more standard parameters and one or more non-standard parameters;

means for performing the command in accordance with the standard parameters, and wherein the receiving and the performing are via an I/O storage device that is enabled to use the non-standard parameters to operate with a higher efficiency than without benefit of the non-standard parameters.

EC511) The system of EC510, wherein the I/O storage device interfaces storage to the computing host.

EC512) The system of EC510, wherein the I/O storage device is enabled to use the non-standard parameters to perform the command with a higher efficiency than without benefit of the non-standard parameters.

EC513) The system of EC512, further comprising means for managing a Non-Volatile Memory (NVM), that implements at least a portion of storage of the I/O storage device.

EC514) The system of EC513, wherein the command is a read command and one or more of the non-standard parameters specify at least in part a physical location in the NVM, and further comprising means for reading the physical location.

EC515) The system of EC514, further comprising means for the I/O storage device to perform mapping updates to an included I/O device map and to provide at least some of the mapping updates to the computing host to enable the computing host to update a computing host map, the computing host map and the I/O device map each having respective entries describing mappings between Logical Block Addresses (LBAs) and locations of the NVM, and at least one of the non-standard parameters being determined at least in part via accessing the computing host map.

EC516) The system of EC515, wherein a latency to access the computing host map is less than a latency to access the I/O device map, and the higher efficiency comprises lower latency.

EC517) The system of EC513, wherein the command is a write command and one or more of the non-standard parameters specify at least in part a first physical location in the NVM, and further comprising writing a second physical location in the NVM and revising an accounting of usage of the storage in accordance with the first physical location.

EC518) The system of EC517, further comprising means for the I/O storage device to perform mapping updates to an included I/O device map and to provide at least some of the mapping updates to the computing host to enable the computing host to update a computing host map, the computing host map and the I/O device map each having respective entries describing mappings between Logical Block Addresses (LBAs) and locations of the NVM, and at least one of the non-standard parameters being determined at least in part via accessing the computing host map.

EC519) The system of EC518, wherein a latency to access the computing host map is less than a latency to access the I/O device map, and the higher efficiency comprises lower latency.

EC520) The system of EC510, wherein the command is a first command, and the I/O storage device is enabled to perform a second command, received after the first command, in accordance with the non-standard parameters and with a higher efficiency than without benefit of the non-standard parameters.

EC521) The system of EC520, further comprising means for managing, a Non-Volatile Memory (NVM) that implements at least a portion of storage of the I/O storage device.

EC522) The system of EC521, further comprising means for the I/O storage device to manage an included map having entries describing mappings between Logical Block Addresses (LBAs) and locations of the NVM.

EC523) The system of EC522, wherein at least a portion of one or more of the standard parameters comprises a particular LBA and further comprising the I/O storage device storing at least some information determined from the non-standard parameters in at least a selected one of the entries, the selected entry selected at least in part by the particular LBA.

EC524) The system of EC523, wherein the second command is according to the particular LBA.

EC525) The system of EC523, wherein the information comprises an identification of a particular one of a plurality of data bands, and further comprising means for the I/O storage device to recycle portions of the NVM to which the particular LBA is mapped to remain in the particular data band.

EC526) The system of EC521, wherein at least one or more of the non-standard parameters specify at least in part one of a plurality of types of data, the types of data comprising any two or more of
  a compressible type of data,
  an incompressible type of data, and
  a usage model type of data.

EC527) The system in of EC526, wherein the usage model type of data comprises a database journal type of data, and further comprising means for the I/O storage device to manage the NVM to store data associated with the database journal type of data in a database journal data band of a plurality of data bands, and means for the I/O storage device to manage the database journal data band such that when an amount of data in the database journal band exceeds a threshold, older data of the database journal band is selectively deleted.

EC528) The system of EC527, further comprising means for deleting the older data when the older data is recycled.

EC529) The system of EC521, wherein at least one or more of the non-standard parameters specify at least in part one of a plurality of data access types, the data access types comprising any two or more of
  a read/write data access type,
  a read-mostly data access type,
  a write-mostly data access type, and
  a transient data access type.

EC530) The system of EC529, wherein the second command is a write command, and further comprising means for the I/O storage device to write a particular portion of the NVM in response to the write command, the particular portion being determined at least in part by the data access type.

EC531) The system of EC530, wherein the data access type is a read/write data access type, and the particular portion has not endured relatively many program/erase cycles and has not endured relatively fewer program/erase cycles.

EC532) The system of EC530, wherein the data access type is a read-mostly data access type, and the particular portion has endured relatively many program/erase cycles.

EC533) The system of EC530, wherein the data access type is a write-mostly data access type, and the particular portion has endured relatively fewer program/erase cycles.

EC534) The system of EC531, EC532, or EC533, wherein the higher efficiency comprises higher reliability.

EC535) The system of EC531, EC532, or EC533, wherein the higher efficiency comprises longer lifetime.

EC536) The system of EC529, wherein at least a portion of one or more of the standard parameters comprises a particular LBA and the data access type is the transient data access type, and further comprising means for the I/O storage device, in response to a particular event, to delete data stored at locations in the NVM corresponding to the particular LBA.

EC537) The system of EC536, wherein the means for deleting the data comprises means for updating a map of the I/O storage device at an entry of the map according to the particular LBA to specify that data corresponding to the particular LBA is not present in the NVM.

EC538) The system of EC536, wherein the means for deleting the data comprises means for trimming the data.

EC539) The system of EC536, wherein the particular event is any one or more of
  an NVM management operation of the I/O storage device,
  an NVM recycling operation of the I/O storage device,
  a power-cycle of the I/O storage device;
  a reset of the I/O storage device,
  a virtual machine power-cycle of a virtual I/O storage device,
  a virtual machine reset of a virtual I/O storage device,
  an explicit request from, the computing host, and
  a request from a memcached application.

EC540) The system of EC521, wherein at least one or more of the non-standard parameters specify at least in part one of a plurality of data sequencings, the data sequencings comprising any two or more of a sequential sequencing and an atomic sequencing.

EC541) The system of EC521, wherein at least one or more of the non-standard parameters specify at least in part one of a plurality of data relationships, the data relationships comprising any two or more of a read and/or write association between multiple items of data and a prefetch data relationship.

EC542) The system of EC521, wherein at least one or more of the non-standard parameters specify at least in part one of a plurality of data destinations, the data destinations comprising any two or more of
 a particular portion of the NVM,
 a hierarchical storage tier,
 a type of storage, and
 a particular data band.

EC543) The system of EC542, wherein the type of storage is any one or more of
 Single-Level Cell (SLC),
 Multi-Level Cell (MLC),
 Magnetic Random Access Memory (MRAM),
 volatile, and
 non-volatile.

EC544) The system of EC542, wherein the specification of to one of the data destinations enables improvement of one or more of
 write speed,
 recycling speed,
 recycling frequency, and
 write amplification.

EC545) The system of EC521, wherein at least one or more of the non-standard parameters specify at least in part one of a plurality of command processing characteristics, the command processing characteristics comprising any two or more of
 a command priority,
 command ordering,
 a barrier to particular types of commands,
 a boundary between particular types of commands,
 an aggregation of commands,
 a fusing of commands, and
 atomic operation of commands.

EC546) The system of EC512 or EC520, wherein the higher efficiency comprises higher performance.

EC547) The system of EC546, wherein the higher performance comprises one or more of
 higher bandwidth,
 lower latency, and
 lower power.

EC548) The system of EC512 or EC520, wherein the higher efficiency comprises higher reliability.

EC549) The system of EC548, wherein the higher reliability comprises one or more of lower error rate and longer lifetime.

EC550) A system comprising:
 means for receiving a command from a computing host, the command requesting return of a non-standard statistic value;
 means for returning the non-standard statistic value to the computing host, and
 wherein the receiving and the returning are via an I/O storage device that is enabled to compute the non-standard statistic.

EC551) The system of EC550, further comprising means for reducing a size of data to be written to a Non-Volatile Memory (NVM) that implements at least a portion of storage of the I/O storage device; and wherein the computing is based at least in part on the reducing.

EC552) The system of EC551, wherein the means for reducing comprises means for compression.

EC553) The system of EC551, wherein the means for reducing comprises means for data de-duplication.

EC554) The system of EC551, wherein the non-standard statistic is according to usage of the NVM.

EC555) The system of EC554, wherein the usage of the NVM varies according to a quality of the reducing.

EC556) The system of EC554, wherein the usage of the NVM varies according to a number and/or a size of trim commands received from the computing host.

EC557) The system of EC554, wherein the usage of the NVM varies according to an amount of transient data received from the computing host.

EC558) The system of EC557, wherein the usage of the NVM varies according to an amount of the transient data that has been trimmed by the I/O storage device.

EC559) The system of EC554, wherein the non-standard statistic is according to a percentage usage of the NVM.

EC560) The system of EC554, wherein the non-standard statistic is according to a write amplification of the I/O storage device.

EC561) The system of EC551, wherein the non-standard statistic is a size of one or more bands of the NVM.

EC562) The system of EC551, wherein the non-standard statistic is a usage of one or more bands of the NVM.

EC563) The system of EC562, wherein the usage of the one or more bands of the NVM varies according to a quality of the reducing.

EC564) The system of EC468, EC486, EC511, or EC550, wherein the I/O storage device comprises a Solid-State Disk (SSD) controller the means for receiving the command.

EC565) The system of EC564, wherein the SSD controller is implemented in a single Integrated Circuit (IC).

EC566) The system of EC565, wherein at least a portion of the storage is implemented via Non-Volatile Memory (NVM).

EC567) The system of EC566, wherein the NVM comprises one or more flash memories.

EC568) The system of EC566, wherein at least a portion of the NVM comprises one or more of
 NAND flash technology storage ells, and
 NOR flash technology storage cells.

EC569) The system of EC566, wherein at least a portion of the NVM comprises one or more of
 Single-Level Cell (SLC) flash technology storage cells, and
 Multi-Level Cell (MLC) flash technology storage cells.

EC570) The system of EC566, wherein the SSD controller comprises an NVM interface enabled to communicate data with the NVM, at least some of the data being associated with at least some of the commands.

EC571) The system of EC570, wherein the NVM interface is compatible with one or more of
 an Open NAND Flash Interface (ONFI),
 a Toggle-mode interface,
 a Dual Data Rate (DDR) synchronous interface,
 a synchronous interface, and
 an asynchronous interface.

EC572) The system of EC566, wherein the SSD controller and the NVM are comprised in an SSD.

EC573) The system of EC564, wherein the SSD controller comprises a storage interface that is compatible with a storage interface standard and enabled to couple to a computing host that provides the command via the storage interface.

EC574) The system of EC573, further comprising means for operating the computing host to provide the command.

EC575) Any of the foregoing ECs having or referring to at least one storage interface standard, wherein the storage interface standard comprises one or more of
- a Universal Serial Bus (USB) interface standard,
- a Compact Flash (CF) interface standard,
- a MultiMediaCard (MMC) interface standard,
- a Secure Digital (SD) interface standard,
- a Memory Stick interface standard,
- an xD-picture card interface standard,
- an Integrated Drive Electronics (IDE) interface standard,
- a Serial Advanced Technology Attachment (SATA) interface standard,
- an external SATA (eSATA) interface standard,
- a Small Computer System Interface (SCSI) interface standard,
- a Serial Attached Small Computer System Interface (SAS) interface standard,
- a Fibre Channel interface standard,
- an Ethernet interface standard, and
- a Peripheral Component Interconnect express (PCIe) interface standard.

EC576) Any of the foregoing ECs having or referring to at least one computing host, wherein the computing host comprises one or more of
- a computer,
- a workstation computer,
- a server computer,
- a storage server,
- a Personal Computer (PC),
- a laptop computer,
- a notebook computer,
- a netbook computer,
- a Personal Digital Assistant (PDA),
- a media player,
- a media recorder,
- a digital camera,
- a cellular handset,
- a cordless telephone handset, and
- an electronic game.

System

FIG. 1A illustrates selected details of an embodiment of SSD 101 including an SSD controller compatible with operation in an I/O device (such as an I/O storage device) enabled for interoperation with a host (such as a computing host). The SSD controller is for managing non-volatile storage, such as implemented via NVM elements (e.g., flash memories). SSD Controller 100 is communicatively coupled via one or more External Interfaces 110 to a host (not illustrated). According to various embodiments. External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more instances of Flash Device 192. According to various embodiments. Device Interfaces 190 are one or more of: an asynchronous interface; a synchronous interface; a DDR synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each of Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, read-only memory, static random access memory, dynamic random access memory, ferromagnetic memory, phase-change memory, racetrack memory, or any other type of memory device or storage medium.

According to various embodiments, Device Interfaces 190 are organized as: one or more busses with one or more instances of Flash Device 192 per bus; one or more groups of busses with one or more instances of Flash Device 192 per bus, having busses in a group generally accessed in parallel; or any other organization of one or more instances of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example. In some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read: in response the SSD provides read status and/or read data. For another example, the commands include a pre-mapped read command specifying a location in NVM 199 and a length and/or a span of data in read unit quanta. For yet another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more instances of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability, with redundancy at a flash device level (e.g., multiple ones of Flash Device 192) and/or a flash die level (e.g., Flash Die 194) instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the map points to a default value to return if the LBAs are read. For example, when processing a de-allocation command, the map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory on-chip memory; off-chip memory; and any combination of the foregoing.

In some embodiments, Recycler 151 performs garbage collection. For example in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a PC, a laptop computer, a notebook computer, a netbook computer, a PDA, a media player, a media recorder, a digital camera, a cellular handset, a cordless, telephone handset, and an electronic game.

In various embodiments, all or any portions of an SSD controller (or a computing-host flash memory controller) are implemented on a single IC, a single die of a multi-die 1C, a plurality of dice of a multi-die 1C, or a plurality of ICs. For example, Buffer 131 is implemented on a same die as other elements of SSD Controller 100. For another example, Buffer 131 is implemented on a different die than other elements of SSD Controller 100.

Figure 1B:
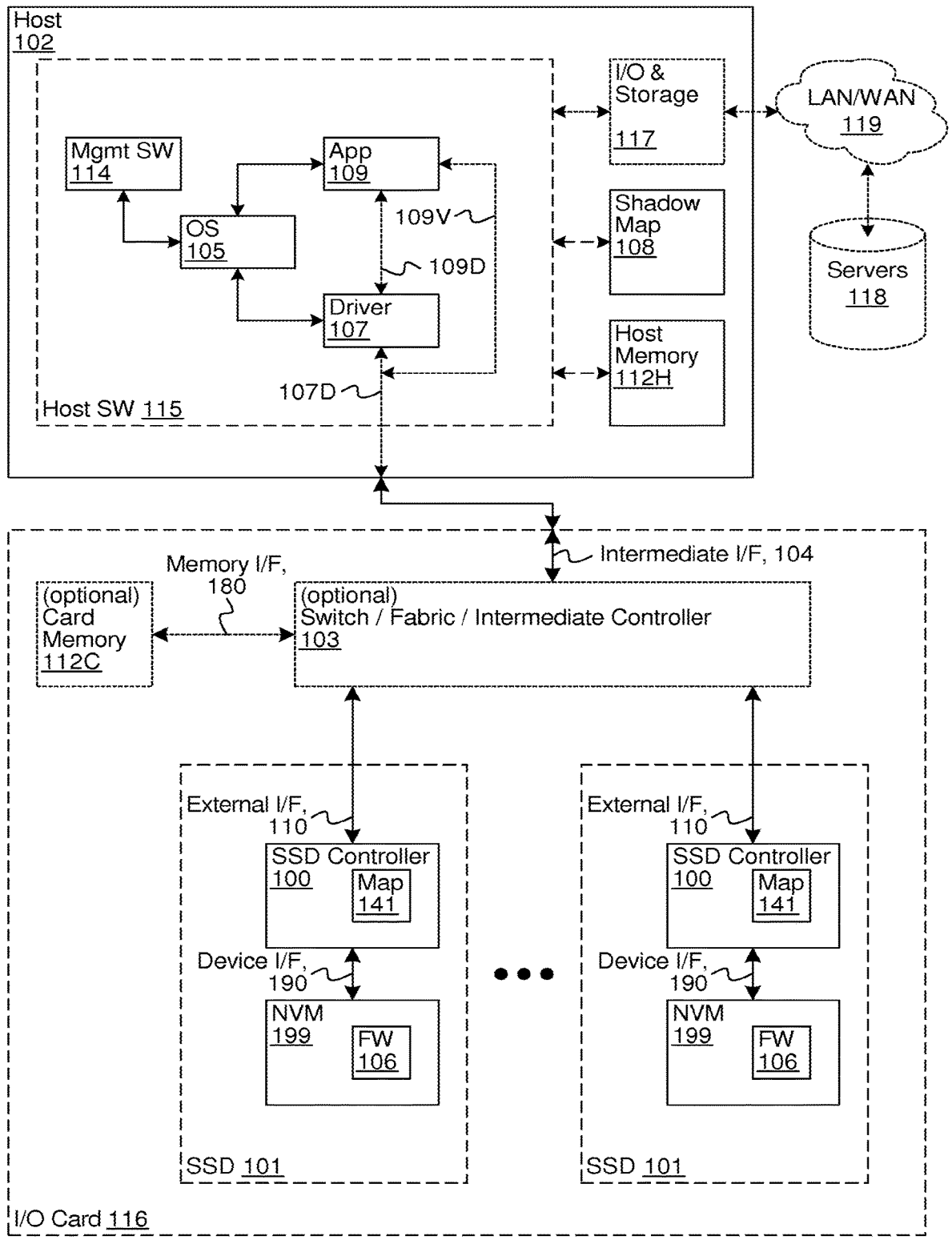
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software←→I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard-statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application←→I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application←→I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond. e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated awl/or provided by a driver.

In some embodiments, Host 102 includes Shadow Map 108 as a distinct hardware resource, while in other embodiments, a shadow map is implemented partially or entirely via Host Memory 112H. Examples of Shadow Map 108, the Host Memory 112H, and Card Memory 112C are one or more volatile and/or NVM elements, such as implemented via DRAM, SRAM, and/or flash devices. Further examples of the host memory are system memory, host main memory, host cache memory, host-accessible memory, and I/O device-accessible memory.

As is described in more detail elsewhere herein, in various embodiments Host 102 and/or one or more of the instances of SSD 101 are enabled to access Shadow Map 108 to save and retrieve all or any portions of mapping information usable to convert LBAs to block and/or page addresses targeting one or more portions of I/O device NVM, such as elements of one or more of the instances of NVM 199. Conceptually the Shadow Map follows (e.g. shadows) information in one or more of the instances of Map 141. Information in the Shadow Map is updated via one or more of Host 102 (e.g. in conjunction with issuing a command to an SSD) and one or more of the instances of SSD 101 (e.g. in conjunction with processing a command from a host). In some embodiments and/or usage scenarios (such as some embodiments having I/O Card 116 and using (optional) Card Memory 112C of FIG. 1B as storage for a shadow map), one or more I/O devices, e.g. SSDs, access the shadow map and a host does not. As is also described in more detail elsewhere herein, in various embodiments, one or more of the instances of SSD 101 are enabled to access Card Memory 112C and/or Host Memory 112H to save and restore state information internal to the respective SSD instance, such as when entering and exiting a sleep State.

In some embodiments lacking the Switch/Fabric/Intermediate Controller, the SSD is coupled to the host directly via External Interfaces 110. In various embodiments, SSD Controller 100 is coupled to the host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments with Host 102 as a computing host (e.g. a computer, a workstation computer, a server computer, a storage server, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Mapping Operation

Figure 2:
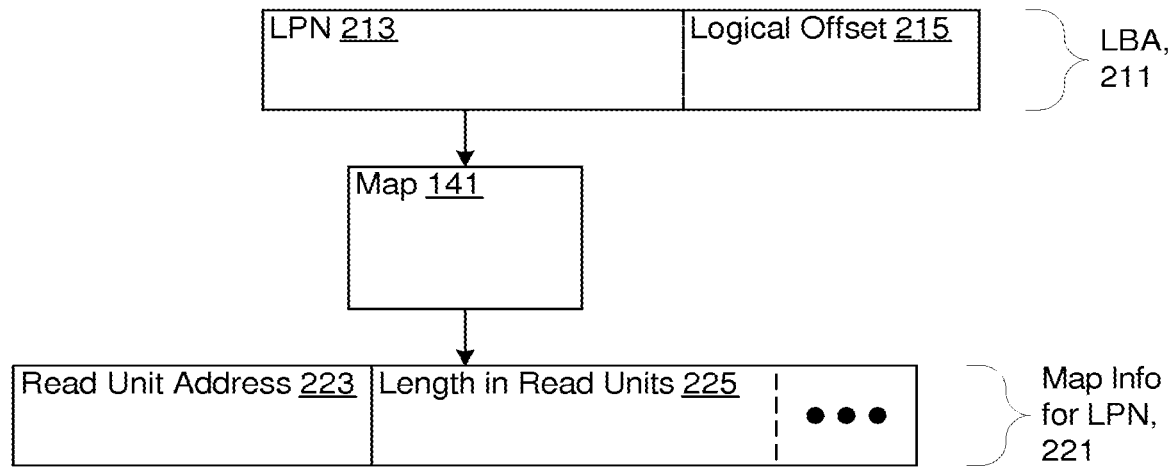
FIG. 2 illustrates selected details of an embodiment of mapping a Logical Page Number (LPN) portion of a Logical Block Address (LBA).

FIG. 2 illustrates selected details of an embodiment of mapping an LPN portion of an LBA. In some embodiments, a read unit is a finest granularity of an NVM that is independently readable, such as a portion of a page of the NVM. In further embodiments, the read unit corresponds to check bits (sometimes-termed redundancy) of a (lower-level) error-correcting code along with all data protected by the check bits. For example, ECC 161 of FIG. 1A implements error correction via check bits such as via an LDPC code, and a read unit corresponds to coding bits implementing the LDPC code in addition to data bits protected by the LDPC coding bits.

In some embodiments, Map 141 maps LPN 213 portion of LBA 211 to Map Info for LPN 221, such as via Table 143 (as illustrated in FIG. 1A). Map info for an LPN (such as Map Info for LPN 221) is sometimes termed a map entry. Map 141 is said to associate an LPN with a corresponding map entry. In various embodiments, mapping is via one or more associative look-ups, via one or more non-associative look-ups, and/or via one or more other techniques.

In some embodiments, SSD Controller 100 maintains one map entry for each LPN potentially and/or actively in use.

In some embodiments, Map Info for LPN 221 includes respective Read Unit Address 223 and Length in Read Units 225. In some embodiments, a length and/or a span are stored encoded, such as by storing the length as an offset from the span, e.g. in all or any portions of Length in Read Units 225. In further embodiments, a first LPN is associated with a first map entry, a second LPN (different from the first LPN, but referring to a logical page of a same size as a logical page-referred to by the first LPN) is associated with a second map entry, and the respective length in read units of the first map entry is different from the respective length in read units of the second map entry.

In various embodiments, at a same point in time, a first LPN is associated with a first map entry, a second LPN (different from the first LPN) is associated with a second map entry, and the respective read unit address of the first map entry is the same as the respective read unit address of the second map entry. In further embodiments, data associated with the first LPN and data associated with the second LPN are both stored in a same physical page of a same device in NVM 199.

According to various embodiments, Read Unit Address 223 is associated with one or more of: a starting address in the NVM; an ending address in the NVM; an offset of any of the preceding; and any other techniques for identifying a portion of the NVM associated with LPN 213.

Figure 3:
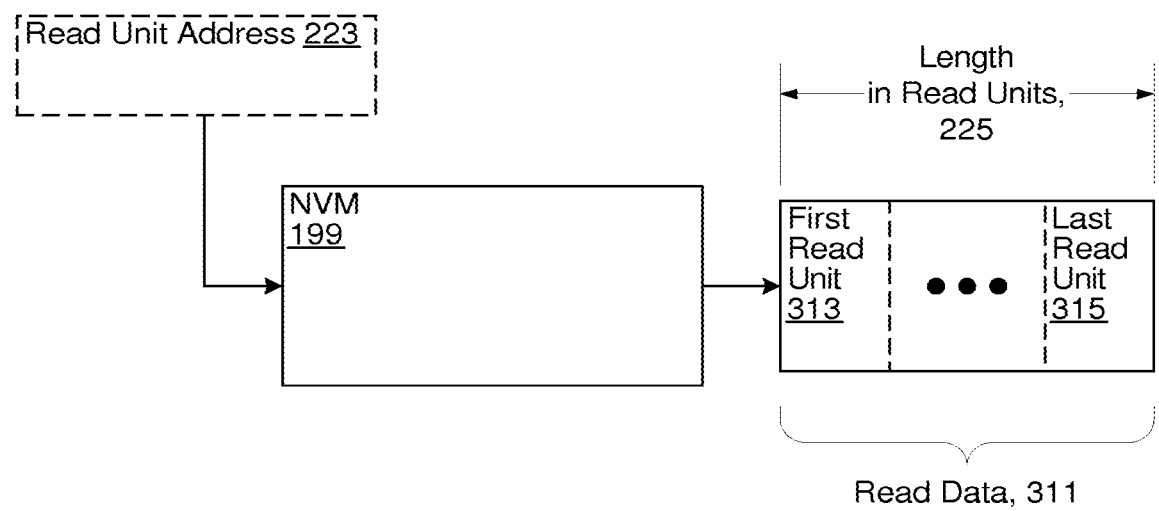
FIG. 3 illustrates selected details of an embodiment of accessing a Non-Volatile Memory (NVM) at a read unit address to produce read data organized as various read units, collectively having a length measured in quanta of read units.

FIG. 3 illustrates selected details of an embodiment of accessing an NVM at a read unit address to produce read data organized as various read units, collectively having a length measured in quanta of read units. According to various embodiments, First Read Unit 313 is one or more of: a one of read units in Read Data 311 with a lowest address in an address space of the NVM; a fixed one of the read units; an arbitrary one of the read units; a variable one of the read units; and a one of the read units selected by any other technique. In various embodiments, SSD Controller 100 is enabled to access NVM 199 and produce Read Data 311 by reading no more than a number of read units specified by Length in Read Units 225.

Figure 4A:
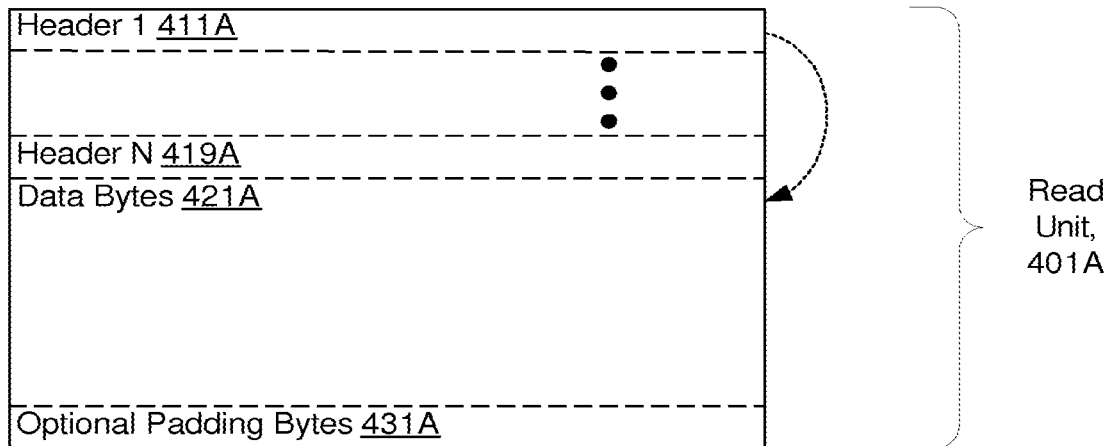
FIG. 4A illustrates selected details of an embodiment of a read unit.

FIG. 4A illustrates selected details of an embodiment of a read unit (such as Read Units 313 or 315 of FIG. 3) as Read Unit 401A. In various embodiments and usage scenarios, Header 1 411A through Header N 419A are contiguous, and respective data regions identified (such as via respective offsets) by each of the headers are contiguous following a last once of the headers. The data regions collectively form Data Bytes 421A. The data regions are stored in a location order that matches the location order the headers are stored. For example, consider a first header, at the beginning of a read unit, with a second header and a third header contiguously following the first header. A first data region (identified by a first offset in the first header) contiguously follows the third header. A second data region (identified by a second offset in the second header) contiguously follows the first data region. Similarly, a third data region (identified by the third header) contiguously follows the second data region.

Figure 4B:
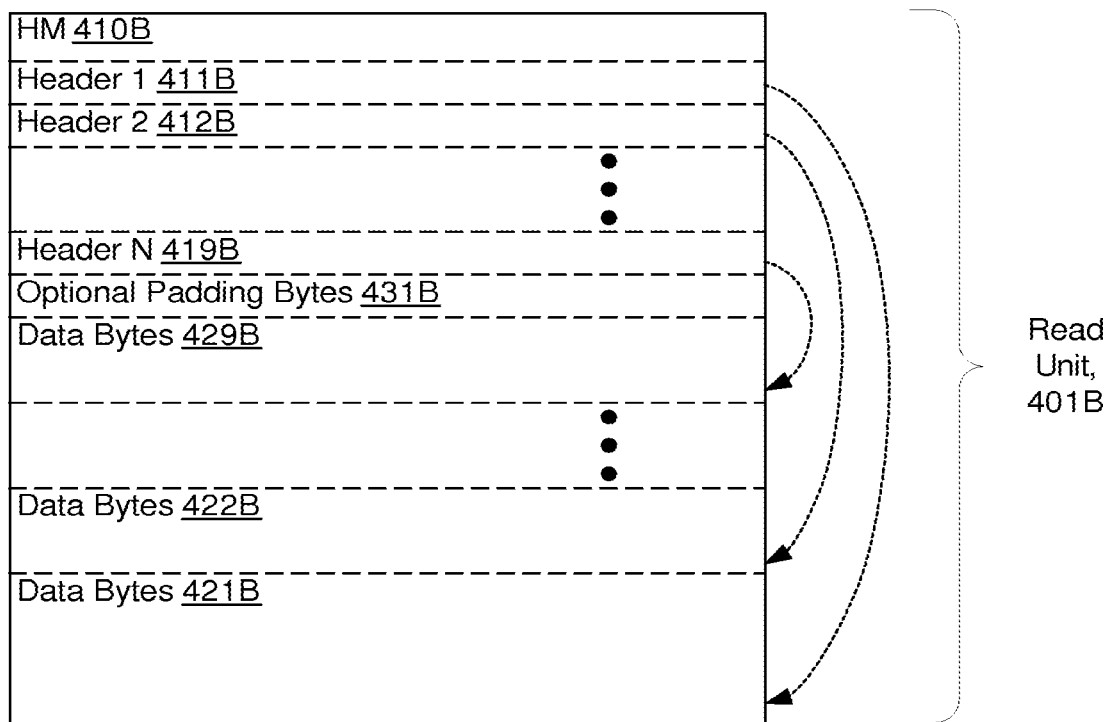
FIG. 4B illustrates selected details of another embodiment of a read unit.

FIG. 4B illustrates selected details of another embodiment of a read unit (such as Read Units 313 or 315 of FIG. 3) as Read Unit 401B. In various embodiments and usage scenarios, Header Marker (HM) 410B is an optional initial field (such as a one-byte field) indicating a number of following contiguous headers (Header 1 411B, Header 2 412B . . . Header 419B). Data regions (Data Bytes 421B, Data Bytes 422B . . . Data Bytes 429B) are identified respectively by the headers (Header 1 411B, Header 2 412B . . . Header N 419B) and are stored in a location order that is opposite of the location order that the headers are stored. Headers start at the beginning of a read unit, while corresponding data regions start at the end of a read unit. In some embodiments, data bytes within a data region (e.g. Data Bytes 421B, Data Bytes 422B . . . Data Bytes 429B) are arranged in a forward order (byte order matching location order), while in other embodiments, the data bytes are arranged in a reverse order (byte order reversed with respect to location order). In some embodiments, a header marker its used in read units where headers and data bytes are stored in a same location order (e.g. as illustrated in FIG. 4A).

In some embodiments, Optional Padding Bytes 431A (or 431B) are according to granularity of data associated with a particular LPN. For example, in some embodiments, if Data Bytes 421A (or collectively Data Bytes 421B, Data Bytes 422B . . . Data Bytes 429B) have less than a fixed amount of remaining space, such as 8 bytes, after storing data associated with all but a last one of Header 1 411A through Header N 419A (or Header 1 411B, Header 2 412B . . . Header N 419B), then data for an LPN associated with the last header starts in a subsequent read unit. In further embodiments, a particular offset value (e.g. all ones) in the last header indicates that the data for the LPN associated with the last header starts in the subsequent read unit.

Figure 5:
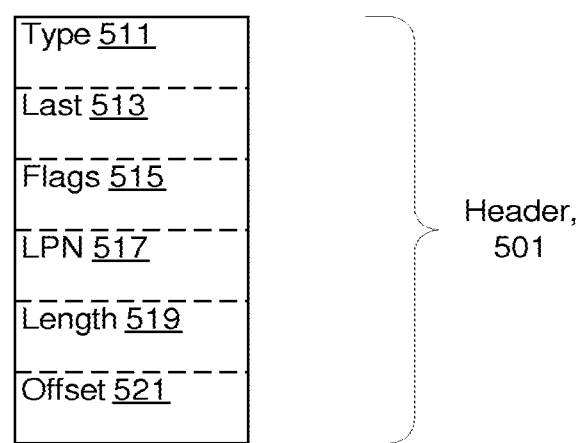
FIG. 5 illustrates selected details of an embodiment of a header having a number of fields.

FIG. 5 illustrates selected details of an embodiment of a header (such as any of Header 1 411A through Header N 419A of FIG. 4A or Header 1 411B through Header 419B of FIG. 4B) having a number of fields. In some embodiments, headers are fixed-length (e.g. each header is a same number of bytes long). Header 501 includes fields Type 511, Last Indicator 513, Flags 515, LPN 517, Length 519, and Offset 521. The type field identities a category of the data bytes. For example, the type field indicates the category of the data bytes is one of host data (e.g. logical page data) or system data (e.g. map information or checkpoint information). The last field indicates that the header is the last header before the data bytes. In some embodiments with a header marker, the last field is optionally omitted. The LPN field is the LPN that the header is associated with. The LPN field enables parsing of the headers to determine a particular one of the headers that is associated with a particular LPN by, for example, searching the headers for one with an LPN field matching the particular LPN. The length field is the length, in bytes, of the data bytes (e.g. how many bytes of data there are in Data Bytes 421A associated with Header 501). In some embodiments, an offset in the offset 2 field is rounded according to a particular granularity (e.g. 8-byte granularity).

In various embodiments, some or all information associated with a particular LPN is stored in a map entry associated with the particular LPN, a header associated with the particular LPN, or both. For example, in some embodiments, some or all of Length 519 is stored in a map entry rather than in a header.

Command Operation

Figure 6:
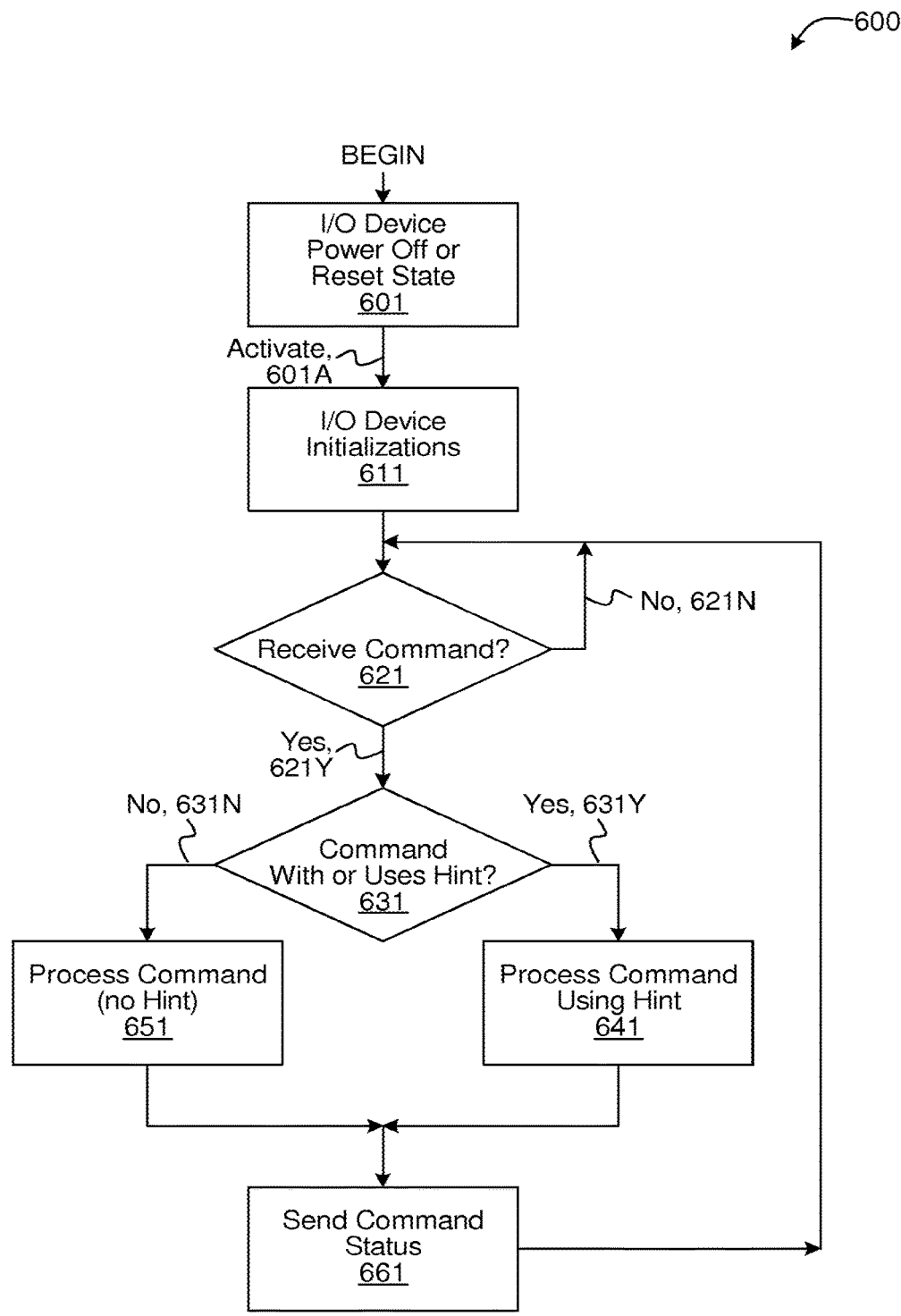
FIG. 6 illustrates a flow diagram of selected details of an embodiment of processing commands and optional hint information at an I/O device.

FIG. 6 illustrates a flow diagram of selected details of an embodiment of processing commands and optional hint information at an I/O (e.g. storage), device as I/O Device Command Processing 600. In some embodiments and/or usage scenarios, I/O Device Command Processing 600 enables "one-at-a-lime" hint processing, where a particular command with an explicit hint mode is sent to the I/O device, and the I/O device processes the particular command according to the accompanying hint. Processing of subsequent commands is not affected by the hint (although one or more of the subsequent commands optionally have respective accompanying hints that do affect respective processing).

An example I/O device is an instance of SSD 101 as illustrated in FIGS. 1A and 1B. The processing begins with the I/O device inactive, such as unpowered, in a sleep mode, or being in a reset state (I/O Device Power Off or Reset State 601). The processing continues when the I/O device becomes active, such as being powered, transitioning to an operating and/or active state, or exiting reset (Activate 601A). The I/O device then prepares for operation by initializing internal data structures and hardware elements, such as by storing initial values, restoring previously saved values, and/or creating state values compatible with active operation (I/O Device Initializations 611).

After preparing for operation, the I/O device waits for receipt of a command from a host (Receive Command? 621 anti No 621N). Upon receipt of a command (Yes 621Y), the I/O device determines whether or not the command is provided with a hint or the command uses a hint (Command With or Uses Hint? 631). If so (Yes 631Y), then the I/O device processes the command with and/or using the hint (Process Command Using Hint 641). If not (No 631N), then the I/O device processes the command without a hint (Process Command (no Hint) 651). After the processing of the command (either with or without a hint), the I/O device optionally and/or selectively returns result information to the host (Send Command Status 661). The processing in the I/O device then loops back to await another command (Receive Command?621).

Figure 7:
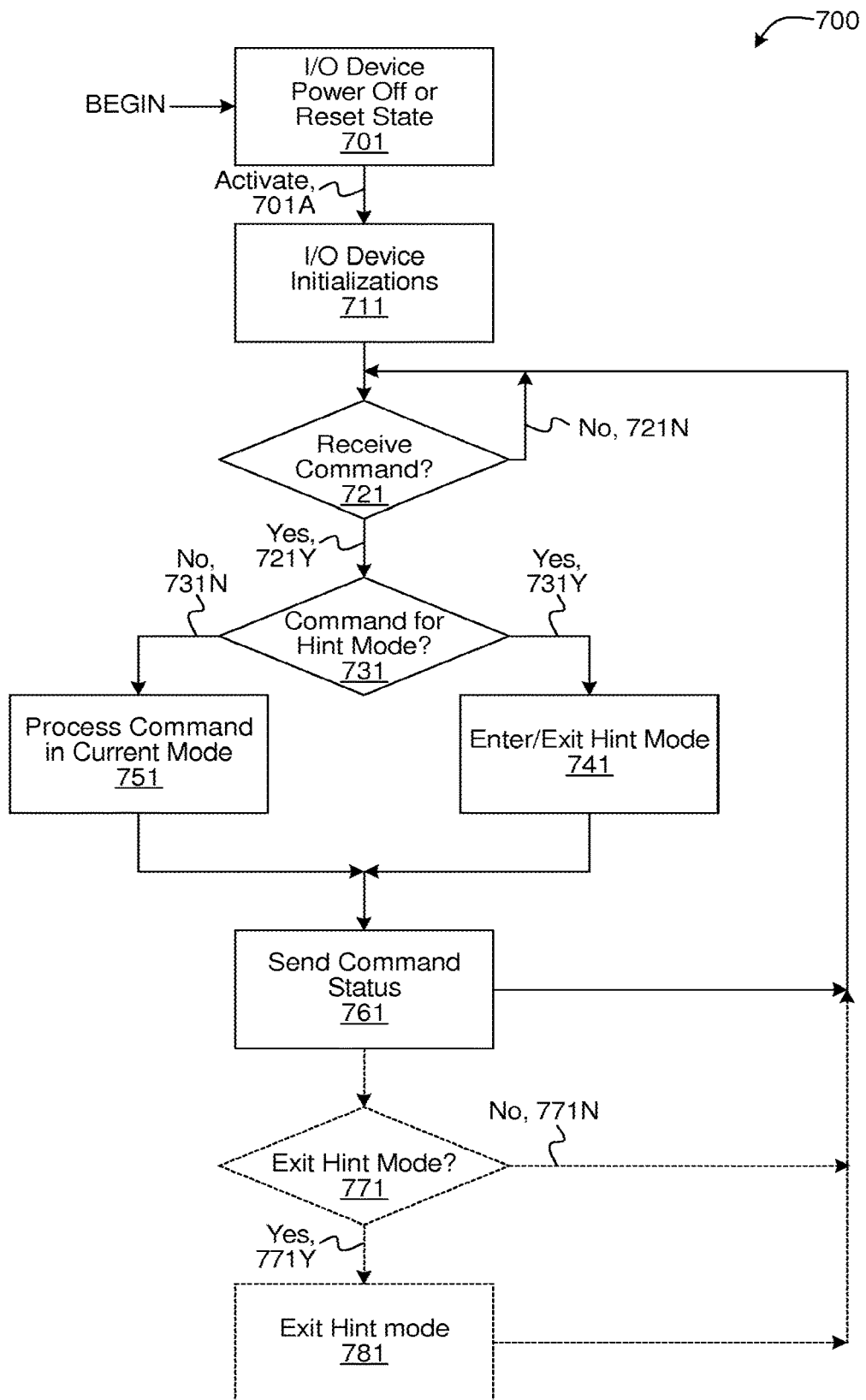
FIG. 7 illustrates a flow diagram of another embodiment of processing commands and optional hint information at an I/O device.

FIG. 7 illustrates a flow diagram of another embodiment of processing commands and optional hint information at an I/O (e.g. storage) device as I/O Device Command Processing 700. In some embodiments and/or usage scenarios. I/O Device Command Processing 700 enables "sticky" hint processing, where a command to enter a hint mode is sent to the I/O device, followed by one or more commands that are processed in the hint mode. Then a command to exit the hint mode is optionally and/or selectively sent to the I/O device, and if the command to exit the hint mode is sent, then subsequent commands are processed without the hint.

As in FIG. 6, an example I/O device is an instance of SSD 101 as illustrated in FIGS. 1A and 1B. Also as in FIG. 6, the processing begins with the I/O device inactive (I/O Device Power Off or Reset State 701), and then continues with the I/O device becoming active (Activate 701A) and preparing for operation (I/O Device Initializations 711).

After preparing for operation, the I/O device waits for receipt of a command from a host (Receive Command? 721 and No 721N). Upon receipt of a command (Yes 721Y), the I/O device determines whether or not the command is related to a hint mode (Command for Hint Mode? 731). If so (Yes 731Y), then the I/O device enters (or exits, depending on the command) a hint mode (Enter/Exit Hint Mode 741). If not (No 731N), then the I/O device processes the command in a current mode, without entering (or exiting) a hint mode (Process Command in Current Mode 751). After the processing of the command (whether related to a hint mode or not), the I/O device optionally and/or selectively returns result information to the host (Send Command Status 761). In some embodiments and/or usage scenarios, such as depending on the command and/or the result information, the processing in the I/O device then loops back to await another command (Receive Command? 721), or conditionally and/or selectively (such as dependent on the command and/or the result information), the I/O device then determines whether or not to exit a hint mode (Exit Hint Mode? 771). If so (Yes 771Y), then the I/O device exits the hint mode (Exit Hint mode 781), and the processing in the I/O device then loops back to await another command (Receive Command? 721). If not (No 771N), then the processing in the I/O device loops back to await another command (Receive Command?721), without exiting a hint mode. In some embodiments, during the processing of a single command, the I/O device enters a hint mode and, based on the single command, also executes the command to perform a particular operation (such as a read, write, or trim operation). For example, for some commands, the processing flows from 741 to 751, and then to 761.

Figure 8:
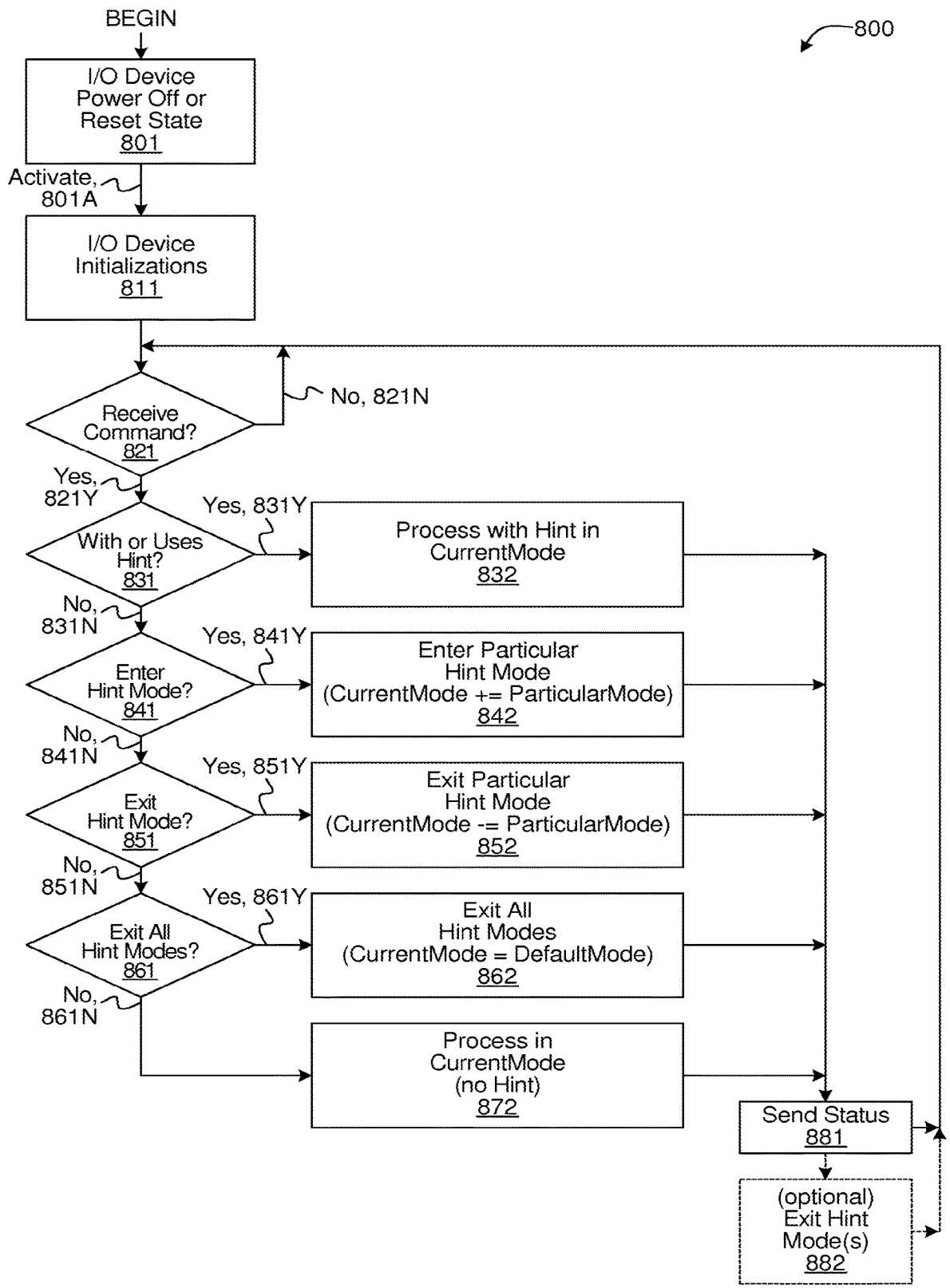
FIG. 8 illustrates a flow diagram of yet another embodiment of processing commands and optional hint information at an I/O device.

FIG. 8 illustrates a flow diagram of another embodiment of processing commands and optional hint information at an I/O (e.g. storage) device as I/O Device Command Processing 800. Conceptually FIG. 8 represents capabilities represented by FIG. 6 and FIG. 7 simultaneously available in one or more embodiments. In various embodiments and/or usage scenarios, I/O Device Command Processing 800 enables one-at-a-time and sticky hint processing, where there are one or more hints and/or hint modes usable simultaneously. The hints and/or hint modes are optionally, selectively, and/or conditionally dependent on one or more factors, such as type of command, LBA, data band, or other address, data and/or command related parameter or condition.

As in FIG. 6 and FIG. 7, an example I/O device is an instance of SSD 101 as illustrated in FIGS. 1A and 1B. Also as in FIG. 6 and FIG. 7, the processing begins with the I/O device inactive (I/O Device Power Off or Reset State 801), and then continues with the I/O device becoming active (Activate 801A) and preparing for operation (I/O Device Initializations 811).

After preparing for operation, the I/O device waits for receipt of a command from a host (Receive Command? 821 and No 821N). Upon receipt of a command (Yes 821Y), the I/O device determines whether or not the command is explicitly provided with a hint or the command explicitly uses a hint (With or Uses Hint? 831). If so (Yes 831Y), then the I/O device processes the command with and/or using the explicit hint according to a current mode (Process with Hint in CurrentMode 832). In various embodiments, the Current-Mode is dependent on one or more of the command, an LBA provided with the command, a data band (such as determined from an LBA provided with the command, map information, or other relationship between data bands and mode), other address, data and/or command related parameter or condition, or one or more previously provided explicit and/or implicit hints.

If the command is not provided with an explicit hint and uses no explicit hint (No 831N), then the I/O device determines whether or not the command is to enter a particular hint mode (Enter Hint Mode? 841). If so (Yes 841Y), then the I/O device enters the particular hint mode (Enter Particular Hint Mode (CurrentMode+=ParticularMode) 842). In embodiments where there is a single hint mode, entering the single hint mode conceptually corresponds to assigning the current mode a value corresponding to the single hint mode. In embodiments where there are two or more hint modes, entering the particular hint mode conceptually corresponds to assigning the current mode a value corresponding to the current mode along with (e.g. adding) the particular hint mode. In various embodiments, the particular hint mode is associated with one or more of one or more LBAs, one or more ranges of LBAs, and one or more data bands. The processing of commands provided with or using an explicit hint enables one-at-a-time hint processing.

If the command is not to enter a particular hint-mode (No 841N), then the I/O device determines whether or not the command is to exit a particular hint mode (Exit Hint Mode? 851). If so (Yes 851Y), then the I/O device exits the particular hint mode (Exit Particular Hint Mode (Current-Mode−=ParticularMode) 852). In embodiments where there is a single hint mode, exiting the single hint mode conceptually corresponds to assigning the current mode a default value corresponding to the single hint mode being inactive. In embodiments where there are two or more hint modes, exiting the particular hint mode conceptually corresponds to assigning the current mode a value corresponding to the current mode without (e.g. subtracting) the particular hint mode. In various embodiments, the particular hint mode is associated with one or more of one or more LBAs, one or more ranges of LBAs, and one or more data bands.

If the command is not to exit a particular hint mode (No 851N), then the I/O device determines whether or not the command is to exit all hint modes (Exit All Hint Modes? 861). If so (Yes 861Y), then the I/O device exits all hint modes (Exit All Hint Modes (CurrentMode−DefaultMode) 862); In embodiments where there is a single hint mode (or embodiments where there are two or more hint modes), exiting all of the hint modes conceptually corresponds to assigning the current mode a default value corresponding to the single hint mode (or all hint modes) being inactive.

If the command is not to exit all hint modes (No 861N), then the command is processed (in the current mode (Process in CurrentMode (no Hint) 872), including any previous changes to the current mode based, e.g., on previously received hint entry/exit related commands, but without any additional hint information, since the command has been determined to provide no hint. Processing of commands to enter particular hint modes and to exit particular hint modes or all hint modes enables sticky hint processing.

After the processing of the command (either with or using an explicitly provided hint, entering or exiting a particular hint mode, exiting all hint modes, or solely based on the current mode, corresponding respectively to 832, 842, 852, 862, and 872), the I/O device optionally and/or selectively returns result information to the host (Send Status 881). In some embodiments and/or usage scenarios, such as depending on the command and/or the result information, the processing in the I/O device then loops back to await another command (Receive Command? 821), or optionally, conditionally, and/or selectively (such as dependent on the command and/or the result information), the I/O device then exits one or more hint modes (Exit Hint Mode(s) 882), and the processing in the I/O device then loops back to await another command (Receive Command? 821).

Ordering of determinations 831, 841, 851, and 861 is illustrative only; other embodiments with other orderings, as well as embodiments where one or more of the determinations are made in parallel or where multiple of the "Yes" paths of the determinations are optionally and/or selectively evaluated, are contemplated. For example, in some embodiments, a particular command uses a sticky hint that affects the particular command as well as subsequent commands.

Map Operation

Figure 9:
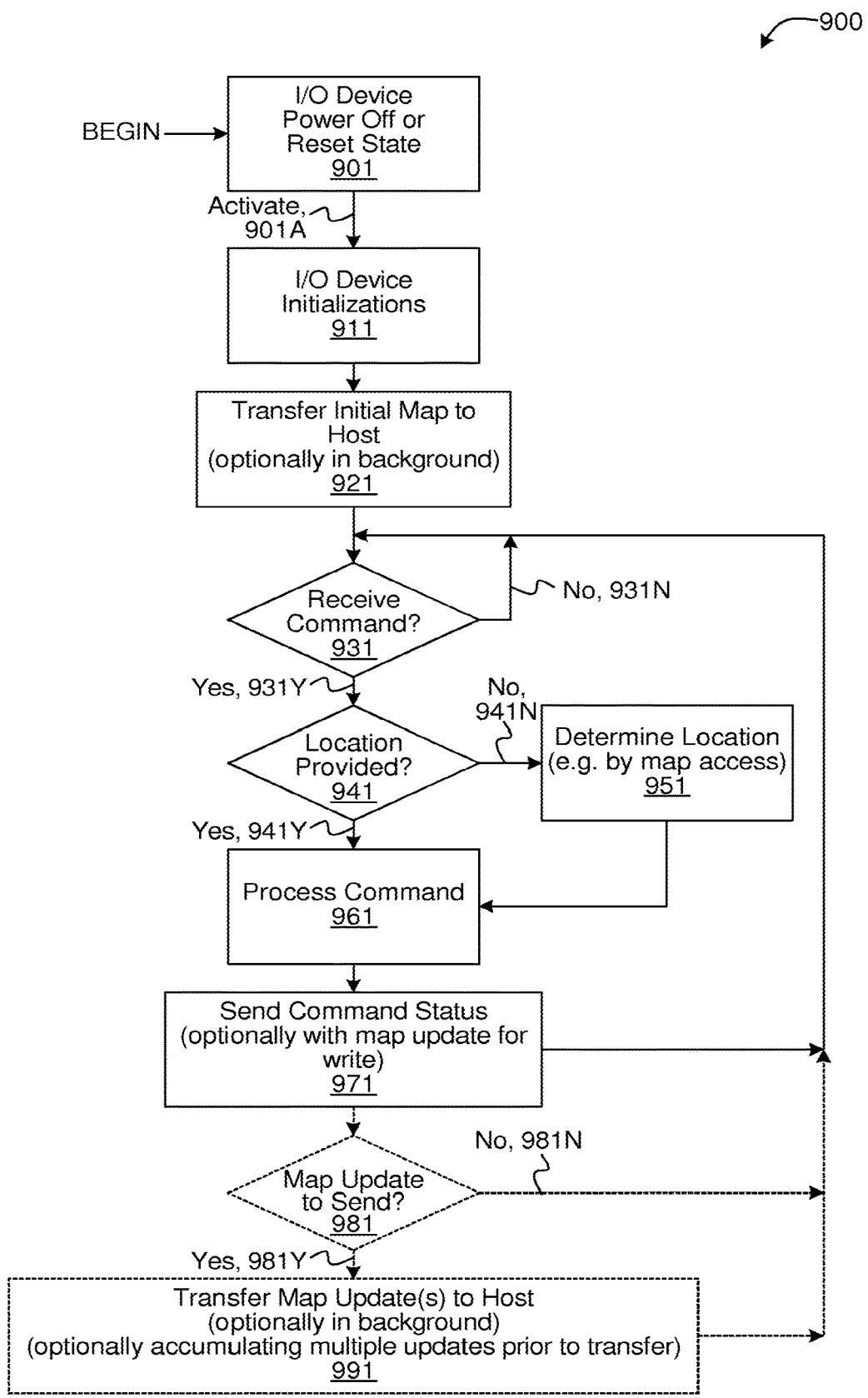
FIG. 9 illustrates a flow diagram of an embodiment of processing commands and optional shadow map information at an I/O device.

FIG. 9 illustrates a flow diagram of an embodiment of processing commands and optional shadow map information at an I/O (e.g. storage) device as I/O Device Command Processing 900. In some embodiments and/or usage scenarios, I/O Device Command Processing 900 enables the I/O device to omit particular processing (e.g. skip accessing a map, such as Map 141 of FIGS. 1A and 1B) based on a host providing information that would otherwise be obtained via the particular processing. The host is enabled to provide the information via accessing a shadow map that is managed at least in part by map updates communicated from the I/O device.

As in FIGS. 6 through 8, an example I/O device is an instance of SSD 101 as illustrated in FIGS. 1A and 1B. Also as in FIGS. 6 through 8, the processing begins with the I/O device inactive (I/O Device Power Off or Reset State 901), and then continues with the I/O device becoming active (Activate 901A) and preparing for operation (I/O Device Initializations 911).

After preparing for operation, the I/O device optionally and/or selectively communicates starting map information to a host (Transfer Initial Map to Host 921). In some embodiments and/or usage scenarios, the I/O device omits communicating all or any portions of the starting map information, according to a conceptual "fetch on demand" technique. The communicating is optionally performed as a background operation. The host retains the communicated map information in a shadow map (e.g. Shadow Map 108 of FIG. 1B). The I/O device then waits for receipt of a command from a host (Receive Command? 931 and No 931N).

Upon receipt of a command (Yes 931Y), the I/O device determines whether or not the command includes or is provided with location information that targets particular block and/or page addresses of a particular portion of I/O device NVM, such as a block/page in one or more of Flash Die 194 of FIG. 1A (Location Provided? 941). If not (No 941N), then the I/O device determines the particular block and/or page addresses and the particular portion of the I/O device NVM (Determine Location 951), such as by accessing a map. Then the I/O device processes the command using the determined location (Process Command 961). If the command includes or is provided with the location information (Yes 941Y), then the location determining is omitted, and the I/O device processes the command using the provided location information (Process Command 961).

After the processing of the command, the I/O device optionally and/or selectively returns result information to the host (Send Command Status 971), optionally including one or more map updates, e.g. if the command is a write command, then the I/O device communicates a map update to the host that describes a mapping between an LBA of the write command and a particular portion of the I/O device NVM, e.g. location information that targets a particular block and/or page address. In some embodiments and/or usage scenarios, such as depending on the command and/or the result information, the processing in the I/O device then loops back to await another command (Receive Command? 931), or conditionally and/or selectively (such, as dependent on the command and/or the result information), the I/O device then determines whether or not to communicate a map update to the host (Map Update to Send? 981). If not (No 981N), then the processing in the I/O device loops back to await another command (Receive Command? 931). If so (Yes 981Y), then the I/O device communicates one or more map updates to the host (Transfer Map Update(s) to Host 991). In some embodiments, the map updates are communicated as a background operation. In some embodiments, the map updates are accumulated and transferred as a group, optionally as a background operation. The processing in the I/O device then loops back to await another command (Receive Command? 931).

In some embodiments and/or usage scenarios, the I/O device communicates one or more updates to the host in response to processing by the I/O device that is not directly related to initialization or commands. For example, when the I/O device recycles regions of the I/O device NVM, there are zero or more changes to mappings between LBAs and locations in the I/O device NVM. The I/O device communicates the mapping changes, if any, to the host as one or more map updates, as in 981/991.

In some embodiments and/or usage scenarios (such as some embodiments having an I/O card with card memory, e.g. I/O Card 116 using (optional) Card Memory 112C of FIG. 1B as storage for a shadow map), one or more I/O devices use the card memory as a shadow map, without involvement of the host. Rather than communicate map updates to the host, the I/O device modifies the shadow map in accordance with the map updates.

Figure 10:
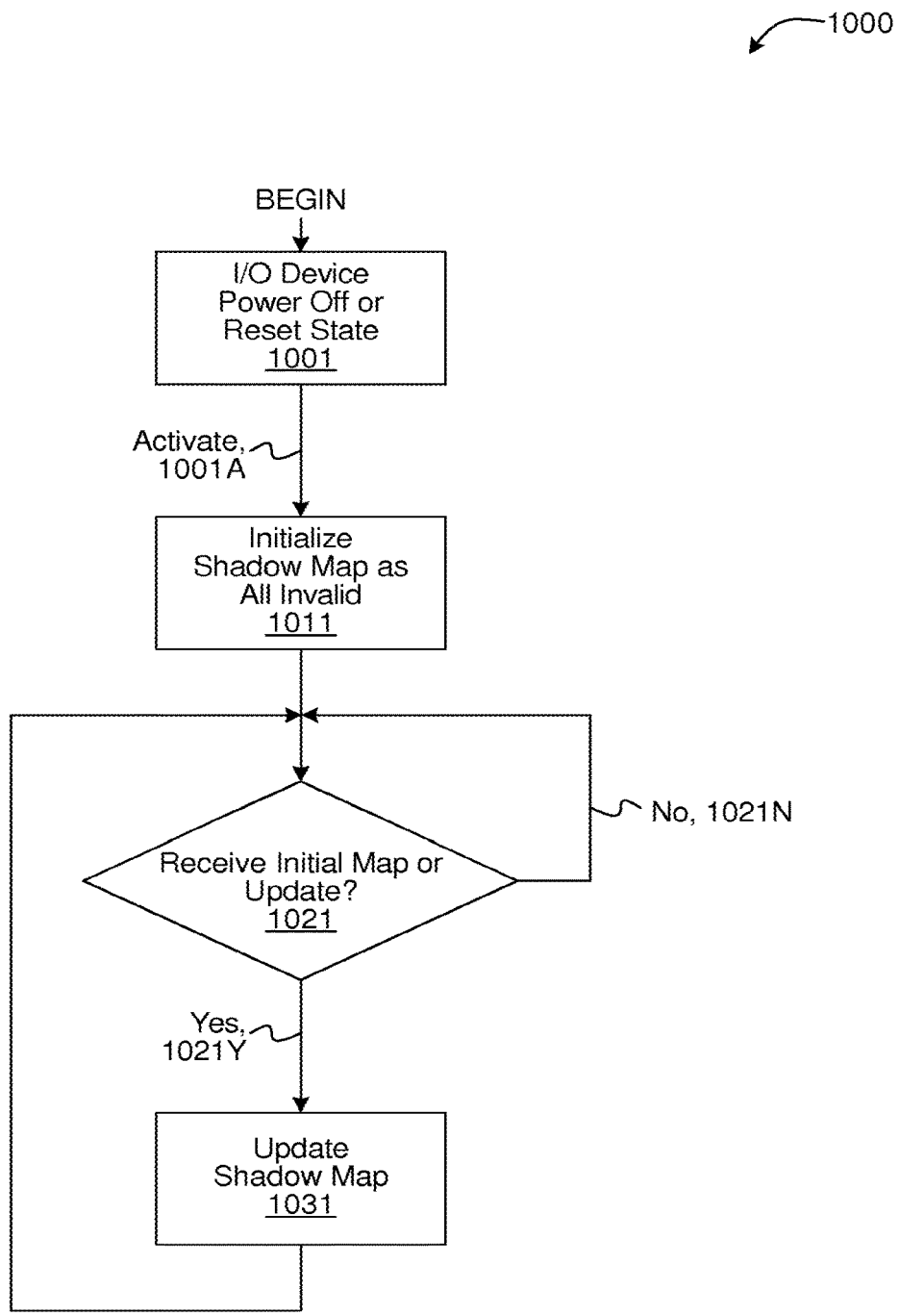
FIG. 10 illustrates a flow diagram of an embodiment of maintaining shadow map information at a computing host.

FIG. 10 illustrates a flow diagram of an embodiment of maintaining shadow map information at a computing host as Host Shadow Map Processing 1000. In some embodiments and/or usage scenarios, Host Shadow Map Processing 1000 enables an I/O device to omit particular processing (e.g. skip accessing a map, such as Map 141 of FIGS. 1A and 1B) based on the host providing information that would otherwise be obtained via the particular processing. The host is enabled to provide the information via accessing the shadow map that is managed at least in part by map updates communicated from the I/O device.

An example host is Host 102 as illustrated in FIG. 1B. As in FIGS. 6 through 9, the processing begins with the I/O device inactive (I/O Device Power Off or Reset State 1001), and then continues with the I/O device becoming active (Activate 1001A). The host then marks all entries of a shadow map, such as Shadow Map 108 of FIG. 1B, as having no information (Initialize Shadow Map as All Invalid 1011). The processing of the host then waits for receipt of one or more map updates communicated from the I/O device (Receive Initial Map or Update? 1021 and No 1021N). Upon receipt of map updates (Yes 1021Y), the host updates the shadow map in accordance with the received map updates (Update Shadow Map 1031).

In various instances, the map updates communicated from the I/O device are results of I/O device processing relating to initialization (e.g. Transfer initial Map to Host 921 of FIG. 9), results of I/O device processing relating to writes (e.g. Send Command Status (optionally with map update for write) 971 of FIG. 9), results of I/O device accumulation of map updates (e.g. Transfer Map Update(s) to Host 991 of FIG. 9), or any combination thereof. In some embodiments and/or usage scenarios, the host optionally and/or selectively ignores one or more of the map updates. For example, the host ignores particular map updates arising due to recycling activity, such as when the particular map updates correspond to shadow map entries that the host invalidates due to writes before the host processes the particular map updates.

In some embodiments and/or usage scenarios (such as some embodiments having I/O Card 116 and using (optional) Card Memory 112C of FIG. 1B as storage for a shadow map), one or more I/O devices, e.g. SSDs, use the shadow map and a host does not. The I/O device performs all or any portions of the processing as illustrated in FIG. 10, e.g. the I/O device performs the shadow map initialization and the updating.

In some embodiments, the I/O device updates the map independent of host commands and/or in response to host commands but at LBAs not referenced in the host commands or at LBAs in host commands that would normally not update the map, such as a read command. In a first example, due to recycling (e.g., garbage collection), data in the NVM is relocated and the map is updated to reflect a new location of any such relocated data. In a second example, in response to a read command, data is relocated due to a determination that the data has an excessive number of reads (e.g., the data is more in risk of read disturb errors). The I/O device optionally and/or selectively signals the host, such as via an interrupt or via status information, that there are pending updates to the map due to independent I/O device activity. According to various embodiments, updates to the map due to independent I/O device activity are one or more of: communicated to the host along with other updates of the map that are in response to host commands; communicated to the host as separate communications to the host; communicated to the host in response to the host requesting independent updates, such as by reading a log of independent updates; written directly to the shadow map by the I/O device; and other techniques. In further embodiments, a portion of the NVM that has been recycled and/or relocated is not erased until any map updates of the portion of the NVM have been communicated to the host and/or updated in the shadow map. In some embodiments and/or usage scenarios, delaying the erasing until after the shadow map update enables previous location information in the shadow map (prior to the recycling and/or the relocation) to be used by the host, and thus avoids performance penalties from invalidation of updated entries of the shadow map that would otherwise disable usage of the updated entries until the updated entries were updated with new location information.

Figure 11:
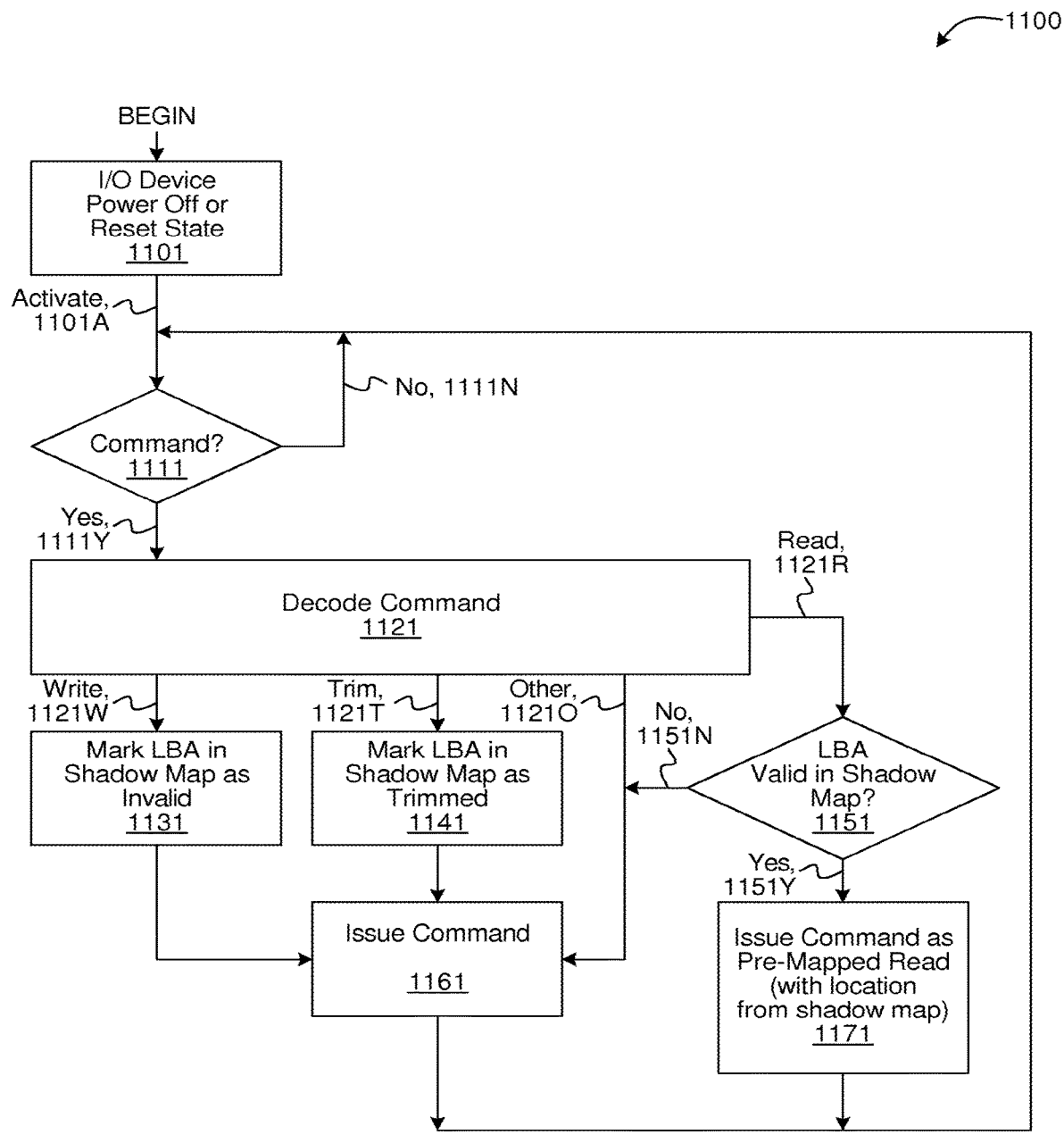
FIG. 11 illustrates a flow diagram of an embodiment of issuing commands and optional shadow map information at a computing host.

FIG. 11 illustrates a flow diagram of an embodiment of issuing commands and optional shadow map information at a computing host as Host Command Issuing 1100. In some embodiments and/or usage scenarios, Host Command Issuing 1100 enables an I/O device to omit particular processing (e.g. skip accessing a map, such as Map 141 of FIGS. 1A and 1B) based on the host providing information that would otherwise be obtained via the particular processing. The host is enabled to provide the information via accessing the shadow map that is managed at least in part by modifications from the host (as well as map updates communicated from the I/O device).

In some embodiments and/or usage scenarios, in conjunction with issuing a write command, the host invalidates shadow map entries for LBAs that the write modifies, as mappings for the LBAs are changed by the I/O device when processing the write command. Subsequently the I/O device optionally communicates one or more map updates relating to the written LBAs, and the host then modifies the shadow map according to the map updates. In some embodiments and/or usage scenarios, in conjunction with issuing a trim command, the host optionally and/or selectively marks shadow map entries for LBAs that the trim relates to as trimmed, as mappings for the LBAs are marked as trimmed by the I/O device when processing the trim command. The I/O device optionally omits communicating map updates relating to the trimmed LBAs, since the host has already marked the LBAs as trimmed. In some embodiments and/or usage scenarios, in conjunction with issuing a read command, the host optionally and/or selectively checks if there are any valid entries in the shadow map for LBAs the read accesses. If valid entries are found, then the host issues a pre-mapped read command with location information from the valid entries, optionally omitting the LBAs when issuing the command. The location information enables the I/O device to omit map look-ups that would otherwise be performed to determine the location information from the LBAs. If no valid entries are found, then the host issues a read command with the LBAs and without location information. The I/O device then processes the read command in part by performing map look-ups based on the read LBAs to determine the location information.

More specifically, an example host is Host 102 as illustrated in FIG. 1B. As in FIGS. 6 through 10, the processing begins with the I/O device inactive (I/O Device Power Off or Reset State 1101), and then continues with the I/O device becoming active (Activate 1101A). The processing of the host then optionally and/or selectively marks as empty all shadow map entries and awaits a command (Command? 1111 and No 1111N), such as generated by software elements executing on the host (e.g. various combinations of OS 105, Driver 107, and Application 109 of FIG. 1B). Upon generation of a command (Yes 1111Y), the host determines which command, or alternatively which command type the generated command is (Decode Command 1121).

If the command is a write command, or alternatively a write command type (Write 1121W), then the host marks as empty (e.g. invalidates) the shadow map entries for LBAs that the write modifies (Mark LBA in Shadow Map as Invalid 1131) and issues the write to the I/O device (Issue Command 1161). If the command is a trim command, or alternatively a trim command type (Trim 1121T), then the host marks shadow map entries for LBAs that the trim relates to as trimmed (Mark LBA in Shadow Map as Trimmed 1141) and issues the trim to the I/O device (Issue Command 1161). If the command is a read command, or alternatively a read command type (Read 1211R), then the host checks if there are any valid entries in the shadow map for LBAs the read accesses (LBA Valid in Shadow Map? 1151). If any valid entries are found (Yes 1151Y), then the host issues to the I/O device a pre-mapped read command with location information from the valid entries, optionally omitting the LBAs when issuing the command (Issue Command as Pre-Mapped Read (with location from shadow map) 1171). If no valid entries are found (No 1151N), then the host issues to the I/O device a read command with the LBAs and without location information (Issue Command 1161). If the command is other than a write, trim, or read, or alternatively other than a write type, trim type, or read type (Other 1121O), then the host issues the command to the I/O device (Issue Command 1161), optionally including any LBAs associated with the command.

In some embodiments, when the host issues the command to the I/O device (Issue Command 1161), the host optionally and/or selectively includes information obtained from valid entries (if any) of the shadow map for LBAs the command relates to. For example, if there is a valid entry in the shadow map for an LBA of a write command, then the host provides location and/or length information from the valid entry when issuing the write command to the I/O device. The I/O device, e.g., uses the location and/or length information to update used space bookkeeping (such as UsedSpace[location]-=length). In some embodiments, when the host issues a pre-mapped read command (Issue Command as Pre-Mapped Read (with location from shadow map) 1171), the host provides location information from the shadow map that includes length and/or span information, enabling the I/O device to determine how much data to read (based on the length and/or the span) without accessing a map.

The host optionally and/or selectively ignores the shadow map based on a size of the command. Commands having relatively longer lengths, such as commands that refer to data that span multiple units of LBAs that are each associated with a respective map entry, in some instances have additional location information (e.g. one location information per unit of LBAs), increasing the size of the command. Commands that have relatively longer lengths access sequential map entries of the I/O device, and a cost of the map accessing is amortized over the multiple units. For example, the host ignores the shadow map for a read command referring to greater than 4 KB of data. In some embodiments, the host optionally and/or selectively splits a command with a relatively intermediate length into a plurality of commands. For example, the host splits a read command referring to 8 KB (or 16 KB) of data into two (or four) reads commands each referring to 4 KB of data. In some embodiments, a pre-mapped read command (or variations thereof) is enabled to specify a plurality of location information elements, while in other embodiments pre-mapped read commands (and variants thereof) are limited to specifying a single location information element. In some embodiments, accessing a sub-portion (e.g. one particular SATA sector of a 4 KB portion of I/O device NVM) uses additional location information that identifies the particular sector.

In some embodiments and/or usage scenarios (such as some embodiments having an I/O card with card memory, e.g. I/O Card 116 using (optional) Card Memory 112C of FIG. 1B as storage for a shadow map), one or more I/O devices use the shadow map and the host does not. The I/O device optionally and/or selectively performs all or any portions of the processing as illustrated in FIG. 11. For example, the I/O device marks particular entries in the shadow map as invalid when processing write commands and as trimmed when processing trim commands.

Low-Power Operation

Figure 12:
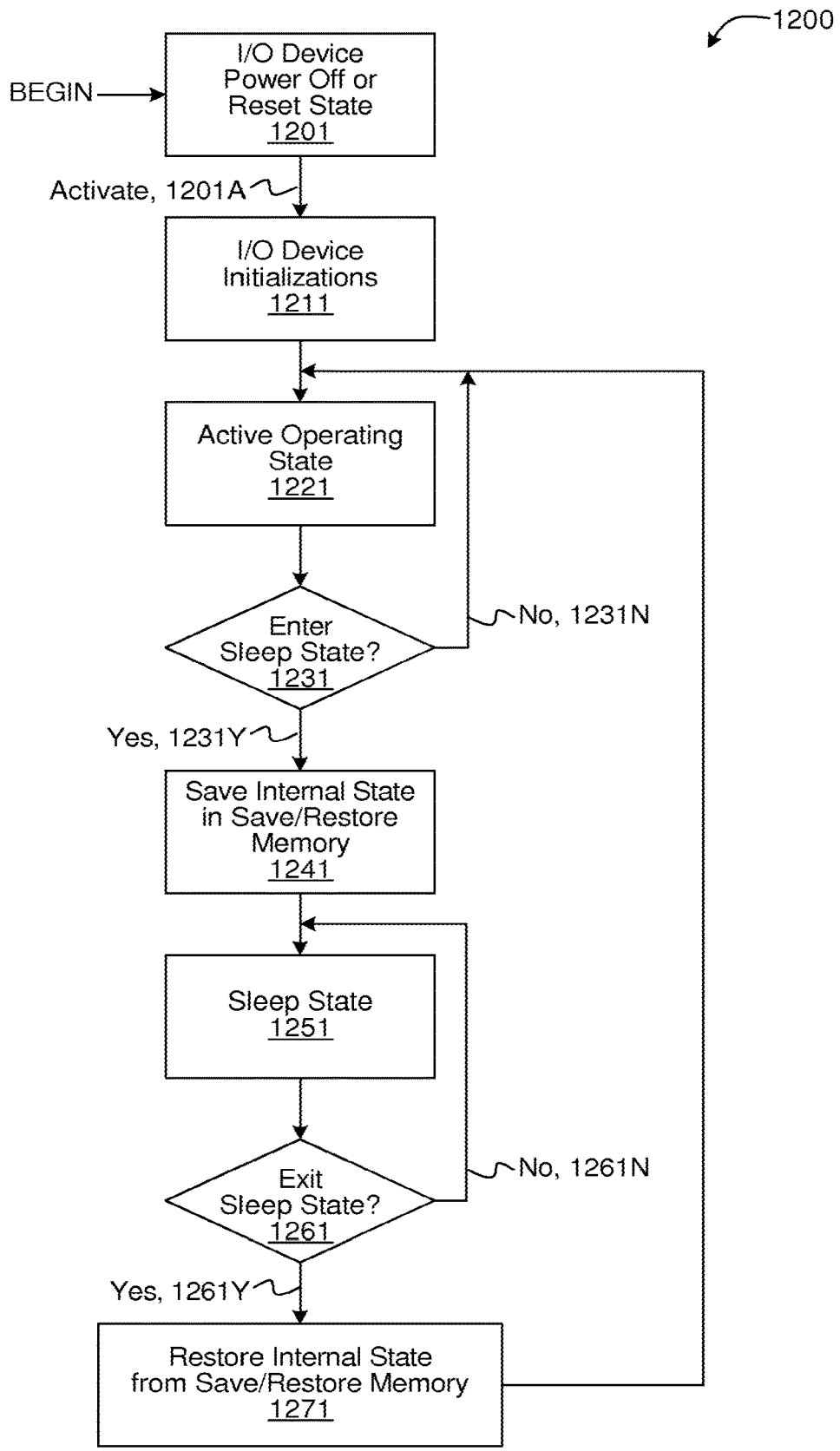
FIG. 12 illustrates a flow diagram of an embodiment of entering and exiting a sleep state of an I/O device.

FIG. 12 illustrates a flow diagram of an embodiment of entering and exiting a sleep state of an I/O (e.g. storage) device as I/O Device Sleep Entry/Exit 1200. In some embodiments and/or usage scenarios, I/O Device Sleep Entry/Exit 1200 enables power reduction by enabling powering-down or powering-off the I/O device, such as by entering a sleep state, by storing all or any portions of internal state in a save/restore memory that is separate from (or alternatively subject to separate power control with respect to) the I/O device. When the I/O device exits the sleep state, the internal state is restored in whole or in part from the save/restore memory. In some embodiments and/or usage scenarios, restoring the internal state from the save/restore memory is more efficient (e.g. lower latency and/or lower power) than rebuilding the internal state from information retained in other than the save/restore memory (such as rebuilding a cache of map information from map information obtained from reading NVM of the I/O device).

Examples of the internal state are any volatile state of the I/O device (such as state that is lost when the I/O device is operated in a sleep state), map information (such as cached map information, e.g. as maintained in Map 141 of FIGS. 1A and 1B, shadow map information, and any one or more levels of a multi-level map), and statistics maintained by the I/O device. Examples of the save/restore memory are memory accessible and relatively local to the I/O device (e.g. (optional) Card Memory 112C) and host memory that is accessible to the I/O device (e.g. Host Memory 112H, and Shadow Map 108).

As in FIGS. 6 through 9, an example I/O device is an instance of SSD 101 as illustrated in FIGS. 1A and 1B. Also as in FIGS. 6 through 9, the processing begins with the I/O device inactive (I/O Device Power Off or Reset State 1201), and then continues with the I/O device becoming active (Activate 1201A) and preparing for operation (I/O Device Initializations 1211).

After preparing for operation, the I/O device is in a higher-power operating state enabled to receive and process commands and to perform other activities without powering up (Active Operating State 1221). While awaiting a request to enter a lower-power operating state (Enter Sleep State? 1231 and No 1231N), the I/O device remains in the higher-power operating state (Active Operating State 1221), and executes commands received, if any (not illustrated). Upon receipt of a request to enter a lower-power operating state (Yes 1231Y), such as an explicit request received via an interface of the I/O device, or an implicit request generated by the I/O device in response to a period of inactivity, the I/O device saves all or any portions of internal state in save/restore memory (Save Internal State in Save/Restore Memory 1241). The I/O device then enters the lower-power operating state (Sleep State 1251). In various embodiments, the I/O device saves all or any portions of the internal state in an encrypted form, e.g. by encrypting via any one of a plurality of encryption techniques.

While awaiting a request to exit the lower-power operating state (Exit Sleep State? 1261 and No 1261N), the I/O device remains in the lower-power operating state (Sleep State 1251). Upon receipt of a request to exit the lower-power operating state (Yes 1261Y), the I/O device restores all or any portions of the internal state saved in the save/restore memory from the save/restore memory (Restore Internal State from Save/Restore Memory 1271). The I/O device then enters the higher-power operating state, and the processing in the I/O device then loops back (Active Operating State 1221). In various embodiments, the I/O device restores all or any portions of the internal state from the encrypted form, e.g. by decrypting via any one of the encryption techniques.

In various embodiments, the sleep state is any one or more of a power-off state, a power-down state, a reduced-power state, a low-power state, a lower-power state, a hibernate state, a state with all or any portion of the I/O device powered off or down, or any operational state where the I/O device consumes less power than when fully (e.g. actively) operational. In various embodiments, exiting the sleep state incurs a latency penalty (and/or a power cost), such as due to rebuilding information via accesses to NVM, and restoring the information via reading from the save/restore memory (instead of the rebuilding via accesses to the NVM) reduces the latency penalty (and/or the power cost). In various embodiments, all or any portions of the internal state is saved (such as by processing associated with Save Internal State in Save/Restore Memory 1241). In some embodiments, a driver allocates a portion of host memory to be used as the save/restore memory.

Combined Operation

Figure 13A:
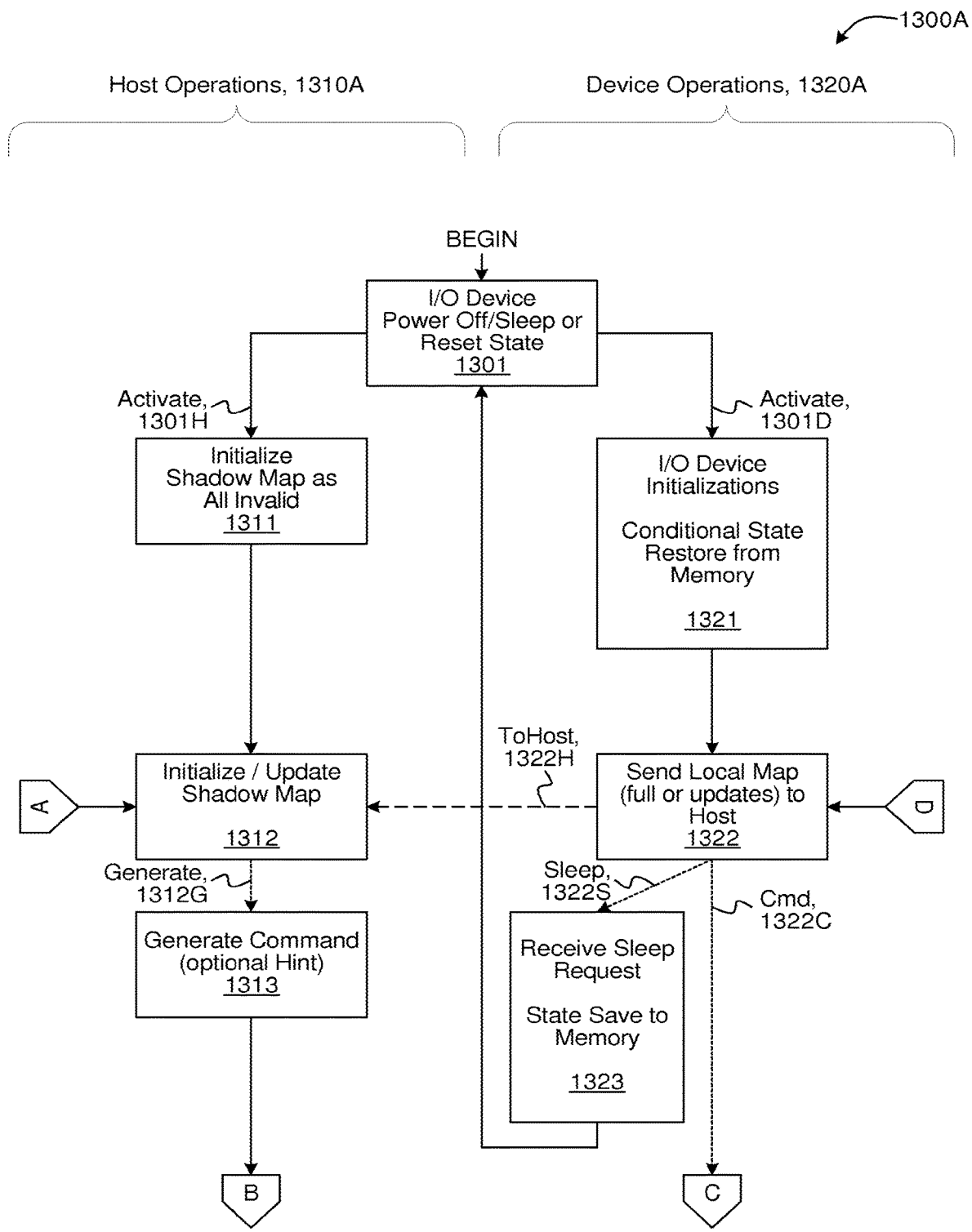
FIGS. 13A and 13B collectively illustrate a flow diagram of an embodiment of I/O device and computing host interoperation.
Figure 13B:
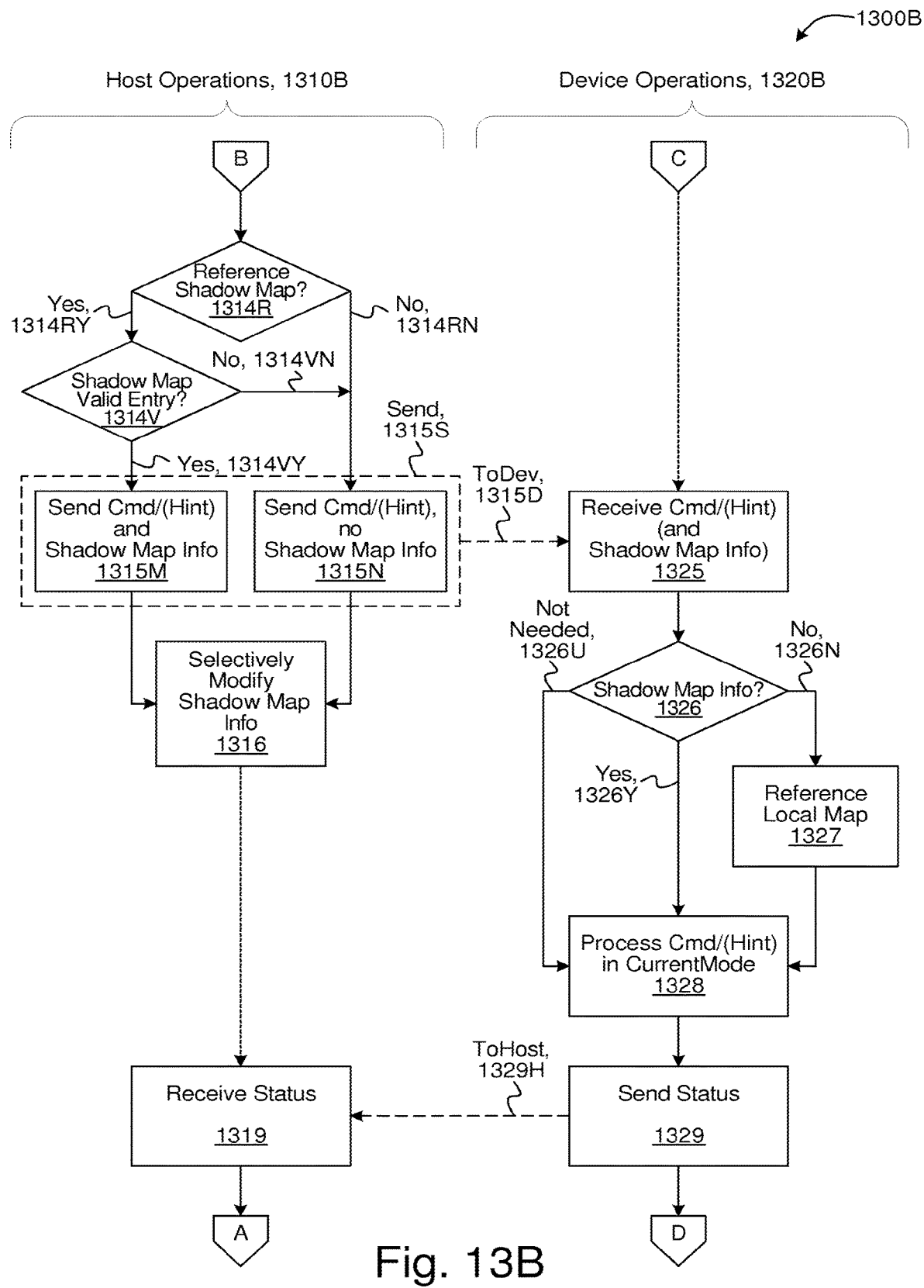

FIGS. 13A and 13B collectively illustrate a flow diagram of an embodiment of I/O (e.g. storage) device and computing host interoperation as I/O Device and Computing Host interoperation 1300A and 1300B, respectively. Elsewhere herein, the two figures are described collectively, referred to as I/O Device and Computing Host Interoperation 1300. I/O Device and Computing Host Interoperation 1300 conceptually illustrates various embodiments that combine one or more capabilities as illustrated by FIGS. 6 through 12, such as one-at-a-time and sticky hints, host-provided location information, host and I/O device updating of host shadow map information, and I/O device internal state save and restore.

Also elsewhere herein, Host Operations 1310A and Host Operations 1310B are collectively referred to as Host Operations 1310, and Device Operations 1320A and Device Operations 1320B are collectively referred to as Device Operations 1320. Host Operations 1310 describes operations performed by a computing host, such as Host 102 of FIG. 1B. Device Operations 1320 describes operations performed by an I/O (e.g. storage) device, such as any one of the instances of SSD 101 of FIG. 1B.

The processing begins (as in, e.g., FIG. 6) with the I/O device inactive (I/O Device Power Off/Sleep or Reset State 1301). The processing continues when the I/O device becomes active, such as by being powered on, transitioning to an operating and/or active state, or exiting reset. Then the host (Activate 13011H) marks all entries of a shadow map, such as Shadow Map 108 of FIG. 1B, as having no information (Initialize Shadow Map as All Invalid 1311). The I/O device (Activate 1301D) prepares for operation (I/O Device Initializations and Conditional State Restore from Memory 1321). In some embodiments and/or usage scenarios, the preparation includes optionally and/or conditionally restoring internal state wholly or partially from a save/restore memory (e.g. optional) Card Memory 112C of FIG. 1B). In various embodiments, the I/O device restores all or any portions of the internal state from an encrypted form, e.g. by decrypting via anyone of a plurality of encryption techniques. In some embodiments, the host performs all or any portions of the decrypting.

Then the I/O device optionally and/or selectively communicates updated map information, if any, to the host (Send Local Map (full or updates) to Host 1322), (as To Host 1322H) for the host to further initialize and/or update the shadow map (Initialize/Update Shadow Map 1312). In some instances, the first pass through 1322/1312 after powering up the I/O device conceptually corresponds to initializing the shadow map by sending a full image of a local map (e.g. Map 141 of FIG. 1B), while subsequent passes through 1322/1312 conceptually correspond to (incrementally) updating the shadow map as a result of executing commands by the I/O device and/or independent activity of the I/O device, such as recycling. In other instances, the shadow map is updated as a consequence of LBAs being referenced by the host. In some embodiments and/or usage scenarios, the host optionally and/or selectively ignores one or more of the map updates. For example, the host ignores particular map updates arising due to recycling activity, such as when the particular map updates correspond to shadow map entries that the host invalidates due to writes before the host processes the particular map updates.

In some embodiments and/or usage scenarios, the I/O device communicates one or more updates to the host in response to processing by the I/O device that is not directly related to initialization or commands. For example, when the I/O device recycles regions of I/O device NVM, there are zero or more changes to mappings between LBAs and locations in the I/O device NVM. The I/O device communicates the mapping changes, if any, to the host as one or more map updates, as in 1322.

The processing in the I/O device then proceeds dependent on whether the I/O device receives a request to enter a lower-power operating state (Sleep 1322S) or a command (Command 1322C). Upon receipt of a request to enter a lower-power operating state, the I/O device optionally and/or selectively saves all or any portions of internal state in the save/restore memory (Receive Sleep Request and State Save to Memory 1323). In various embodiments, the I/O device saves all or any portion of the internal state in the encrypted form, e.g. by encrypting via any of the encryption techniques. In some embodiments, the host performs all or any portions of the encrypting. The I/O device then enters the lower-power operating state and returns to await activation (I/O Device Power Off/Sleep or Reset State 11301). Receipt of a command is described with respect to (Receive Command/(Hint) (and Shadow Map Info) 1325), following.

After completing initialization of the shadow map, the host generates (Generate 1312G) a command optionally with or using a hint (Generate Command (optional Hint) 1313), e.g. via any one or more of OS 105, Driver 107, and Application 109 of FIG. 1B. The host then optionally and/or selectively determines if the command is such that there is utility for the host to provide valid information, if any, from the shadow map to the I/O device (Reference Shadow Map? 1314R). If no (No 1314RN), then the host provides the command (optionally with or using a hint) to the I/O device, without any shadow map information (Send Command/ (Hint), no Shadow Map Info 1315N). For example, in some embodiments, if the command is a read, then in some instances there is utility for the host to provide location information, thus enabling the I/O device to omit determining the location information and to provide read data with reduced latency. Continuing with the example, if the command is a write, then in some instances there is little or no utility for the host to provide location information, as providing the location information to the I/O device provides little or no performance benefit, as the location information is relatively unimportant to performance of write processing. For another example, in some embodiments, if a command refers to a single LBA, then in some instances there is utility for the host to provide location information, thus enabling the I/O device to omit determining the location information and reducing latency of the command. Continuing with the other example, if the command refers to a plurality of contiguous LBAs, then in some instances there is little utility for the host to provide location information, as providing the location information to the I/O device provides little or no performance benefit, since average latency of the command is relatively unaffected whether or not the I/O device determines the location information.

If there is utility for the host to provide valid shadow map information to the I/O device (Yes 1314RY), then the host checks if there are any valid entries in the shadow map for LBAs the command relates to (Shadow Map. Valid Entry? 1314V). If no valid entries are found (No 1314VN), then the host issues to the I/O device the command with the LBAs (optionally with or using a hint) and without shadow map information (Send Command(Hint), no Shadow Map Info 1315N). If any valid entries are found (Yes 1314VY), then the host issues to the I/O device the command with shadow map information from the valid entries, optionally omitting the LBAs when issuing the command (Send Command/ (Hint) and Shadow Map info 1315M). In some embodiments, 1314R is omitted, and the shadow map is non-selectively checked for valid entries (e.g. the processing flows from 1313 to 1314V), or alternatively the shadow-map is never checked for valid entries (e.g. the processing flows from 1313 to 1315N).

Command, optional LBAs, and optional hint information are provided to the I/O device from the host (To Device 1315D) whether from processing relating to 1315M or 1315N (Send 1315S). After the command is provided to the I/O device, the host optionally and/or selectively marks shadow map entries for LBAs relating to the command according to the command and/or other criteria (Selectively Modify Shadow Map Info 1316). The processing of the host then awaits status from the I/O device.

Upon receipt of the command, with zero or more of LBA, shadow map (e.g. location), and optional hint information (Receive Command/(Hint) (and Shadow Map Info) 1325), the I/O device determines relevancy and existence of the shadow map information (Shadow Map Info? 1326). If the shadow map information provides no benefit with respect to the received command (Not Needed 1326U), then the I/O device processes the command with or using the optional hint information in a current mode (Process Command/ (Hint) in CurrentMode 1328). In some embodiments and/or usage scenarios, the I/O device has information unavailable to the host, and the I/O device accesses the local map even when the host provides information from the shadow map. For example, the shadow map is not fully initialized, and the device has trim information the host lacks. For another example, the I/O device determines that the shadow map information is incomplete (e.g. information for some LBAs is missing), such as due to recycling and erasing of a portion of the I/O device NVM. E.g. the I/O device determines via the location information in a pre-mapped read command that the corresponding portion of the I/O device NVM had been erased, and instead of using the location information, the I/O device accesses the local map to obtain location information. The Current mode is optionally and/or selectively a function of which LBAs (if any) the command relates to, and further optionally and/or selectively a function of previously received commands to enter/exit particular hint modes.

If the shadow map information is useful with respect to the received command, and shadow map information has been provided by the host (Yes 1326Y), then the I/O device processes the command with or using the optional hint information in the current mode and the provided shadow map information (Process Command/(Hint) in CurrentMode 1328). If no shadow map information has been provided by the host, and processing of the command is dependent on map information (No 1326N), then the I/O device accesses a local map (e.g. Map 141 of FIG. 1B) to determine information, such as location information to use when executing the command (Reference Local Map 1327). Then the I/O device processes the command with or using the optional hint information in the current mode and the map information from the local map (Process Command/(Hint) in CurrentMode 1328).

After processing the command, the I/O device optionally and/or selectively returns result information (To Host 1329H) to the host (Send Status 1329). Then the I/O device optionally and/or selectively communicates updated map information, if any, to the host (Send Local Map (full or updates) to Host 1322), and awaits either a request to enter a lower-power operating state or a command. The processing of the host, having been waiting for the status, receives the status (Receive Status 1319) and then awaits map updates, if any, (as To Host 1322H) from the I/O device to the shadow map (initialize/Update Shadow Map 1312).

In some embodiments and/or usage scenarios (such as some embodiments having an I/O card with card memory, e.g. I/O Card 116 using (optional) Card Memory 112C of FIG. 1B as storage for a shadow map), the I/O device uses the shadow map, without involvement of the host. The I/O device initializes the shadow map and applies map updates, if any, to the shadow map. The I/O device optionally and/or selectively accesses the shadow map (instead of and/or in addition to the local map) to obtain location information.

In various embodiments, such as embodiments described in whole or in part by one or more of FIGS. 6 through 13A/B, various host commands result in host processing dependent on shadow map entry state, as described by the following table. In the table, italicized elements are optional, such as Location, Length, Span as command parameters for a Write command when the shadow map entry state is Valid.

For an example with respect to the table, consider a read command that relates to an LBA with a valid shadow map entry indicating the LBA has not been trimmed. The host communicates information from the valid shadow map entry via a PreMappedRead command with a parameter of Location from the valid shadow map entry. Optionally the host also communicates Length and/or Span information from the valid shadow map entry. Providing the Location, Length, and/or Span information to the I/O device reduces processing in the I/O device, as access to a local map that would otherwise be performed is omitted. For another example, consider a read command that relates to an LBA with a valid shadow map entry indicating the LBA has been trimmed. Since there is no useful data to read (as the data has been trimmed), in some embodiments no command is sent to the I/O device (NoOp), thus reducing and/or eliminating useless processing by the I/O device. In other embodiments, a read command is sent to the I/O device (Read(LBA)), even though the shadow map entry indicates that the LBA has been trimmed. Sending the read command to the I/O device enables the I/O device (rather than the host) to determine data to return for the read of the trimmed LBA. In further embodiments, the read command is provided with Length and/or Span information from the shadow map entry. The Length and/or Span information encodes one of a plurality of trim types, and the I/O device determines data to return for the read based at least in part on the encoding.

and/or log pages of the I/O device, "pushed" from the I/O device to the host, "pulled" by the host from the I/O device, and other techniques providing for communication of the results from the I/O device to the host. In some embodiments, a plurality of results are grouped into a completion queue and the host is optionally and/or selectively informed of the results on a granularity of more than one command at a time (e.g. via an interrupt mechanism). In some embodiments, updated map information is provided by the I/O device to the host in response to the host requesting map updates, e.g. via the host reading a log page of the I/O device and in response the I/O device sending one or more map updates to the host.

In some of the embodiments described in the foregoing, some sticky hints are optionally and/or selectively recorded in one or more map entries and optionally in one or more shadow map entries (e.g. in processing of and/or relating to any one or more of 741 and/or 781 of FIGS. 7, 842, 852, and/or 872 of FIG. 8, and 1328 of FIGS. 13A/13B). For

| Host Command Type | Host Processing | Shadow Map Entry State | | |
|---|---|---|---|---|
| | | Valid | | Invalid |
| | | Not Trimmed | Trimmed | N/A |
| Write | Shadow Map Operation | MarkInvalid (LBA) | MarkInvalid (LBA) | NoOp |
| | Command Parameters | Location Length, Span | Location Length, Span | N/A |
| | I/O Device Command | Write(LBA) | Write(LBA) | Write(LBA) |
| Trim | Shadow Map Operation | MarkTrimmed (LBA) | NoOp or optionally MarkTrimmed (LBA) | MarkTrimmed (LBA) |
| | Command Parameters | Location Length, Span | N/A | N/A |
| | I/O Device Command | Trim(LBA) | NoOp or optionally Trim(LBA) | Trim(LBA) |
| Read | Shadow Map Operation | NoOp | NoOp | NoOp |
| | Command Parameters | Length, Span | N/A or optionally Length, Span | N/A |
| | I/O Device Command | PreMappedRead (Location) | NoOp or optionally Read(LBA) | Read(LBA) |

Other Embodiment Information

In the foregoing description, commands are described as being sent (e.g. issued) from the host to the I/O device (e.g. 621 of FIG. 6, 721 of FIG. 7, 821 of FIG. 8, 931 of FIG. 9, 1161 of FIG. 11, and 1315S/1325 of FIGS. 13A/13B), and results are described as being returned from the I/O device to the host (e.g. 661 of FIG. 6, 761 of FIG. 7, 881 of FIGS. 8, 971 and 991 of FIG. 9, 1021 of FIG. 10, and 1329/1319 and 1322/1312 of FIGS. 13A/13B). In various embodiments and/or usage scenarios, the commands are sent via programmed I/O, DMA, entry into a work queue, written into one or more command, mode, and/or configuration registers and/or configuration pages of the I/O device, "pushed" from the host to the I/O device, "pulled" by the I/O device from the host, and other techniques providing for communication of the command from the host to the I/O device. In various embodiments and/or usage scenarios, the results are sent via I/O device access to host memory, DMA, entry into a completion queue, read from one or more status registers example, a type of data hint is used as a sticky hint and recorded in the map entry of an LBA supplied with the hint, and a corresponding shadow map update is optionally and/or selectively provided. Subsequent references to the LBA are processed according to the type of data hint recorded in the map entry of the LBA. Other examples of hints usable as sticky hints are a data access type hint, a data sequencing hint, a data relationship hint, and a data destination hint.

In various embodiments, all or any portions of operations and/or functions described by FIGS. 6 through 13A/13B are implemented, e.g., by one or more state machines. Example implementations of the state machines include hardware (e.g. logic gates and/or circuitry, dedicated state machines circuitry, or hardwired control circuitry), software (e.g. firmware or microcode), or combinations of hardware and software. In some embodiments, one or more of the state machines are implemented at least in part via the firmware, the driver, and/or the application. In various embodiments, one or more of the state machines are implemented in part via SSD Controller 100 of FIG. 1A, in part via firmware executed by CPU Core 172, in part via Firmware 106 of FIG. 1B, in part via Driver 107, and/or in part by Application 109.

In various embodiments, all or any portions of operations and/or functions described by FIGS. 6 through 13A/13B are implemented, e.g., by, under control of, and/or in accordance with any one or more of Command Management 173, Translation Management 177, and or Map 141 of FIG. 1A, via any combination of hardware and/or firmware techniques.

In various embodiments, an HBA couples elements of a host (e.g. one or more processors and one or more memories) to an I/O device, e.g. an I/O storage device such as a SATA drive. The coupling of the HBA to the processors and/or the memories is at least in part via one or more I/O device communication interfaces, buses, and/or channels (such as a PCIe interface). Some of the processors execute OS, driver, and/or application software elements that communicate with the I/O device. In some embodiments, transport between the elements of the host and the HBA is compatible with AHCI, and T13 compatible ATA commands are passed through the HBA to a SATA or a PCIe interface of an SSD of the I/O device. In other embodiments, transport between elements of the host and the HBA is compatible with NVM Express, and commands having at least some attributes similar to T13 compatible ATA commands are passed through the HBA to a PCIe interface of an SSD of the I/O device. In some embodiments, the HBA is included in tlc host, while in other embodiments the HBA is included in the I/O device. In some embodiments, the HBA is omitted, and the I/O device is coupled (without an explicit HBA) to one or more I/O device communication interfaces, buses, and/or channels (such as a PCIe interface).

For example, in the context of FIG. 1B, Host 102 includes an HBA that enables communication between software running on the host (e.g. OS 105, Driver 107, and/or Application 109) and SSD 101 (e.g. having a SATA compatible host interface included in Host Interfaces 111). The communication includes delivery of commands from the software to the SSD. Transport of the commands is via AHCI, and T13 compatible ATA commands are provided to the SATA interface of the SSD. Thus commands and/or results such as described with regard to FIGS. 6 through 13A/13B are delivered via AHCI transport.

For another example, in the context of FIG. 1B. Host 102 includes a chipset that enables communication with Switch/Fabric/Intermediate Controller 103, and Intermediate Interfaces 104 and External Interfaces 110 are PCIe compatible (e.g. SSD 101 has a PCIe interface included in Host Interfaces 111). The chipset and the Switch/Fabric/Intermediate Controller 103 enable communication, including delivery of commands, between OS, driver, and/or application software of the host and SSD 101. Transport of the commands is via NVM Express, and commands having at least some attributes similar to T13 compatible ATA commands are provided to the PCIe interface of the SSD. Thus commands and/or results such as described with regard to FIGS. 6 through 13A/13B are delivered via NVM Express transport.

Example Implementation Techniques

In some embodiments, various combinations of all or portions of operations performed by an I/O device or portion(s) thereof, for instance an SSD controller of an I/O device enabled for interoperation with a host (such as a computing host), e.g., with flash memories, a computing-host flash memory controller, and/or an SSD controller (such as SSD Controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify-logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array-integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium element. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per seas conveying additional information regarding structure or operation of the embodiments described. Examples of the choices include: the particular organization or assignment of the designations used for the figure numbering and the particular organization or assignment of the element identifiers (the callous or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures; macros, or portions thereof it is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware) Specific variations in various embodiment include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A method comprising the steps of:
upon initializing a storage device, transferring, by the storage device, initial map information to a computing host connected to the storage device, the computing host storing the transferred map information in a shadow map stored in a volatile memory of the computing host;
upon receiving a command from the computing host, determining, by the storage device, whether or not the command includes location information targeting a particular portion of a non-volatile memory ("NVM") of the storage device, the location information retrieved by the computing host from the shadow map and included with the command;
upon determining that the command includes location information, processing, by the storage device, the command using the included location information; and
upon determining that the command does not include location information, determining, by the storage device, the particular portion of the NVM targeted by the command based on a map stored in a memory of the storage device before processing the command.

2. The method of claim 1, further comprising the steps of:
upon processing the command, determining, by the storage device, whether an update of the shadow map is to be sent to the computing host; and
upon determining that an update of the shadow map is to be sent to the computing host, sending, by the storage device, the update of the shadow map to the computing host, the computing host applying the update to the shadow map stored in the volatile memory of the computing host.

3. The method of claim 1, wherein the command comprises a write command, the method further comprising, upon processing the command, sending, by the storage device, an update of the shadow map to the computing host corresponding to a logical block address ("LBA") of the write command.

4. The method of claim 3, wherein the update of the shadow map is sent to the computing host as a background operation.

5. The method of claim 1, further comprising the step of sending an update of the shadow map to the computing host in response to processing by the storage device not related to a command from the computing host.

6. The method of claim 5, wherein the processing by the storage device comprises recycling regions of the NVM of the storage device.

7. The method of claim 1, wherein, the computing host is configured to, prior to sending the command to the storage device, perform the steps of:
determining whether the command will invalidate an entry of the shadow map corresponding to a LBA associated with the command; and
upon determining that the command will invalidate the entry of the shadow map, marking the entry of the shadow map corresponding to the LBA associated with the command as invalid.

8. The method of claim 7, wherein the computing host only includes location information from valid shadow map entries with commands sent to the storage device.

9. The method of claim 1, wherein the map stored in a volatile memory of the storage device comprises a two-level map, and the shadow map stored in the volatile memory of the computing host contains only entries of a second level of the two-level map.

10. The method of claim 1, wherein the storage device comprises a solid-state disk ("SSD").

11. A storage system comprising:
a volatile memory;
a host interface coupled to a computing host; and a storage controller communicatively coupled to the host interface and a non-volatile memory ("NVM"), the storage controller configured to
  upon receiving a command from the computing host, determine whether or not the command includes location information targeting a particular portion of the NVM, the location information retrieved from a shadow map stored in the volatile memory and included with the command,
  upon determining that the command includes location information, process the command using the included location information, and
  upon determining that the command does not include location information, determine the particular portion of the NVM targeted by the command based on a map stored in a memory of the storage controller before processing the command.

12. The storage system of claim 11, wherein the storage controller is further configured to:
  upon processing the command, determine whether an update of the shadow map in the volatile memory is required; and
  upon determining that the update of the shadow map in the volatile memory is required, return the update of the shadow map with status information in response to the command, the update being applied to the shadow map in the volatile memory.

13. The storage system of claim 11, wherein the command comprises a write command, and the storage controller is further configured to, upon processing the command, return an update of the shadow map corresponding to a logical block address ("LBA") of the write command.

14. The storage system of claim 11, wherein the volatile memory is contained in the computing host.

15. The storage system of claim 14, wherein the storage controller is further configured to send an update of the shadow map to the computing host in response to processing by the storage controller not related to a command from the computing host.

16. The storage system of claim 15, wherein the processing by the storage controller comprises recycling regions of the NVM.

17. The storage system of claim 11, wherein the volatile memory is contained in an I/O card communicatively interposed between the host interface and the computing host.

18. A non-transitory computer-readable storage medium having processor-executable instructions stored thereon that, when executed by a processor of a storage device, cause the processor to:
  upon initializing the storage device, transfer initial map information to a computing host connected to the storage device, the computing host storing the transferred map information in a shadow map stored in a memory of the computing host;
  upon receiving a command from the computing host, determine whether or not the command includes location information targeting a particular portion of a non-volatile memory ("NVM") of the storage device, the location information retrieved by the computing host from the shadow map and included with the command;
  upon determining that the command includes location information, process the command using the included location information; and
  upon determining that the command does not include location information, determine the particular portion of the NVM targeted by the command based on a map stored in a memory of the storage device before processing the command.

19. The non-transitory computer-readable storage medium of claim 18, wherein the command comprises a write command, the storage medium having further processor-executable instructions stored thereon that cause the processor to, upon processing the command, send an update of the shadow map to the computing host corresponding to a logical block address ("LBA") of the write command.

20. The non-transitory computer-readable storage medium of claim 19, wherein the update of the shadow map is sent to the computing host as a background operation.

* * * * *